US012801386B2

(12) United States Patent
Neiger et al.

(10) Patent No.: US 12,801,386 B2
(45) Date of Patent: Nov. 17, 2026

(54) RETURN FROM EVENT INSTRUCTION THAT RETURNS FROM AN EVENT HANDLER WHILE STAYING IN A MOST PRIVILEGED LEVEL

(71) Applicant: Intel Corporation, Santa Clara, CA (US)

(72) Inventors: Gilbert Neiger, Portland, OR (US); H. Peter Anvin, San Jose, CA (US); Vedvyas Shanbhogue, Austin, TX (US); Deepak Gupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 17/359,534

(22) Filed: Jun. 26, 2021

(65) Prior Publication Data

US 2022/0283813 A1 Sep. 8, 2022

Related U.S. Application Data

(60) Provisional application No. 63/172,594, filed on Apr. 8, 2021, provisional application No. 63/159,366, filed on Mar. 10, 2021, provisional application No. 63/155,605, filed on Mar. 2, 2021.

(51) Int. Cl.
*G06F 9/30* (2018.01)
*G06F 9/32* (2018.01)
*G06F 9/38* (2018.01)

(52) U.S. Cl.
CPC ...... *G06F 9/30145* (2013.01); *G06F 9/30054* (2013.01); *G06F 9/30098* (2013.01); *G06F 9/323* (2023.08)

(58) Field of Classification Search
CPC . G06F 9/30076; G06F 9/30145; G06F 9/3861
See application file for complete search history.

(56) References Cited

U.S. PATENT DOCUMENTS

| | | | | |
|---|---|---|---|---|
| 6,021,481 | A * | 2/2000 | Eickemeyer | G06F 12/1036 711/E12.051 |
| 9,465,617 | B1 * | 10/2016 | Warkentin | G06F 13/26 |
| 10,019,275 | B2 | 7/2018 | Tuch et al. | |
| 2002/0042874 | A1 | 4/2002 | Arora | |
| 2005/0081020 | A1 | 4/2005 | Volp | |
| 2005/0289542 | A1 * | 12/2005 | Uhlig | G06F 9/45533 718/1 |

(Continued)

OTHER PUBLICATIONS

Intel, "Flexible Return and Event Delivery (FRED) Draft Specification", Revision 1.0, Mar. 13, 2021, 47 pages.

(Continued)

*Primary Examiner* — Jacob Petranek
(74) *Attorney, Agent, or Firm* — Nicholson De Vos Webster & Elliott LLP

(57) ABSTRACT

Techniques for flexible return and event delivery are described. As an example, an exemplary apparatus includes decoder circuitry to decode a single instruction, the single instruction to include a field for an opcode; and execution circuitry to execute the decoded single instruction according to the opcode to cause a return from an event handler while staying in a most privileged level and establish a return context that was in effect before event delivery.

15 Claims, 48 Drawing Sheets

(56) References Cited

U.S. PATENT DOCUMENTS

| | | | | |
|---|---|---|---|---|
| 2011/0047309 | A1* | 2/2011 | Brinkmann | G06F 13/24 710/260 |
| 2015/0006855 | A1 | 1/2015 | Gschwind et al. | |
| 2016/0371092 | A1 | 12/2016 | Park et al. | |
| 2017/0228535 | A1 | 8/2017 | Shanbhogue et al. | |
| 2020/0089871 | A1 | 3/2020 | Shanbhogue et al. | |
| 2020/0150970 | A1* | 5/2020 | Evans | G06F 9/30101 |
| 2021/0303304 | A1 | 9/2021 | Shanbogue et al. | |
| 2021/0334222 | A1* | 10/2021 | Wood | G06F 12/1441 |

OTHER PUBLICATIONS

Search Report and Office Action, NL App. No. 2030804, Feb. 27, 2023, 9 pages.
International Preliminary Report on Patentability , PCT App. No. PCT/US22/18353, Sep. 14, 2023, 09 pages.
International Search Report and Written Opinion, PCT App. No. PCT/US2022/018353, Jun. 8, 2022, 12 pages.
Extended European search report and Search Opinion , EP App. No. 22763906.9, Feb. 13, 2025, 10 pages.

* cited by examiner

```
F IA32_FRED_CONFIG is not canonical relative to the current paging mode
THEN #GP(0); // will lead eventually to shutdown or VM exit
FI;
// HOLD OLD STATE IN TEMPORARIES
oldRIP ← RIP;
oldCS ← CS; // oldCS is 8 bytes; the upper 6 bytes are defined below
oldCPL ← CPL; // the same as oldCS[1:0]
oldRFLAGS ← RFLAGS;
oldSS ← SS; // oldSS is 8 bytes; upper 6 bytes are zero
oldRSP ← RSP;
oldCSL ← CSL; // represented in IA32_FRED_CONFIG[1:0]
oldGSB ← GS.base;
oldSSP ← SSP; // used only when shadow stacks are enabled
// ERETS and ERETU will restore the oldRFLAGS to RFLAGS
// Before saving, event delivery updates oldRFLAGS to set RF when appropriate
IF the event being delivered is a fault other than an instruction breakpoint OR
the event being delivered is a trap or interrupt between iterations
of a REP-prefixed string instruction
THEN oldRFLAGS[16] ← 1;
FI;
// Update bits above CS selector to hold additional information
// ERETS and ERETU will use these
IF event being delivered is an NMI // includes VM-entry injection of NMI
THEN oldCS[16] ← 1;
FI;
IF event being delivered is either SYSCALL, SYSENTER, or INT n
THEN oldCS[17] ← 1;
FI;
IF STI blocking was in effect when the event occurred
THEN oldCS[18] ← 1;
FI;
oldCS[25:24] ← oldCSL;
// DETERMINE NEW CONTEXT
// determine new RIP
IF oldCPL = 3
THEN newRIP ← IA32_FRED_CONFIG & ~FFFH;
ELSE newRIP ← IA32_FRED_CONFIG & ~FFFH + 256;
FI;
// determine event's stack level and then new stack level for event handler
IF oldCPL = 3 AND event is not an exception nested on event delivery AND event is not #DF
THEN eventSL ← 0;
ELSE
IF event type is external interrupt // since this is "ELSE", oldCPL must be 0
THEN eventSL ← IA32_FRED_CONFIG[10:9];
ELSIF event type is hardware exception, software exception, or NMI
// v = event vector (0–31); includes INT1, INT3, INTO
THEN eventSL ← IA32_FRED_STKLVLS[2v+1:2v];
ELSE // SYSCALL, SYSENTER, INT n with CPL = 0; do not change CSL
eventSL ← 0;
FI;
FI;
newCSL ← MAX{eventSL, oldCSL};
```

FIG. 8(A)

```
// determine new RSP
IF oldCPL = 3 OR newCSL > oldCSL
THEN newRSP ⟵ IA32_FRED_RSPi, where i = newCSL;
ELSE // decrement RSP as specified and align to 64 bytes
newRSP ⟵ (RSP – (IA32_FRED_CONFIG & 1C0H)) & ~3FH;
FI;
// determine new RFLAGS; always clear TF = RFLAGS[8] and RF = RFLAGS[16]
newRFLAGS ⟵ oldRFLAGS & ~IA32_FMASK & ~10100H;
// if needed, determine new SSP
IF CR4.CET = 1 AND IA32_S_CET.SH_STK_EN = 1 AND (oldCPL =3 OR newCSL > oldCSL)
THEN // i = newCSL; do not copy MSR's verified bit into SSP
newSSP ⟵ IA32_FRED_SSPi & ~1;
ELSE // decrement SSP if specified
newSSP ⟵ SSP – (IA32_FRED_CONFIG & 8);
FI;

// ESTABLISH NEW CONTEXT — OLD STATE WILL BE RESTORED IF THERE IS A SUBSEQUENT FAULT
// update segment registers if event occurred in ring 3
IF oldCPL = 3
THEN
// set CS to standard values used by a 64-bit operating system
CS.selector ⟵ IA32_STAR[47:32] & FFFCH;
CS.base ⟵ 0;
CS.limit ⟵ FFFFFH;
CS.type ⟵ 11;
CS.S ⟵ 1;
CS.DPL ⟵ 0;
CS.P ⟵ 1;
CS.L ⟵ 1;
CS.D ⟵ 0;
CS.G ⟵ 1;
// set SS to standard values used by a 64-bit operating system
SS.selector ⟵ CS.selector + 8;
SS.base ⟵ 0;
SS.limit ⟵ FFFFFH;
SS.type ⟵ 3;
SS.S ⟵ 1;
SS.DPL ⟵ 0;
SS.P ⟵ 1;
SS.B ⟵ 1;
SS.G ⟵ 1;
// swap in supervisor GS base address
GS.base ⟵ IA32_KERNEL_GS_BASE;
IA32_KERNEL_GS_BASE ⟵ oldGSB;
FI;
```

FIG. 8(B)

```
// update registers defining context
RIP ← newRIP;
RFLAGS ← newRFLAGS;
RSP ← newRSP; // SSP will be updated later
CSL ← newCSL; // reflected in IA32_FRED_CONFIG[1:0]
// SAVE STATE ON STACKS
// Save return state on new regular stack; memory accesses here have supervisor privilege
push8B 00000000_00000000H; // First 8 bytes pushed are all zero
push8B eventdata as defined in Section 5.2.1;
push8B eventinfo as defined in Section 5.2.1;
push8B oldSS;
push8B oldRSP;
push8B oldRFLAGS;
push8B oldCS;
push8B oldRIP;
// If needed, update new shadow stack and save state
IF CR4.CET = 1 AND IA32_S_CET.SH_STK_EN = 1
THEN
IF oldCPL = 3 AND newCSL = 0 AND newSSP[2] = 1
// newSSP was loaded from IA32_FRED_SSP0; might not have been 8B aligned
THEN #GP(0);
FI;
IF oldCPL = 3 OR newCSL > oldCSL
THEN // SSP is changing; token management for new shadow stack
// the following are considered supervisor shadow-stack accesses
// i = newCSL; recall newSPP was loaded from IA32_FRED_SSPi
IF IA32_FRED_SSPi[0] = 0 // check MSR verified bit
THEN // MSR not verified
SSPToken ← 8 bytes at newSSP;// under lock
IF SSPToken = newSSP
THEN
// set bit 0 and mark MSR verified
SSPToken ← newSSP | 1;
store SSPToken at newSSP;// unlock
IA32_FRED_SSPi ← SSPToken;
ELSE
// write back old value
store SSPToken at newSSP;// unlock
```

FIG. 8(C)

```
#GP(0);
FI;
ELSE // MSR already verified
SSPToken ← 8 bytes at newSSP;// no lock
IF SSPToken ≠ newSSP | 1
THEN #GP(0);
FI;
FI;
SSP ← newSSP; // oldSSP restored on a subsequent fault
ELSE
IF SSP & 7 ≠ 0 // SSP not changing; check for 8B alignment
THEN pushSS_4B 00000000H; // aligns SSP to 8B boundary
FI;
FI;
IF oldCPL = 0
THEN
pushSS_8B oldCS & FFFFH; // only push original selector
pushSS_8B oldRIP; // add old CS.base if had been compat. mode
pushSS_8B oldSSP;
FI;
FI;
// UPDATE ADDITIONAL STATE
// update additional CET state as needed (SSP was updated earlier)
IF CR4.CET = 1
THEN
IF oldCPL = 3 AND IA32_U_CET.SH_STK_EN = 1
THEN // adjust so bits 63:N get the value of bit N–1
// N = CPU's maximum linear-address width
IA32_PL3_SSP ← LA_adjust(oldSSP);
FI;
IF IA32_S_CET.ENDBR_EN = 1
THEN IA32_S_CET[11:10] ← 10b; // WAIT_FOR_ENDBRANCH with SUPPRESS = 0
FI;
FI;
// update event-related state
clear any pending debug traps;
IF event being delivered is an NMI
THEN block NMIs;1
FI;
CPL ← 0
```

FIG. 8(D)

```
// update registers defining context (RSP was updated earlier)
RIP <–newRIP;
RFLAGS <–newRFLAGS;
CSL <–newCSL;                                   // reflected in IA32_FRED_CONFIG[1:0]
// update additional CET state as needed (SSP was updated earlier)
IF CR4.CET = 1
   THEN
       IF oldCPL = 3 AND IA32_U_CET.SH_STK_EN = 1
           THEN        // adjust so bits 63:N get the value of bit N–1 (N = CPU's maximum LA width)
               IA32_PL3_SSP <–LA_adjust(oldSSP);
       FI;
       IF IA32_S_CET.ENDBR_EN = 1
           THEN IA32_S_CET[11:10] <–10b;
   // WAIT_FOR_ENDBRANCH with SUPPRESS = 0
       FI;
FI;
// update event-related state
clear any pending debug traps;
IF event being delivered is an NMI
   THEN block NMIs;
FI;
CPL <–0;
```

FIG. 8(E)

```
IF IA32_EFER.LMA = 0 OR CS.L = 0 OR CR4.FRED = 0 OR CPL > 0
   THEN #UD;
FI;
// pop old context from regular stack and check it
pop8B newRIP;
pop8B newCS;
pop8B newRFLAGS;
pop8B newRSP;
pop8B newSS;     // not used
IF newRIP is not canonical relative to the current paging mode OR newCS[63:26] ≠ 0 OR
   newCS[23:19] ≠ 0 OR newRFLAGS & FFFFFFFFFFC2802AH ≠ 2 OR newSS[63:16] ≠ 0 OR
   newSS[1:0] ≠ 0
      // the flags check enforces that bit 1 is set and the VM bit and all reserved bits are clear
      THEN #GP(0);
FI;
NMI_unblock <–newCS[16];
pend_DB <–newCS[17];
STI_block<–newCS[18];
newCSL <–min{CSL,newCS[25:24]};
   // ERETS will not numerically increase stack level
// If supervisor shadow stacks are enabled, pop and check values from the shadow stack
IF CR4.CET = 1 AND IA32_S_CET.SH_STK_EN = 1
   THEN
      IF SSP & 7 ≠ 0                       // require 8-byte alignment
         THEN #CP(FAR-RET/IRET);
      FI;
      popSS_8B newSSP;
      popSS_8B checkSSLIP;
      popSS_8B checkSSCS;
      IF checkSSCS ≠ CS                    // 64-bit compare
         OR checkSSLIP ≠ newRIP
         OR newSSP & 3H ≠ 0
         THEN #CP(FAR-RET/IRET);
      FI;
      IF newSSP not canonical relative to current paging mode
         THEN #GP(0);
      FI;
FI;
```

FIG. 11(A)

```
// If supervisor shadow stacks are enabled, the stack level is changing, and the FRED SSP MSR
// for the old stack level is not verified, check token on shadow stack; in this section, i = CSL
IF CR4.CET = 1 AND IA32_S_CET.SH_STK_EN = 1 AND
            newCSL < CSL AND IA32_FRED_SSPi ≠ SSP | 1
   THEN
       IF IA32_FRED_SSPi = SSP          // MSR has right address but isn't verified
           THEN
               SSPToken <–8 bytes at SSP; // no lock
               IF SSPToken = SSP | 1              // token busy, re-verify MSR
                   THEN IA32_FRED_SSP <–SSPToken;        // sets MSR bit 0, marking it verified
               FI;
           ELSE                // MSR has wrong address
               SSPToken <–8 bytes at SSP; // under lock
               IF SSPToken = SSP | 1
                   THEN store SSP at SSP;        // unlock; clears bit 0, freeing token
                   ELSE store SSPToken at SSP; // unlock; memory not changed
               FI;
       FI;
FI;
// update registers for return context
RIP <–newRIP;
RFLAGS <–newRFLAGS;                              // ERETS can set RFLAGS.RF to 1
RSP <–newRSP;
CSL <–newCSL;                                    // reflect in IA32_FRED_CONFIG[1:0]
IF CR4.CET = 1 AND IA32_S_CET.SH_STK_EN = 1
   THEN SSP <–newSSP;
FI;
// update event-related state
IF NMI_unblock = 1
   THEN unblock NMIs;
FI;
IF pend_DB = 1 AND RFLAGS.TF =1
   THEN pend a single-step debug exception (#DB) to be delivered after ERETS;
FI;
IF STI_unblock = 1
   THEN esablish STI blocking;
```

FIG. 11(B)

```
IF IA32_EFER.LMA = 0 OR CS.L = 0 CR4.FRED = 0 OR CPL > 0
   THEN #UD;
FI;
// pop old context from regular stack and check it
pop8B newRIP;
pop8B tempCS;
pop8B newRFLAGS;
pop8B newRSP;
pop8B tempSS;
IF tempCS[63:18] ≠ 0 OR newRFLAGS & FFFFFFFFFFC2B02AH ≠ 2 OR tempSS[63:16] ≠ 0
       // the flags check enforces that bit 1 is set and
       // that IOPL, the VM bit and all reserved bits are clear
   THEN #GP(0);
FI;
NMI_unblock <–tempCS[16];
pend_DB <–tempCS[17];
IF tempCS[15:0] = IA32_STAR[63:48] + 16 AND tempSS[15:0] = IA32_STAR[63:48] + 8
   THEN                                   // Return to ring 3 in standard 64-bit configuration
       // set newCS to standard values used ring 3 in 64-bit mode
           newCS.selector <–(IA32_STAR[63:48] + 16) | 3;
           newCS.base <–0;
           newCS.limit <–FFFFFH;
           newCS.type <–11;
           newCS.S <–1;
           newCS.DPL <–3;
           newCS.P <–1;
           newCS.L <–1;
           newCS.D <–0;
           newCS.G <–1;
       // set newSS to standard values for ring 3
           newSS.selector <–(IA32_STAR[63:48] + 8) | 3;
           newSS.base <–0;
           newSS.limit <–FFFFFH;
           newSS.type <–3;
           newSS.S <–1;
           newSS.DPL <–3;
           newSS.P <–1;
           newSS.B <–1;
           newSS.G <–1;
```

FIG. 14(A)

```
ELSIF tempCS[15:0] = IA32_STAR[63:48] AND tempSS[15:0] = IA32_STAR[63:48] + 8
   THEN
       // set newCS to standard values used ring 3 in compatibility mode
           newCS.selector <–IA32_STAR[63:48] | 3;
           newCS.base <–0;
           newCS.limit <–FFFFFH;
           newCS.type <–11;
           newCS.S <–1;
           newCS.DPL <–3;
           newCS.P <–1;
           newCS.L <–0;
           newCS.D <–1;
           newCS.G <–1;
       // set newSS to standard values for ring 3
           newSS.selector <–(IA32_STAR[63:48] + 8) | 3;
           newSS.base <–0;
           newSS.limit <–FFFFFH;
           newSS.type <–3;
           newSS.S <–1;
           newSS.DPL <–3;
           newSS.P <–1;
           newSS.B <–1;
           newSS.G <–1;
   ELSE
       IF tempCS[1:0] ≠ 3                                        // ERETU only to ring 3
           THEN #GP(0);
       FI;
       load newCS using tempCS[15:0];        // load each from GDT or LDT as is done by IRET;
       load newSS using tempSS[15:0];        // these perform checks that may lead to fault
       IF newCS.L = 0 AND newRIP is not within newCS's limit
           THEN #GP(0);
       FI;
FI;
IF newCS.L = 1 AND newRIP is not canonical relative to current paging mode
   THEN #GP(0);
FI;

// If supervisor shadow stacks are enabled, SSP must be 8-byte aligned
IF CR4.CET = 1 AND IA32_S_CET.SH_STK_EN = 1 AND SSP & 7 ≠ 0
                    // require 8-byte alignment
   THEN #CP(FAR-RET/IRET);
FI;

// If user shadow stacks are enabled, check new SSP value
IF CR4.CET = 1 AND IA32_U_CET.SH_STK_EN = 1 AND
   (newCS.L = 0 AND IA32_PL3_SSP[63:32] ≠ 0)// return is to compatibility mode
   OR (newCS.L = 1 AND IA32_PL3_SSP not canonical relative to current paging mode)
       THEN #GP(0);
FI;
```

FIG. 14(B)

```
// If supervisor shadow stacks are enabled and the FRED SSP MSR for the CSL is not verified,
// check token on shadow stack; in this section, i = CSL
IF CR4.CET = 1 AND IA32_S_CET.SH_STK_EN = 1 AND IA32_FRED_SSPi ≠ SSP | 1
   THEN
       IF IA32_FRED_SSPi = SSP                        // MSR has right address but isn't
verified
           THEN
               SSPToken <–8 bytes at SSP; // no lock
               IF SSPToken = SSP | 1                  // token busy, re-verify MSR
                   THEN IA32_FRED_SSP <–SSPToken;     // sets MSR bit 0, marking it verified
               FI;
           ELSE                                               // MSR has wrong address
               SSPToken <–8 bytes at SSP; // under lock
               IF SSPToken = SSP | 1
                   THEN store SSP at SSP;           // unlock; clears bit 0, freeing token
                   ELSE store SSPToken at SSP; // unlock; memory not changed
               FI;
       FI;
FI;
// update registers for return context
RIP <–newRIP;
RFLAGS <–newRFLAGS;                                   // ERETU can set RFLAGS.RF to 1
RSP <–newRSP;                            // load all 64 bits regardless of new mode
CS <–newCS;                              // selector and descriptor
SS <–newSS;                              // selector and descriptor
CPL <–3;
tempGSB <–GS.base;                       // swap GS.base and IA32_KERNEL_GS_BASE
GS.base <–IA32_KERNEL_GS_BASE;
IA32_KERNEL_GS_BASE <–tempGSB;
CSL <–0;                                 // reflect in IA32_FRED_CONFIG[1:0]
IF CR4.CET = 1 AND IA32_U_CET.SH_STK_EN = 1
   THEN SSP <–IA32_PL3_SSP;
FI;
// update event-related state
IF NMI_unblock = 1
   THEN unblock NMIs;
FI;
IF pend_DB = 1 AND RFLAGS.TF =1
   THEN pend a single-step debug exception (#DB) to be delivered after ERETU;
```

FIG. 14(C)

```
IF (CS.L ≠ 1 ) or (IA32_EFER.LMA ≠ 1) or (IA32_EFER.SCE ≠ 1)
(* Not in 64-Bit Mode or SYSCALL/SYSRET not enabled in IA32_EFER *)
   THEN #UD;
FI;

ELSIF CR4.FRED = 0
            THEN
                        IF IA32_EFER.SCE = 0 OR CS.L = 0
            THEN #UD;
ELSE
            //existing SYSCALL operation
            RCX ← RIP; (* Will contain address of next instruction *)
            RIP ← IA32_LSTAR;
            R11 ← RFLAGS;
            RFLAGS ← RFLAGS AND NOT(IA32_FMASK);
            CS.Selector ← IA32_STAR[47:32] AND FFFCH (* Operating system provides CS; RPL
forced to 0 *)
(* Set rest of CS to a fixed value *)
            CS.Base ← 0;
      (* Flat segment *)
            CS.Limit ← FFFFFH;
      (* With 4-KByte granularity, implies a 4-GByte limit *)
            CS.Type ← 11;
      (* Execute/read code, accessed *)
            CS.S ← 1;
            CS.DPL ← 0;
            CS.P ← 1;
            CS.L ← 1;
      (* Entry is to 64-bit mode *)
            CS.D ← 0;
      (* Required if CS.L = 1 *)
            CS.G ← 1;
      (* 4-KByte granularity *)
            CPL ← 0;
            SS.Selector ← IA32_STAR[47:32] + 8;
      (* SS just above CS *)
(* Set rest of SS to a fixed value *)
            SS.Base ← 0;
      (* Flat segment *)
            SS.Limit ← FFFFFH;
      (* With 4-KByte granularity, implies a 4-GByte limit *)
            SS.Type ← 3;
      (* Read/write data, accessed *)
            SS.S ← 1;
            SS.DPL ← 0;
            SS.P ← 1;
            SS.B ← 1;
      (* 32-bit stack segment *)
            SS.G ← 1;
      (* 4-KByte granularity *)
FI;
ELSE // FRED does not require enabling in IA32_EFER
            // SYSCALL is allowed in compatibility mode
            FRED event delivery of SYSCALL; // As described with respect to at least FIG. 7
FI;
```

FIG. 20

```
IF CR0.PE = 0 OR IA32_SYSENTER_CS[15:2] = 0 and (IA32_EFER.LMA=- OR CR4.FRED=0)
        THEN #GP(0); //IF FRED TRANSITIONS ENABLED, IA32_SYSENTER_CS IS IGNORED
FI;
ELSIF IA32_EFER.LMA=0 OR CR4.FRED =0
        RFLAGS.VM ← 0;
      (* Ensures protected mode execution *)
        RFLAGS.IF ← 0;
      (* Mask interrupts *)
        IF in IA-32e mode
          THEN
            RSP ← IA32_SYSENTER_ESP;
            RIP ← IA32_SYSENTER_EIP;
        ELSE
            ESP ← IA32_SYSENTER_ESP[31:0];
            EIP ← IA32_SYSENTER_EIP[31:0];
        FI;
        CS.Selector ← IA32_SYSENTER_CS[15:0] AND FFFCH;
      (* Operating system provides CS; RPL forced to 0 *)
        (* Set rest of CS to a fixed value *)
        CS.Base ← 0;
      (* Flat segment *)
        CS.Limit ← FFFFFH;
      (* With 4-KByte granularity, implies a 4-GByte limit *)
        CS.Type ← 11;
      (* Execute/read code, accessed *)
        CS.S ← 1;
        CS.DPL ← 0;
        CS.P ← 1;
        IF in IA-32e mode
          THEN
            CS.L ← 1;
              (* Entry is to 64-bit mode *)
            CS.D ← 0;
              (* Required if CS.L = 1 *)
          ELSE
            CS.L ← 0;
            CS.D ← 1;
              (* 32-bit code segment*)
        FI;
        CS.G ← 1;
              (* 4-KByte granularity *)
        CPL ← 0;
        SS.Selector ← CS.Selector + 8;
              (* SS just above CS *)
        (* Set rest of SS to a fixed value *)
        SS.Base ← 0;
              (* Flat segment *)
        SS.Limit ← FFFFFH;
              (* With 4-KByte granularity, implies a 4-GByte limit *)
        SS.Type ← 3;
              (* Read/write data, accessed *)
        SS.S ← 1;
        SS.DPL ← 0;
        SS.P ← 1;
        SS.B ← 1;
              (* 32-bit stack segment*)
        SS.G ← 1;
              (* 4-KByte granularity *)
ELSE
        FRED EVENT DELIVERY // AS DETAILED ELSEWHERE
FI;
```

FIG. 22

RETURN FROM EVENT INSTRUCTION THAT RETURNS FROM AN EVENT HANDLER WHILE STAYING IN A MOST PRIVILEGED LEVEL

BACKGROUND

An arrival of events such as interrupts, exceptions, and system calls from an operating system (OS) typically results in a transfer of control from an interrupted context (possibly a user application) to an event handler in the OS; such a transfer is called event delivery. Following its handling of a delivered event, the OS generally transfers control back to the interrupted context, typically using an event-return instruction. Details of the operation of event delivery and event-return instructions are defined by a processor's instruction set architecture (ISA).

BRIEF DESCRIPTION OF DRAWINGS

The present disclosure will be described with reference to the drawings.

FIGS. 8(A)-(E) illustrate exemplary pseudocode for FRED event delivery.

FIGS. 11(A)-(B) illustrate exemplary pseudocode for an execution of ERETS.

FIGS. 14(A)-(C) illustrate exemplary pseudocode for an execution of ERETU.

FIG. 20 illustrates exemplary pseudocode for execution of SYSCALL.

FIG. 22 illustrates exemplary pseudocode for execution of SYSENTER.

DETAILED DESCRIPTION

Figure 1:
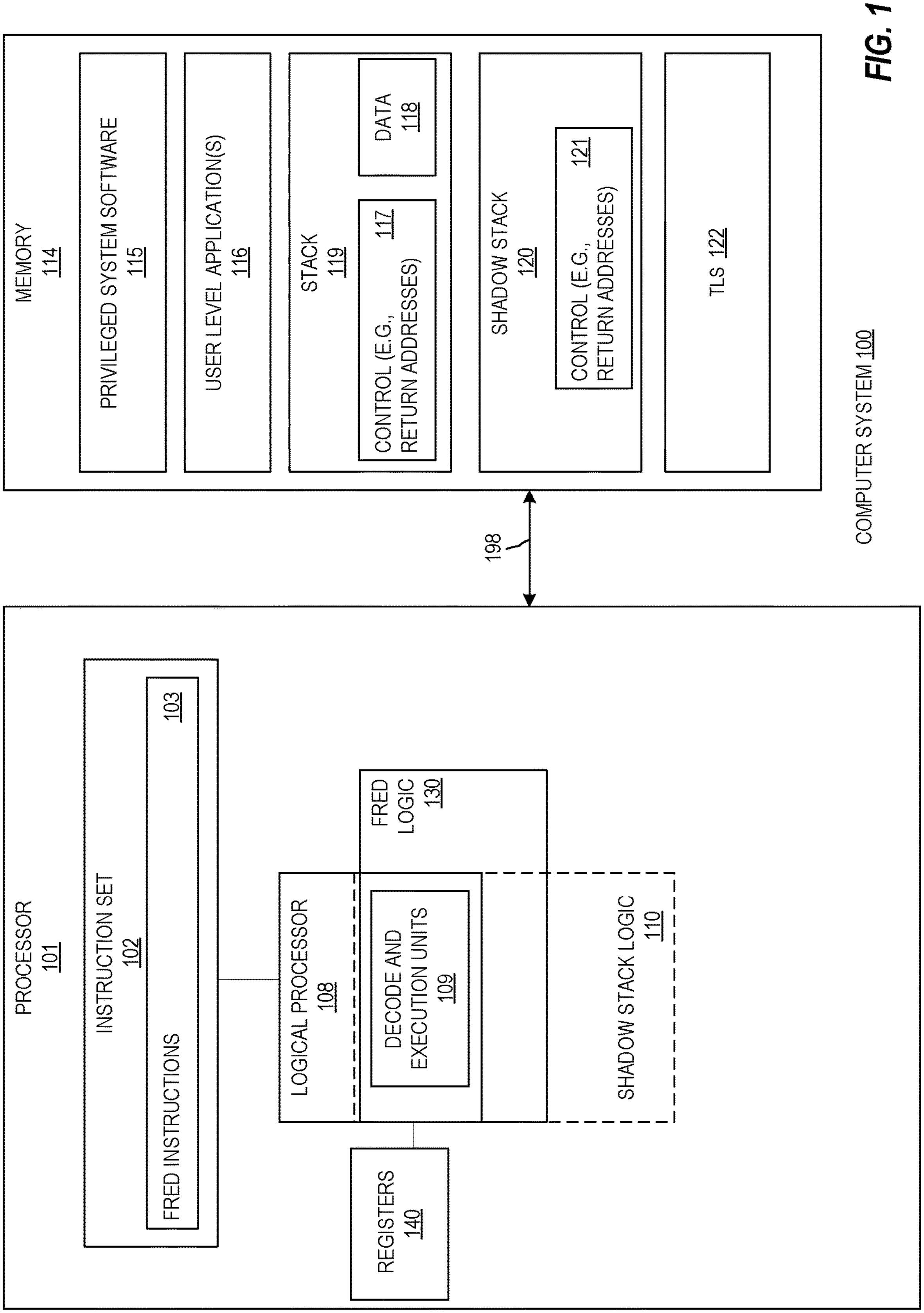
FIG. 1 is a block diagram of an exemplary computer system.

The present disclosure relates to methods, apparatus, systems, and non-transitory computer-readable storage media for flexible return and event delivery. At a minimum, event delivery loads an instruction pointer with an address of an event handler. To establish the event handler's execution context, event delivery may also load other processor state elements (e.g., the stack pointer). Event delivery may also save elements of the interrupted context, especially the values of the registers it loads, to establish the event handler's execution context. Event delivery may save these elements in dedicated processor registers, or at fixed locations in memory, or on a stack in memory. In addition to elements of the interrupted context, event delivery may save information about the event being delivered for use by the event handler.

An event-return instruction restores the interrupted context by loading those elements that were saved as part of event delivery (from dedicated processor registers, fixed locations in memory, or a stack in memory). For that reason, these instructions are typically designed in conjunction with event delivery.

For many ISAs, event delivery and return instructions possess deficiencies that challenge the ability of operating systems to handle events efficiently and robustly. The following are some general categories of deficiencies.

For some ISAs, event delivery identifies elements of the event handler's execution context (e.g., the instruction pointer) by reading them from one or more in-memory data structures configured by the OS. Reading from these data structures may delay the OS handling of the event being delivered. In addition, malicious software may be able to compromise OS integrity by corrupting those in-memory data structures.

Events such as interrupts may be delivered when a processor is in any of a possibly large number of configurations or execution modes, and these may differ from that of the event handler. (For example, the event handler may run in 64-bit mode while the interrupted context was in 32-bit mode.) Event-return instructions must be able to restore any of these configurations or modes. As a result, event-return instructions are often very complex and do not perform well.

The execution context required by the event handlers of modern operating systems includes processor registers that are not loaded by event delivery as defined by an ISA. As a result, an event handler is invoked with only part of its required context. Until the event handler executes the instructions necessary to establish its complete context, the OS may be at risk of erroneous execution, especially if another event is delivered during this period.

Multiple events may occur concurrently, and they are typically delivered one at a time. There are situations in which delivery of one event (e.g., an interrupt) may be followed by delivery of an event that had been triggered synchronously by the interrupted context (e.g., a debug breakpoint). In this case, it may appear to the handler of the second event that that event was triggered not by the original interrupt context, but by the handler of the first event. This may result in erroneous execution unless the OS employs workarounds that may be complex and fragile.

For correct behavior, an OS may expect an ISA to be such that a microprocessor modifies its handling of certain events as part of event delivery and return. For example, operating systems expect delivery of a non-markable interrupt (NMI) to block additional NMIs until the original NMI handler returns. In another example, if a user application is being single-stepped by a debugger (generating a debug exception after each instruction), an OS expects this single-stepping to be suspended upon entering the OS (as part of delivery of any event, e.g., a system call) and then restored upon return to the interrupt context. For some ISAs, event delivery and return are such that an OS is likely to unblock NMIs prematurely, or that a debug exception may be missed upon return to a user application.

With some ISAs, event delivery saves some information about the event being delivered in dedicated processor registers or at fixed locations in memory. This approach may be problematic if a second event occurs and overwrites that information before the event handler can save it in another location. Operating systems may try to work around this problem by trying to prevent occurrence of a second event, but such workarounds may be complex and fragile.

Some ISAs use a single space of event numbers (or vectors) for all events regardless of type. (An ISA may associate each exception with a fixed number and an OS may be advised not to assign any interrupt a number already associated with an exception.) Some ISAs include complex features to block malicious system calls (or software interrupts) that might confuse an OS by using event numbers assigned to exceptions or I/O interrupts. These features may require use of the in-memory data structures.

Some architectures attempted to address the problems above with the introduction of fast system call instructions. These instructions effect a special form of event delivery that establishes some elements of processor state (e.g., the instruction pointer) from configuration registers or with fixed values, rather than loading state from in-memory data structures. Use of this special form of event delivery is limited to the SYSCALL and SYSENTER instructions. There are corresponding event-return instructions (SYSRET and SYSEXIT) that restore the interrupted context correspondingly and that are very simple and quick.

The fast system call instructions enhance event delivery but only for system calls. They provide no benefit for delivery of interrupts and exceptions. Each of the instruction pairs has other deficiencies. SYSENTER does not save the current instruction pointer; as a result, user applications cannot use the instruction freely but can do so only from one predetermined address. SYSCALL does not load the stack pointer (and SYSRET does not restore it); as a result, a problem above applies to the stack used by the SYSCALL handler, and operating-system vendors have identified this as a serious problem.

Some approaches use a plurality of privilege levels (e.g., numbered from 0 to 3 and sometimes called rings), where a greater number mean less privilege. The reason to use privilege levels is to improve the reliability of operating systems. The highest privilege level 0 is used for software modules that contain the most critical code modules in the system, usually the kernel of an operating system. The outer rings (with progressively lower privileges) are used for segments that contain code modules for less critical software until privilege level 3 (e.g., applications).

Examples detailed herein define a form of a flexible event delivery and event-return (herein FRED). FRED event delivery loads all the context required by the event handlers of modern operating systems. It loads that context from configuration registers and not from memory; it also saves, on a stack in memory, components of the interrupted context and information about the event being delivered. The FRED return instructions restore the interrupt context fully and are simple and efficient. Collectively, the new event delivery and return instructions are designed to meet OS requirements for situations when multiple events occur concurrently.

Some examples eliminate many obscure corner cases that have, in the past, led to security vulnerabilities and required complex software workarounds. The systematic handling of concurrent and nested events may be important to features that define new exceptions (or other events).

Configuration registers may be provided from which event delivery would load the context of an OS event handler, including configuration registers corresponding to those elements of processor state deemed necessary for a modern OS. The following processor-state elements could be supported: instruction pointer and code-segment register; stack pointer and stack-segment register; shadow-stack pointer; and pointer to thread-local storage (e.g., GS segment).

In general, event delivery will save elements of the interrupted context on the in-memory stack of the OS event handler (i.e., at the address that event delivery loads into the stack pointer). Processor-state elements such as the pointer to thread-local storage need to be loaded only on delivery of an event directly from user software. Such state elements can be saved in dedicated registers rather than on the stack.

In addition, event delivery will save on the stack (instead of or in addition to dedicated processor registers) principal information about the event being delivered. This information could include the following: event type (e.g., interrupt versus exception); event number or vector (e.g., to distinguish interrupts); an exception error code (further detailing the nature of an exception) and certain exception-specific information (e.g., the virtual address whose access resulted in a page fault). Identifying the event type as well as the event number removes risk of an OS misidentifying the event, eliminating the need to add features blocking system calls based on event number.

Event delivery may be implemented to cancel any additional pending events that may have been triggered synchronously by user software (e.g., a debug breakpoint). This ensures that the OS event handler cannot become confused by the untimely delivery of such an event. If delivery of the pending event is required for correct operation of the interrupted context, event delivery will save information about pending event on the stack (before canceling it) so that execution of a subsequent event-return instruction can restore it when returning to the interrupted context.

One or more new event-return instructions may be provided that are designed to complement the event delivery. Corresponding to event delivery, these instructions would restore all the interrupted context that was saved by event delivery. This complete restoration of the interrupted context removes the requirement that the event handler operate partially in the interrupted context before executing a return instruction.

For functionality that a return instruction should provide only when returning from certain events (e.g., an NMI or a system call), the return instructions can consult the stack frame to identify the original event and provide that functionality in an appropriate event-specific manner.

The FRED return instructions are more closely aligned with OS requirements, and it is likely that they can be implemented in an efficient manner. This efficiency may be promoted further by providing multiple return instructions, each dedicated to returning to specific privilege level or mode of execution. For example, there might be one instruction for returning to user execution and another for returns that remain at supervisor level. Alternatively, there may be different instructions for returning to 32-bit and 64-bit operation.

For an example defining multiple return instructions, an OS event handler selects the correct return instruction for returning to the interrupt context. If the latency of identifying the return instruction may compromise real-time response or performance, an example could allow the OS to configure multiple entry points for the event handler, one entry point for each return instruction and used for delivery of events arriving incident to the privilege level or mode targeted by the return instruction. Having multiple entry points allows the event handler to identify the correct return instruction without undue latency.

FIG. 1 is a block diagram of an example of a computer system 100 in which various examples may be implemented. The computer system 100 may represent a desktop computer system, a laptop computer system, a notebook computer, a tablet computer, a netbook, a portable personal computer, a smartphone, a cellular phone, a server, a network element (e.g., a router or switch), a smart television, a nettop, a set-top box, a video game controller, a media player, or another type of computer system or electronic device.

The computer system 100 includes a processor 101 and a memory 114. When deployed together in a system, the processor 101 and the memory 114 may be coupled with one another by an interconnection mechanism 198. The interconnection mechanism 198 may include one or more buses or other interconnects, one or more hubs or other chipset components, and combinations thereof. Various ways of coupling processors 100 with memories 114 known in the arts are suitable. Although the memory 114 is shown in FIG. 1, other examples pertain to the processor 101 alone not coupled with the memory 114 (e.g., is not deployed in a computer system 100). Examples of different types of memory include, but are not limited to, dynamic random-access memory (DRAM), flash memory, and other types of memory commonly used for main memory.

The processor 101 may provide at least two types of memory management: segmentation and paging. Segmentation provides a mechanism of isolating individual code, data, and stack modules so that multiple programs (or tasks) can run on the same processor without interfering with one another. Paging provides a mechanism for implementing a conventional demand-paged, virtual-memory system where sections of a program's execution environment are mapped into physical memory as needed. Paging can also be used to provide isolation between multiple tasks. When operating in protected mode (where a protected mode is a mode of processor operation in which segmentation is enabled and which is a prerequisite for enabling paging), some form of segmentation must be used. There is no mode bit to disable segmentation. The use of paging, however, is optional. These two mechanisms (segmentation and paging) can be configured to support simple single-program (or single-task) systems, multitasking systems, or multiple-processor systems that use shared memory. Segmentation provides a mechanism for dividing the processor's addressable memory space (called the linear address space) into smaller, protected address spaces called segments. Segments can be used to hold the code, data, and stack for a program or to hold system data structures (such as a task state segment (TSS) or local descriptor table (LDT)). If more than one program (or task) is running on the processor 101, each program can be assigned its own set of segments. The segmentation mechanism also allows typing of segments so that the operations that may be performed on a particular type of segment can be restricted. All the segments in a system are contained in the processor's linear address space.

Every segment register may have a 'visible' part and a "hidden" part. (The hidden part is sometimes referred to as a "descriptor cache" or a "shadow register.") When a segment selector is loaded into the visible part of a segment register, the processor also loads the hidden part of the segment register with the base address, segment limit, and access control information from the segment descriptor pointed to by the segment selector. The information cached in the segment register (visible and hidden) allows the processor to translate addresses without taking extra bus cycles to read the base address and limit from the segment descriptor. In systems in which multiple processors have access to the same descriptor tables, it is the responsibility of software to reload the segment registers when the descriptor tables are modified. If this is not done, an old (e.g., stale) segment descriptor cached in a segment register may be used after its memory-resident version has been modified.

To locate a byte in a particular segment, a logical address (also called a far pointer) must be provided. A logical address consists of a segment selector and an offset. The segment selector is a unique identifier for a segment. The segment selector may include, for example, a two-bit requested privileged level (RPL) (e.g., bits 1:0), a 1-bit table indicator (TI) (e.g., bit 2), and a 13-bit index (e.g., bits 15:3), Among other things, it provides an offset into a descriptor table (such as the global descriptor table (GDT)) to a data structure called a segment descriptor.

Each segment has a segment descriptor, which specifies the size of the segment, the access rights and privilege level for the segment, the segment type, and the location of the first byte of the segment in the linear address space. The offset part of the logical address is added to the base address for the segment to locate a byte within the segment. The base address plus the offset thus forms a linear address in the processor's linear address space.

The memory 114 may store privileged system software 115. Examples of suitable privileged system software 115 include, but are not limited to, one or more operating systems, a virtual machine monitor (VMM), a hypervisor, and the like, and combinations thereof. The memory 114 may also store one or more user-level applications 116. The user-level applications 116 may optionally include one or more user-level multithreaded applications. As will be explained further below, such user-level multithreaded applications may optionally use instructions disclosed herein to help increase the efficiency of performing user-level multithreading and/or performing user-level task switches.

During operation, the memory 114 may also store a stack 119. The stack 119 is sometimes referred to as the call stack, the data stack, or just the stack. The stack 119 may represent a stack type data structure that is operative to store both data 118 and control 117. The data 118 may represent any of a wide variety of different types of data that software wants to push onto the stack (e.g., parameters and other data passed to subroutines, etc.). Commonly, the control 117 may include one or more return addresses for one or more previously performed procedure calls. These return addresses may represent instruction addresses where the called procedure is to return control flow to when the called procedure finishes and returns.

A stack 119 is a contiguous array of memory locations. It is contained in a segment and identified by the segment selector in a stack segment register (e.g., SS register). When using a flat memory model, the stack 119 can be located anywhere in the linear address space for the program. Items are placed on the stack 119 using the PUSH instruction and removed from the stack 119 using the POP instruction. When an item is pushed onto the stack 119, a stack pointer register (e.g., ESP) is decremented, and then the item is written at the new top of stack 119. When an item is popped off the stack 119, the item is read from the top of stack 119, then the stack pointer register is incremented. In this manner, the stack 119 grows down in memory (towards lesser addresses) when items are pushed on the stack 119 and shrinks up (towards greater addresses) when the items are popped from the stack 119. A program or operating system/executive can set up many stacks 119. For example, in multitasking systems, each task can be given its own stack 119. The number of stacks 119 in a system is limited by the maximum number of segments and the available physical memory. When a system sets up many stacks 119, only one stack 119—the current stack—is available at a time. The current stack is the one contained in the segment referenced by the SS register. The current stack is the one referenced by the current stack-pointer register and contained in the segment referenced by the SS register.

A segment register may include a segment selector that is an identifier of a segment (e.g., a 16-bit identifier). This segment selector may not point directly to the segment, but instead may point to the segment descriptor that defines the segment.

The segment descriptor may include one or more of the following:

1) a descriptor type (S) flag—(e.g., bit 12 in a second doubleword of a segment descriptor) that determines if the segment descriptor is for a system segment or a code or data segment.

2) a type field—(e.g., bits 8 through 11 in a second doubleword of a segment descriptor) that determines the type of code, data, or system segment.

3) a limit field—(e.g., bits 0 through 15 of the first doubleword and bits 16 through 19 of the second doubleword of a segment descriptor) that determines the size of the segment, along with the G flag and E flag (for data segments).

4) a G flag—(e.g., bit 23 in the second doubleword of a segment descriptor) that determines the size of the segment, along with the limit field and E flag (for data segments).

5) an E flag—(e.g., bit 10 in the second doubleword of a data-segment descriptor) that determines the size of the segment, along with the limit field and G flag.

6) a Descriptor privilege level (DPL) field—(e.g., bits 13 and 14 in the second doubleword of a segment descriptor) that determines the privilege level of the segment.

An Requested privilege level (RPL) field in a selector specifies the requested privilege level of a segment selector.

A Current privilege level (CPL) indicates the privilege level of the currently executing program or procedure. The term CPL refers to the setting of this field.

The following are parts of a paging structure: a User/supervisor (U/S) flag—(e.g., bit 2 of paging-structure entries) that determines the type of page: user or supervisor; a Read/write (R/W) flag—(e.g., bit 1 of paging-structure entries) that determines the type of access allowed to a page: read-only or read/write; and an Execute-disable (XD) flag—(e.g., bit 63 of certain paging-structure entities) that determines the type of access allowed to a page: executable or non-executable.

In return-oriented programming (ROP), jump-oriented programming (JOP), and other control flow subversion attacks, the attackers often seek to gain control of the stack 119 to hijack program control flow. One factor that may tend to make the conventional data stack more vulnerable to ROP, JOP, and other control flow subversion attacks is that the stack 119 generally stores both the data 118 and the control 117 (e.g., data and return addresses are commonly mixed together on the same stack 119). Another factor that may tend to make the conventional stack 119 more vulnerable to such attacks is that switching of the stack 119 may generally be performed as an unprivileged operation. Both factors may tend to increase the exposure to control flow subversion due to bugs that allow the stack pointer and/or control flow information (e.g., return addresses) to be modified (e.g., to point to malware/attacker-controlled memory).

One or more shadow stacks 120 may be included and used to help to protect the stack 119 from tampering and/or to help to increase computer security. The shadow stack(s) 120 may represent one or more additional stack type data structures that are separate from the stack 119. As shown, the shadow stack(s) 120 may be used to store control information 121 but not data (e.g., not parameters and other data of the type stored on the stack 119 that user-level application programs 116 would need to be able to write and modify).

The control information 121 stored on the shadow stack(s) 120 may represent return address related information (e.g., actual return addresses, information to validate return addresses, other return address information). As one possible example, the shadow stack(s) 120 may be used to store copies of any return addresses that have been pushed on the stack 119 when functions or procedures have been called (e.g., a copy of each return address in the call chain that has also been pushed onto the regular call stack). Each shadow stack 120 may also include a shadow stack pointer (SSP) that is operative to identify the top of the shadow stack 120. The shadow stack(s) 120 may optionally be configured for operation individually in unprivileged user-level mode (e.g., a ring 3 privilege level) or in a privileged or supervisor privilege level mode (a ring 0, ring 1, or ring 2 privilege level). In one aspect, multiple shadow stacks 120 may potentially be configured in a system, but only one shadow stack 120 per logical processor at a time may be configured as the current shadow stack 120.

As shown, the shadow stack(s) 120 may be stored in the memory 114. Current or active shadow stack(s) 120 may be defined by a linear address range to help detect and prevent stack overflow and/or stack underflow when push and/or pop operations are performed on the shadow stack 120. To help provide additional protection, the shadow stack(s) 120 may optionally be stored in a protected or access-controlled portion of the memory 114 to which the unprivileged user-level applications 116 have restricted and/or incomplete access. Different ways of providing suitable protected portions of memory 114 for storing the shadow stack(s) 120 are possible. The shadow stack(s) 120 are optionally stored in a portion of the memory 114 that is protected by paging access controls. For example, the privileged system software 115 (e.g., an operating system) may configure access permissions (e.g., read-write-execute access permissions) in page table entries corresponding to pages where the shadow stack(s) 120 are stored to make the pages readable but not writable or executable. This may help to prevent user-level instructions, such as store to memory 114 instructions, move to memory 114 instructions, and the like, from being able to write to or modify data in the shadow stack(s) 120. As another option, the shadow stack(s) 120 may optionally be stored in a portion of the memory 114 that is protected with similar access control protections as those used for secure enclaves in Intel® Software Guard Extensions (SGX) secure enclaves, or other protected containers, isolated execution environments, or the like.

Memory 114 may also store thread local storage (TLS) 122.

Referring again to FIG. 1, for example, the processor 101 may be a general-purpose processor (e.g., of the type commonly used as a central processing unit (CPU) in desktop, laptop, or other computer systems). Alternatively, the processor 101 may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor 101 may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

Registers 140 of processor 101 may be used by the logical processor 109, FRED logic 130, and/or shadow stack logic 110. These registers 140 may include the registers of FIG. 'BPE. Examples of registers 140 of processor 101 include one or more of: flags storage (e.g., EFLAGS, RFLAGS, FLAGS, condition code registers, flags are stored with data, etc.), instruction pointer (e.g., EIP, RIP, etc.), current privilege level (CPL), stack pointer, shadow stack 120, control, model specific registers, segment registers (e.g., code segment (CS), data segment (DS), stack segment (SS), GS, etc.), etc. RFLAGS at least includes a trap flag (TF), interrupt enable flag (IF), and a resume flag (RF).

Processor 101 may have one or more instructions and logic to help manage and protect the shadow stack(s) 120. The processor 101 has an instruction set 102. The instruction set 102 is part of the instruction set architecture (ISA) of the processor 101 and includes the native instructions that the processor 101 is operative to execute. The instructions of the instruction set may represent macroinstructions, assembly language instructions, or machine-level instructions that are provided to the processor 101 for execution, as opposed to microinstructions, micro-operations, or other decoded instructions or control signals that have been decoded from the instructions of the instruction set.

As shown, the instruction set 102 includes several FRED supporting instructions 103 including one or more of: an event return to user (ERETU) instruction, an event return to supervisor (ERETS) instruction, a far call instruction, an interrupt return (IRET) instruction, a far jump (JMP) instruction, a far return (RET) instruction, a system call (SYSCALL) instruction, a system enter (SYSENTER) instruction, a write MSR (WRMSR) instruction, an context restore (XRSTORS) instruction, a load into KERNEL_GS_BASE MSR (LKGS) instruction, and/or a resume from system management mode (RSM) instruction. A processor or a core may be provided to perform (e.g., decode and execute) any one or more of these instructions. Furthermore, a method of performing (e.g., decoding and executing) any one of these instructions is provided.

The processor 101 may include at least one processing element or logical processor 108. For simplicity, only a single logical processor is shown, although it is to be appreciated that the processor 101 may optionally include other logical processors. Examples of suitable logical processors include, but are not limited to, cores, hardware threads, thread units, thread slots, and other logical processors. The logical processor 108 may be operative to process instructions of the instruction set 102. The logical processor 108 may have a pipeline or logic to process instructions. By way of example, each pipeline may include an instruction fetch unit to fetch instructions, an instruction decode unit to decode instructions, execution units to execute the decoded instructions, registers to store source and destination operands of the instructions, and the like. The disclosure is not limited to any known type or design of the pipeline. The logical processor 108 may be operative to process (e.g., decode, execute, etc.) any one or more of the call instruction, the return instruction, the save shadow stack pointers instruction, and the restore shadow stack pointers instruction.

As shown, at least some of the logic of the at least one processing element or logical processor 108 may be part of FRED logic 130 of the processor 101. FRED logic 130 is dedicated circuitry. FRED logic 130 utilizes one or more state machines executed by execution units and/or a microcontroller. FRED logic 130 is responsible for delivering events and supporting FRED instructions.

FRED logic 130 uses new transitions that change privilege level (ring transitions). These transitions improve overall performance and response time by replacing event delivery through the interrupt descriptor table (IDT event delivery) and event return by the IRET instruction with lower latency transitions. They also improve software robustness by ensuring that event delivery establishes the full supervisor context, and that event return establishes the full user context.

Details are provided herein for new transitions used by FRED for event delivery and, for returning from events, two FRED return instructions (detailed in more depth below). FRED event delivery can cause a transition from ring 3 to ring 0, but is also used to deliver event incidents to ring 0. A FRED instruction (ERETU) effects a return from ring 0 to ring 3, while the other (ERETS) returns while remaining in ring 0.

In addition to these transitions, examples of an instruction (LKGS) for managing the state of the GS segment register and its support are described. The LKGS instruction can be used by (and perhaps benefit) operating systems that do not use the new ring transitions.

FRED logic 130 supports event delivery. An event that would normally cause IDT event delivery (e.g., an interrupt or exception) will instead establish new context without accessing any of the legacy data structures (e.g., IDT). Variants of existing SYSCALL and SYSENTER instructions may also use FRED event delivery in place of their existing operations as detailed below.

The new processor state defined by FRED is accessible RDMSR and WRMSR regardless of mode. Note that a prefix of "IA32" is not included in all examples for various MSRs.

FRED logic 130 uses a stack level. The current stack level (CSL) is value in the range 0-3 that the processor 101 tracks when CPL=0. Note that the number of stack levels may vary from the four listed. FRED event delivery determines the stack level associated with the event being delivered and, if it is greater than the CSL (or if CPL had not been 0), loads the stack pointer from a FRED_RSP MSR associated with the event's stack level. The FRED return instruction ERETS restores the old stack level. (If supervisor shadow stacks 120 are enabled, the stack level applies also to the shadow-stack pointer, SSP, which may be loaded from a FRED_SSP MSR.)

The shadow-stack pointer detailed above includes a token-management mechanism to ensure shadow-stack integrity when switching shadow stacks 120. This mechanism uses locked read-modify-write operations that may affect worst-case performance adversely. FRED logic 130 uses a modified token-management mechanism that avoids these operations for most transitions. This new mechanism is supported by defining new verified bits in the FRED_SSP MSRs.

Because operating systems may benefit from the LKGS instruction without using FRED logic 130, the two elements are enumerated independently. In some examples, a flag enumerates support for the new FRED transitions. It also enumerates support for new architectural states (MSRs) used by FRED. In some examples, a flag enumerates support for the LKGS instruction.

FRED logic 130 is enabled by setting a bit in a control register. For example, setting bit 32 in CR4. Setting CR4.FRED enables FRED event delivery but only in IA-32e mode (when IA32_EFER.LMA=1). This setting enables the FRED return instructions, but only in 64-bit mode (when IA32_EFER.LMA=CS.L=1).

When CR4.FRED=1, an execution of any of the following instructions in any mode causes an invalid-opcode exception (#UD): SWAPGS, SYSEXIT, and SYSRET.

Figure 2:
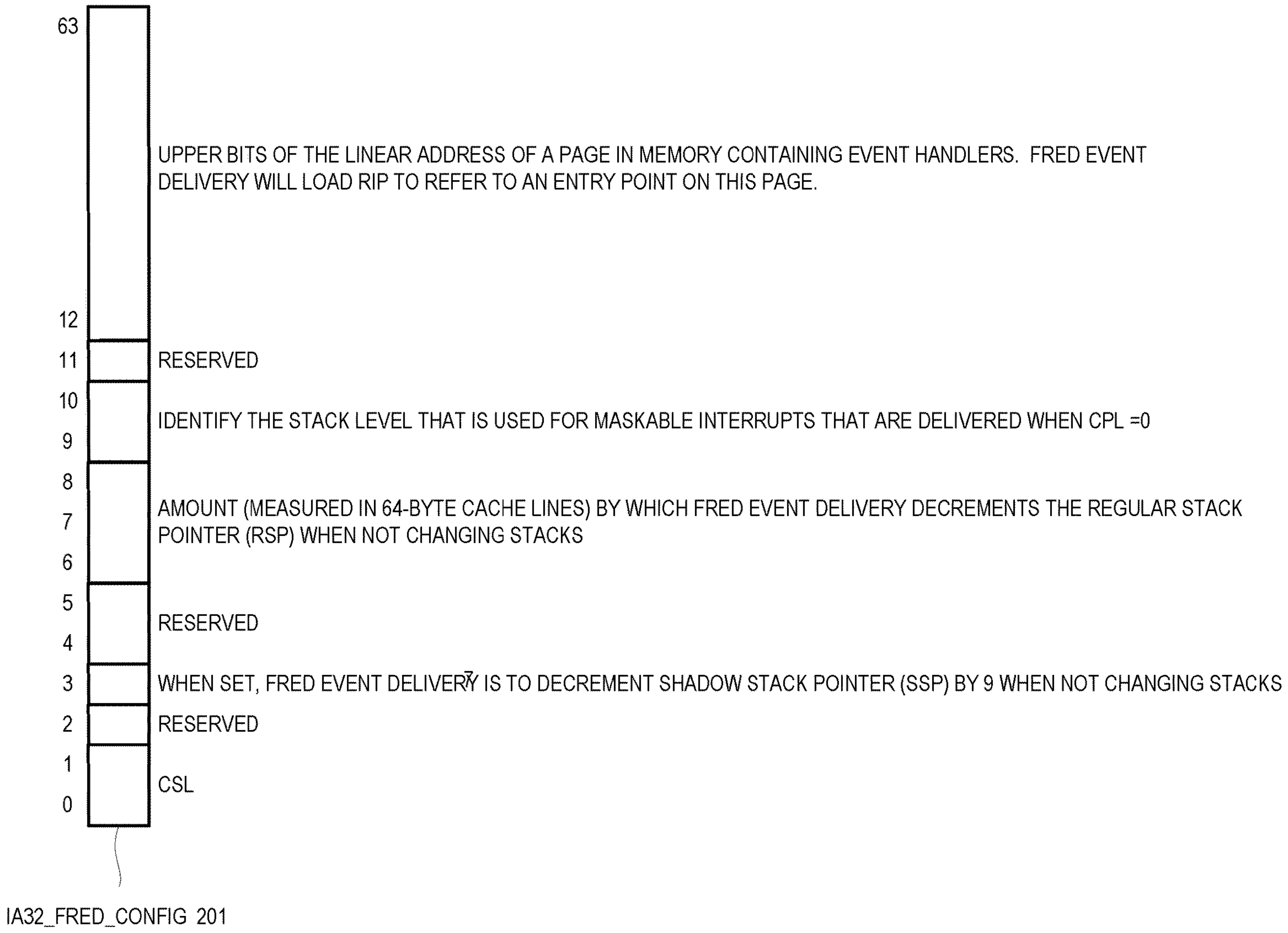
FIG. 2 illustrates an exemplary flexible return and event delivery (FRED) configuration model specific register (MSR).

The registers 140 may include several model specific registers (MSRs) used by FRED logic 130. There may be a FRED configuration MSR (e.g., IA32_FRED_CONFIG or FRED_CONFIG). FIG. 2 illustrates an example of a FRED configuration MSR 201. This MSR 201 is organized as follows:

1) Bits 1:0 identify the current stack level (CSL). This 2-bit value is manipulated and used by FRED event delivery and the FRED return instructions. Software can modify the CSL using a write MSR (WRMSR) instruction.
2) Bit 2 is reserved.
3) Bit 3 indicates, if set, that FRED event delivery should decrement the shadow stack pointer (SSP) by 8 when not changing stacks.
4) Bits 5:4 are reserved.
5) Bits 8:6 identify the amount (measured in 64-byte cache lines) by which FRED event delivery decrements the regular stack pointer (RSP) when not changing stacks.
6) Bits 10:9 identify the stack level that is used for markable interrupts that are delivered while CPL=0.
7) Bit 11 is reserved.
8) Bits 63:12 contain the upper bits of the linear address of a page in memory 114 containing event handlers. FRED event delivery will load RIP to refer to an entry point on this page.

A write to this MSR 201 using WRMSR causes a general-protection exception (#GP) if its source operand sets any reserved bits or if it is not canonical relative to the processor's maximum linear-address width.

Figure 3:
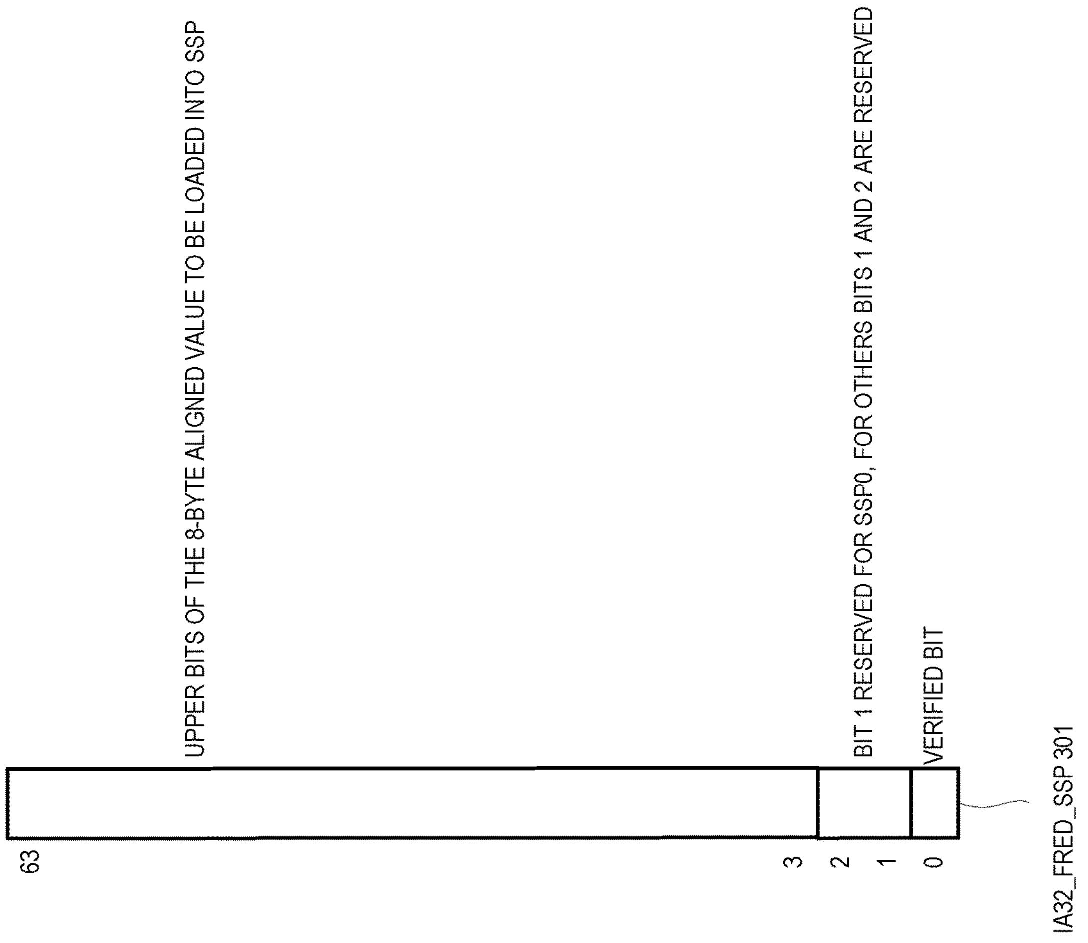
FIG. 3 illustrates an exemplary FRED shadow stack pointer (SSP) MSR.

FIG. 3 illustrates a FRED_SSP MSR 301. There may be 4 such MSRs 301 (e.g., IA32_FRED_SSP0-IA32_FRED_SSP3).

When supervisor shadow stacks are enabled and FRED event delivery causes a transition from ring 3 or a change to the CSL, the FRED logic 130 loads SSP from the FRED_SSP MSR corresponding to the new stack level. Note that an existing MSR for SSP (e.g., IA32_PL0_SSP) may correspond to one of the FRED_SSP MSRs (e.g., IA32_FRED_SSP0 is IA32_PL0_SSP). If supervisor shadow stacks are enabled and FRED event delivery causes a transition from ring 3 or a change to the CSL, the FRED logic loads SSP from the FRED_SSP MSR corresponding to the new stack level. Each of the FRED_SSP MSRs is organized as follows (and shown in FIG. 3):

1) Bit 0 is the MSR's 301 verified bit. This bit is used by the token management performed by FRED event delivery and by executions of ERETS and ERETU. Note that the verified bits exist only in the FRED_SSP MSRs and not in SSP itself. On processors that do not enumerate support for FRED, WRMSR to IA32_PL0_SSP enforces 4-byte alignment and thus treats bits 1:0 as reserved bits. On processors that enumerate support for FRED, WRMSR to IA32_PL0_SSP does not cause #GP due to bit 0 being set in its source operand. See below for how WRMSR treats bit 0 of this MSR.
2) For each of IA32_FRED_SSPi (1<=i<=3), bits 2:1 are reserved. For IA32_PL0_SSP, bit 1 is reserved but bit 2 is not.
3) Bits 63:3 contain the upper bits of the 8-byte aligned value to be loaded into SSP.

In some examples, a WRMSR to any of these MSRs will cause a general-protection exception (#GP) if its source operand is not 64-byte aligned or if it is not canonical relative to the processor's maximum linear-address width. A WRMSR to any of these MSRs always clears bit 0 of the MSR, regardless of the value of the instruction's source operand. The WRMSR instruction ignores bit 0 of its source operand, so attempting to set bit 0 does not cause WRMSR to fault.

The registers 140 of processor 101 may include a plurality of FRED_RSP MSRs. For example, IA32_FRED_RSP0, IA32_FRED_RSP1, IA32_FRED_RSP2, and IA32_FRED_RSP3. If a FRED event delivery causes a transition from ring 3 or a change to the CSL, the RSP MSR is loaded from the FRED_RSP MSR corresponding to the new stack level. A WRMSR to any of these MSRs causes a general-protection exception (#GP) if its source operand is not canonical relative to the processor's maximum linear-address width.

There is an additional configuration register (e.g., IA32_FRED_STKLVLS MSR). This 64-bit register contains a 2-bit field for each of 32 exception vectors. A double fault exception (DF, vector 8) is assigned stack level 2, the page fault exception (PF, vector 14) stack level 0, and the machine check exception (MC, vector 18) stack level 3.

Additional MSRs that FRED logic 130 may use include but are not limited to: a register to store a system call target address (e.g., IA32_STAR); a register to store a system call flag mask (e.g., IA32_FMASK); a register to store a swap target of a base address of GS (e.g., IA32_KERNEL_GS_BASE); and a register to store a privilege level. How these registers may be used is detailed below.

The processor 101 includes shadow stack logic 110 (e.g., circuitry, state machine, etc.) to implement shadow stack capabilities.

Control-flow transitions that change the CPL are known informally as ring transitions, and there are two principal types: 1) transitions that increase privilege (by decreasing the CPL), which include transitions using interrupt and trap gates in the interrupt descriptor table (IDT), executions of the far CALL instruction that access call gates, and executions of system call (such SYSCALL or SYSENTER) instructions; and 2) transitions that decrease privilege (by increasing the CPL), such as an interrupt return (IRET) instruction, a far RET instruction, return from system call instructions (e.g., SYSEXIT or SYSRET).

Because the CPL is manifest in the CS and SS segment registers, ring transitions always modify the CS and SS segment registers. GS is another segment that software manages at the time of ring transitions. This is because 64-bit operating systems use the GS segment to support thread-local storage (TLS) 122: the GS base address identifies the location of the TLS 122. User and supervisor software use TLS 122 at different addresses, so the base address of the GS segment will differ depending on CPL.

Unlike CS and SS, GS is typically not modified by existing ring transitions. This means that, after a transition to ring 0, the GS base address will still reference the user TLS 122. For this reason, supervisor software should update the GS base address before it can access its own TLS 122. Similarly, it should switch the GS base address back to the user value before returning to user software. The SWAPGS instruction supports efficient updates of the GS base address.

The context managed by event delivery and return is often limited to the instruction pointer (and code segment) and stack pointer (and stack segment). The context of the event handlers of modern operating systems also includes the pointer to the OS kernel's thread-local storage (operating systems on x86 microprocessors use the GS segment for this). Event delivery and return on x86 microprocessors does not manage the GS segment. To address this, a new instruction was introduced (SWAPGS) that allows an event handler to establish the proper value for the GS segment (if necessary) shortly after event delivery and to restore the value of the interrupted context shortly before event return. (Because of how operating systems use the GS segment, it is necessary to execute SWAPGS only after event delivery from user software and only before an event return to user software.)

While the SWAPGS instruction does address the above for thread-local storage, it provides only a partial solution. Sue to the fact that SWAPGS should be executed only incident to an event delivery or return that changes privilege level, it is essential that an event handler be able to determine reliably whether it is handling an event whose delivery changed privilege level.

Figure 4:
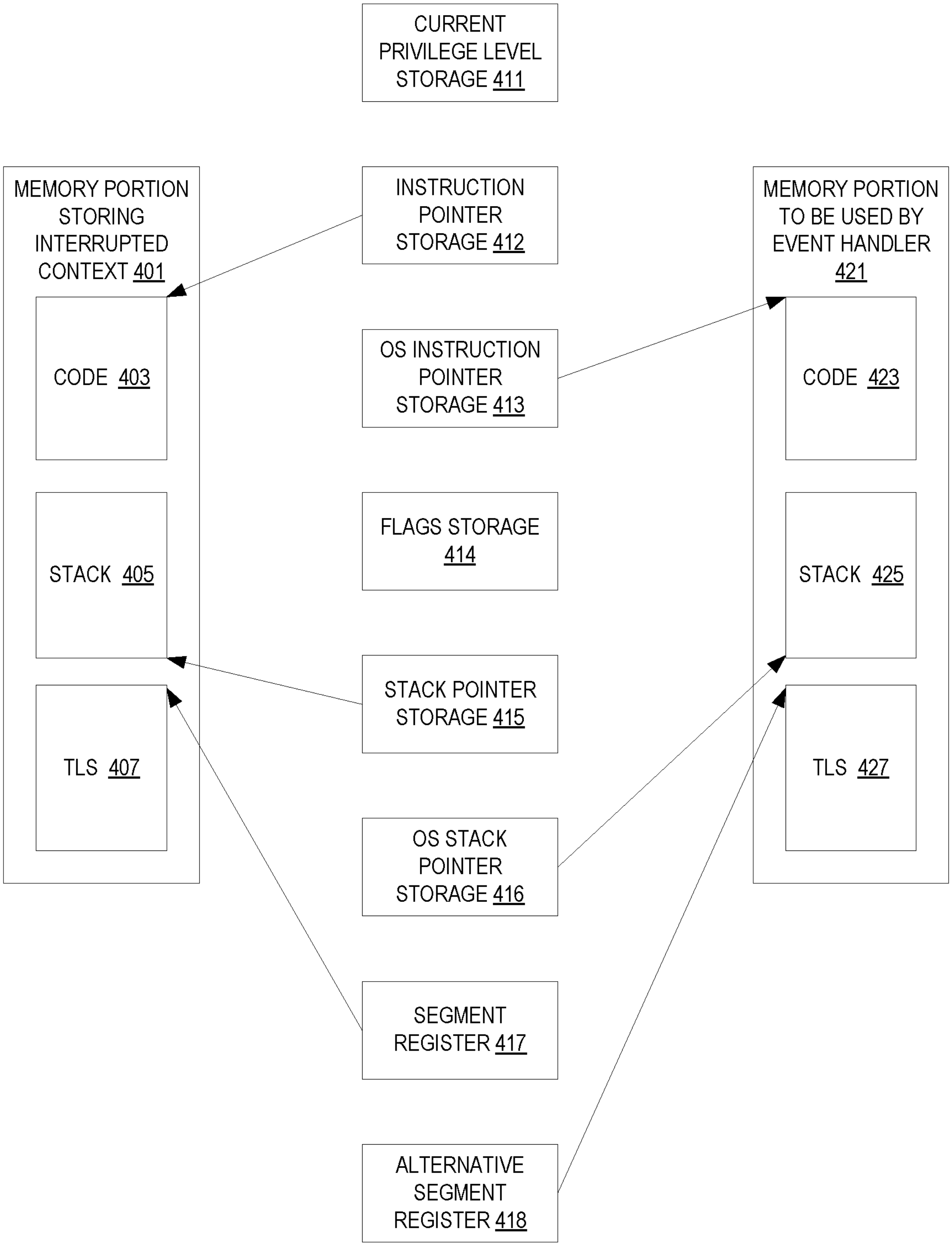
FIG. 4 illustrates an example configuration before event delivery.

FIG. 4 illustrates an example configuration before event delivery. The event delivery may be handled by FRED logic 130. In general, the configuration illustrated in FIG. 4 is independent from the entities and components shown in the other figures and may be considered independently. On the left are illustrated regions of memory 401 in use by the interrupted context for instructions (code) 403, stack 405, and TLS 407. In this configuration, the original privilege level (CPL) is 3 (stored in current privileged level storage 411), indicating a user application. The instruction-pointer register (RIP) (of instruction pointer storage 412) points to the interrupted context's code 403; the stack-pointer register (RSP) 415 points to the bottom of its current stack 405; and the GS segment register 417 points to its TLS 407. The interrupted context also includes the flags storage (RFLAGS) 414.

In addition to the interrupted context, FIG. 4 also illustrates registers and memory pertaining to the OS and its event handler 421. OS RIP 413 and OS RSP 416 are OS-managed configuration registers that point to the event handler's code 423 and stack 425, respectively. Also illustrated is an alternative GS segment register 418, which points to the OS's TLS 427.

Figure 5:
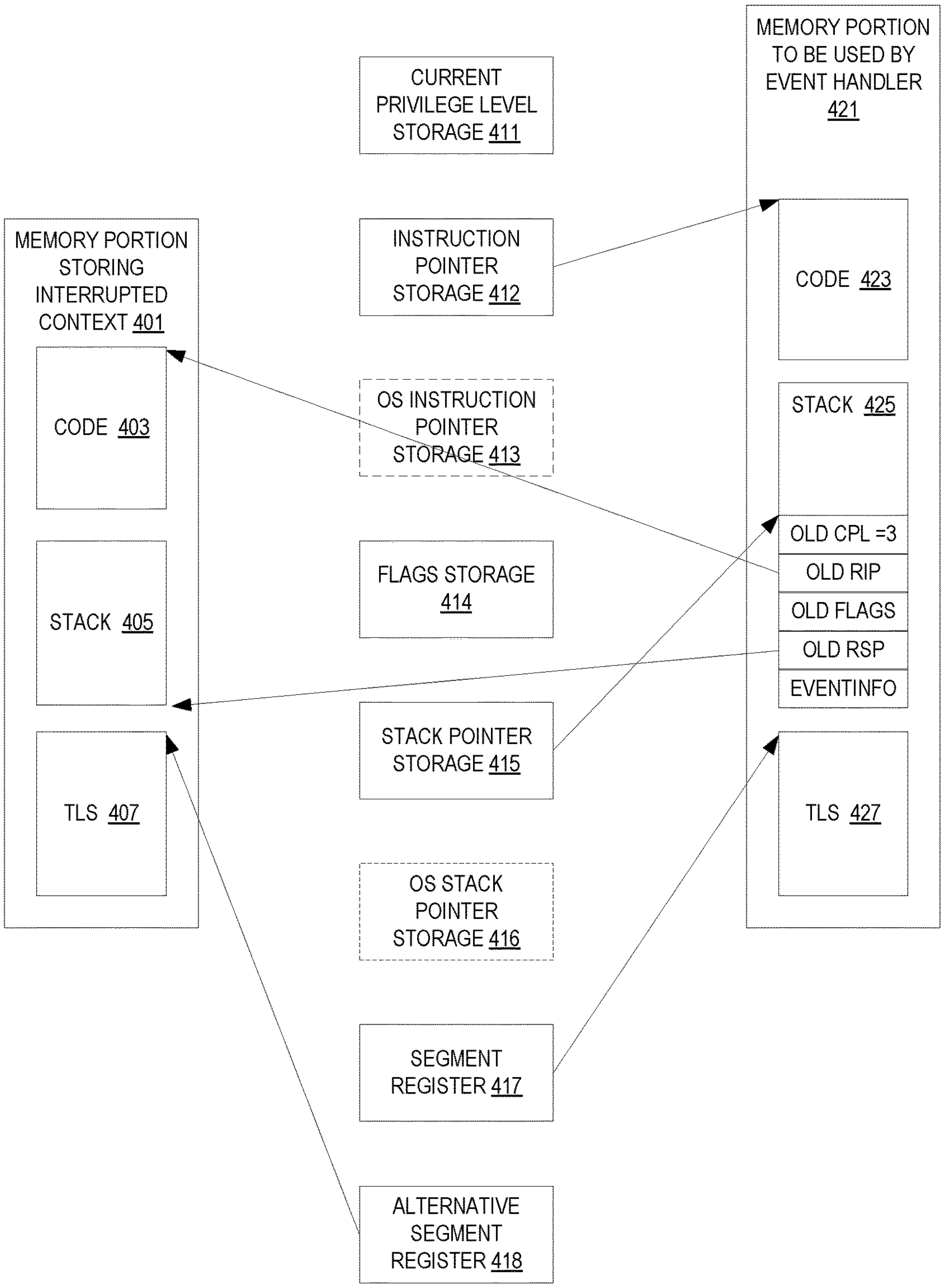
FIG. 5 illustrates the example configuration after event delivery.

FIG. 5 illustrates the example configuration after event delivery. The event delivery is handled by FRED logic 130. In general, the configuration illustrated in FIG. 5 is independent from the entities and components shown in the other figures and may be considered independently. The CPL has been updated to 0, appropriate for an OS event handler. RIP 412 and RSP 415 have been updated to point to the code 423 and stack 425 used by the OS event handler. The flags register 414 has been cleared. Pushed onto the stack 425 of the OS event handler are information about the event just delivered (in this case, indicating a page fault on the indicated address) and the old values of the stack pointer, flags register, instruction pointer, and CPL.

For the TLS, the values of the GS segment register 417 and the alternative GS segment register 418 have been swapped. While similar to what might be done with an existing SWAPGS instruction, examples detailed herein do this swapping as part of event delivery, but only if event delivery is changing the CPL from 3 to 0. If CPL had already been 0 prior to event delivery, event delivery would not change the GS segment register, as it would already be pointing to the TLS of the OS. More specific details of event delivery are detailed below.

Stacks are useful data structures for saving information because of their dynamic nature. New information can be "pushed" onto a stack without corrupting older information already on the stack. When the new information is no longer needed (because the software routine consuming is returning to an already-running older routine), the stack can be "popped," exposing the older information appropriately. Because the contents of a stack (and the current "stack pointer," referencing the current "top" of the stack) change dynamically as a software thread operates, each thread of control is typically associated with its own stack in memory.

In addition to use by software, a CPU (or core thereof) can use a stack (e.g. stack 119) when delivering events such as interrupts and exceptions. The CPU (or core thereof)'s event delivery mechanism can push onto the stack (e.g. stack 119) the values of certain registers defining the software context that was executing at the time the event occurred. (Event delivery may also push onto the stack (e.g. stack 119) information about the nature of the event being delivered.) The advantage of pushing such information on a stack (rather than saving it at a fixed location in memory or in dedicated registers) is that delivery of another event later will not overwrite the saved information. CPUs typically define event-return instructions that reverse this process, popping the old values from the stack (e.g. stack 119) and restoring them into the corresponding registers. A secondary "shadow" stack (e.g. stack 120) can be used similarly to increase control-flow integrity.

The memory stack used by the CPU (or core thereof) for event delivery and return is controlled by the OS. There are a variety of reasons for which an OS might want event delivery to use different stacks on different occasions. The following are a few examples:

- Delivery of a first event (e.g., interrupt) may encounter a second event (e.g., page fault) while saving information on the stack. (The second event is called a nested fault.) If delivery of the nested fault used the same stack, and if the second event was a result of an access to the stack, the problem could recur indefinitely. An OS would prefer to identify such a situation if it could use a mechanism by which such nested faults might use a different stack.
- An OS may allocate a stack in supervisor memory for every application software thread, and it may prefer to use such a per-thread stack when handling events triggered by a software thread (e.g., a system call). The OS may also allocate a stack for every processor (or hardware thread), and it may prefer to use the local processor's stack when handling events that occur asynchronously (e.g., I/O interrupts).
- Some CPUs define certain events specifically for debug (e.g., debug exceptions generated by breakpoints, single-stepping, etc.). During debug (especially that of the OS kernel), it may be advantageous for the debugger to operate in a separate context. For that reason, an OS may want delivery of debug-related events to use a different stack than that used for other events.

Existing instruction-set architectures (ISAs) provide different mechanisms for invoking event handlers with different event-specific stacks. The discussion above focused on OS-configured mechanisms to be used when event delivery changes to a new stack. There are also situations in which event delivery does not change stack. This may occur, for example, when execution in ring 0 encounters a page fault. In these cases, event delivery pushes information on the current stack, immediately above whatever data was being accessed when the event occurred.

Because of this behavior, an OS cannot use the memory (e.g. memory 114) immediately above the "top of stack" to store temporary data. If it did, that data would be lost upon delivery of an exception or interrupt, as that delivery would overwrite the temporary data. The implication is that an OS cannot use a "red zone" above the stack the way that application software can.

Some ISAs manage event-handler stacks based on privilege level (aka ring). An OS can allocate a stack (perhaps per software thread) for each ring at which an event handler can be invoked and place pointers to those stacks in a CPU (or core thereof)-defined data structure called that TSS. If delivery of an event changes ring, the stack pointer is loaded from that data structure (selecting the pointer assigned to the new ring).

OSes generally configure all event handlers to use maximum privilege (ring 0), always selecting the same OS stack pointer. Some architectures allow different disposition of different events (based on the event's numerical vector), but do not normally allow different stacks to be used. An OS can specify a different stack for an event by configuring that event to use a task gate. An event delivered using a task gate uses a stack by switching to a different TSS.

Task gates thus allow an OS to indicate that certain events (based on vector) are to use different stacks. They do not, by themselves, allow an OS to specify that a special stack should be used for a nested fault (see the problem statement above). However, some architectures specify that, in certain situations, a nested fault leads to creation of a double fault, a special fault that has a unique vector. An OS can configure the double-fault vector to use a task gate, ensuring that (in most cases of concern) a nested fault will invoke an event handler with an alternative stack.

Some architectures do not support task gates but define another mechanism that supports event-specific stacks. Specifically, the TSS is extended to include an interrupt stack table (IST), which contains 7 additional stack pointers. An architecture also associates each event vector with a 3-bit IST index. If the vector of an event being delivered has a non-zero IST index, the stack pointer is loaded from the referenced entry in the IST (rather than the standard stack pointer defined for ring 0).

A 64-bit OS using an architecture can choose a non-zero IST index for any event whose handler requires a different stack. Just as an OS using a 32-bit architecture might use a task gate for the double-fault vector, a 64-bit OS using a 64-bit architecture would likely use a non-zero IST index for that vector.

These solutions have a variety of disadvantages. The task-gate mechanism was cumbersome to use and did not perform well. The IST mechanism, while lighter weight, brings challenges regarding reentrance and event nesting. Suppose that double fault (#DF) and machine check (#MC) were two exceptions for which an OS is using the IST mechanism. The OS must assign each a different IST index. Suppose that it did not; then delivery of each fault will load the same numerical value into the stack pointer. If #MC were delivered first, its handler will push data onto the new stack, updating the stack pointer. If a #DF is then delivered, the stack pointer will be reloaded with the same value that was loaded when the #MC was delivered. If the #DF handler pushes data on the stack, it will overwrite the data that had been written by the #MC handler. If the #DF handler eventually returns to the #MC handler, execution will be corrupted.

Even if the OS assigns a different IST index for every desired event vector, the same problem can occur if two events with the same vector are delivered consecutively. This is because, as in the previous paragraph, delivery of the second event will reload the stack pointer with the same value that was used by delivery of the first event.

Operating systems using the IST mechanism endeavor to ensure that successive events with the same vector (configured to use the IST) do not occur. Nevertheless, these software approaches may be fragile and introduce vulnerabilities into the OS.

Neither the task-gate mechanism nor the IST mechanism prevents event delivery from overwriting any data that an OS might be storing in a "red zone" above the top of the OS's memory stack.

Specified numbers of stack levels may be supported by a processor (such as processor 101), each associated with a different stack in supervisor memory, and each specified with a different value of the stack pointer. At any point in the time, the CPU (or core thereof) tracks the current stack level. An example associates each event occurrence with an event stack level. The event stack level may be determined by the event vector, the current privilege level, whether the event is nested, or some combination thereof. When delivering an event, the CPU (or core thereof) compares the event stack level with the current stack level. If the event stack level is greater, the CPU (or core thereof) switches stacks to the event stack level; otherwise, it continues operating on the same stack. A complementary mechanism may be provided to adjust the current stack pointer to support an OS "red zone."

Using FRED as detailed herein may solve the general problem of allowing an OS to specify flexibly which stack should be used in what situation. FRED corrects the central problem with the existing IST mechanism by preventing corruption of stack data when a second event occurs. This is because there is no stack switch if a second event arrives at the same stack level: the stack pointer is not reloaded, and no data is overwritten. Operating systems vendors have identified the risk of the overwriting of stack data as a major security concern, and the examples detailed address that concern.

Most simply, an example defines a fixed number of stack levels (e.g., 4). It would define a mechanism by which an OS can specify a stack pointer for each stack level. This might be an in-memory data structure containing locations at which the OS can store the stack pointers (e.g., an extension of redefinition of the existing TSS) or it could be a set of registers to contain these per-level stack pointers. A processor (e.g., processor 101) that supports multiple concurrent stacks (e.g., a regular stack and a shadow stack) would correspondingly support multiple stack pointers (e.g., two, regular and shadow) for each stack level.

An OS may allow to specify the stack level for each event. The event stack level could be defined based on any or all of the following (or other conditions): 1) the current privilege level at the time the event occurred; 2) the type of event (e.g., exception versus interrupt); 3) the event number (or vector); 4) whether the event was encountered during delivery of an earlier event; and/or 5) event-specific details (e.g., the specific permission violations causing a page fault).

An example might define various mechanisms for the OS to use to specify event stack levels. For example, there could be a configuration register that specifies the stack level for each exception vector. In contrast, an example might allow a single (OS-configurable) stack level to be configured in a different register and use that for all interrupts (it is often the case that there are many more interrupt vectors than exception vectors).

The CPU (or core thereof) will always track the current stack level (e.g., using FRED logic 130). When an event arrives, the CPU (or core thereof) first determines the event stack level based on OS configuration outlined above. The event stack level is then compared to the current stack level. If the event stack level is greater, it becomes the new current stack level. The stack pointer(s) for that stack level is (are) loaded as configured by the OS, and information about the event is pushed onto the referenced stack. If the event stack level is not greater than the current stack level, the stack pointer(s) is (are) not loaded, and information about the event is pushed onto the current stack.

Special treatment may apply for events that cause a change of privilege level (e.g., from user to supervisor operation). That is because such transitions should also cause a change of stack (an OS should not use the user stack). Examples will likely load the stack pointer(s) for the event stack level whenever event delivery changes privilege level.

To enable the CPU (or core thereof) to track the current stack level properly, an example may save the old stack level on the stack when it saves other return state (e.g., the old instruction and stack pointers). If this is done, a return from the event handler can then restore the old stack level when it restores that return state.

This stack-level mechanism can give an OS the desired control over what stack is used when handling different events in different contexts. It offers a substantial benefit over the existing IST mechanism in how it treats consecutive occurrences of the same kind of event (with the same IST index or same stack level). With the IST mechanism, these occurrences will result in data corruption as described earlier. With stack levels, the second occurrence will simply push its information on top of the current stack, preserving the information pertaining to the first event.

This protection against corruption results also because the stack levels are ordered: event delivery may increase the stack level, but it will never reduce it. That ensures that, once the CPU (or core thereof) transitions from stack level 1 to stack level 2 (for example), no future event delivery will use stack level 1 (until software effects a return from an event handler). Specifically, if an event with event stack level 1 arrives while the CPU (or core thereof) is already at stack level 2, the new event will be delivered on the stack at level 2. The CPU (or core thereof) will not switch back to the stack at level 1. (With the IST mechanism, this would switch back to stack 1, corrupting data in memory.)

Mechanisms may be provided to protect OS data about the current "top of stack." An example could define a configuration register (or other mechanism) in which the OS can specify the amount of data (e.g., measured in bytes) that it wants protected above the current stack (e.g., stack 119).

When event delivery does not change stack (e.g., because the event stack level does not exceed the current stack level), the CPU (or core thereof) will first adjust the current stack pointer by the OS-specified size of the protected area. Only after the stack pointer is adjusted will the CPU (or core thereof) save information for the event being delivered. By adjusting the stack pointer in this way, the CPU (or core thereof) ensures that any existing data in the protected region will not be overwritten.

Because there are changes to the stack pointer (e.g., loading it from OS configuration, on a change of stack level, or by adjusting it as described in the previous paragraph), it is expected that the current stack pointer will be included in the return state saved by event delivery. If this is done, return instructions can be defined to restore the old stack pointer properly.

Figure 6:
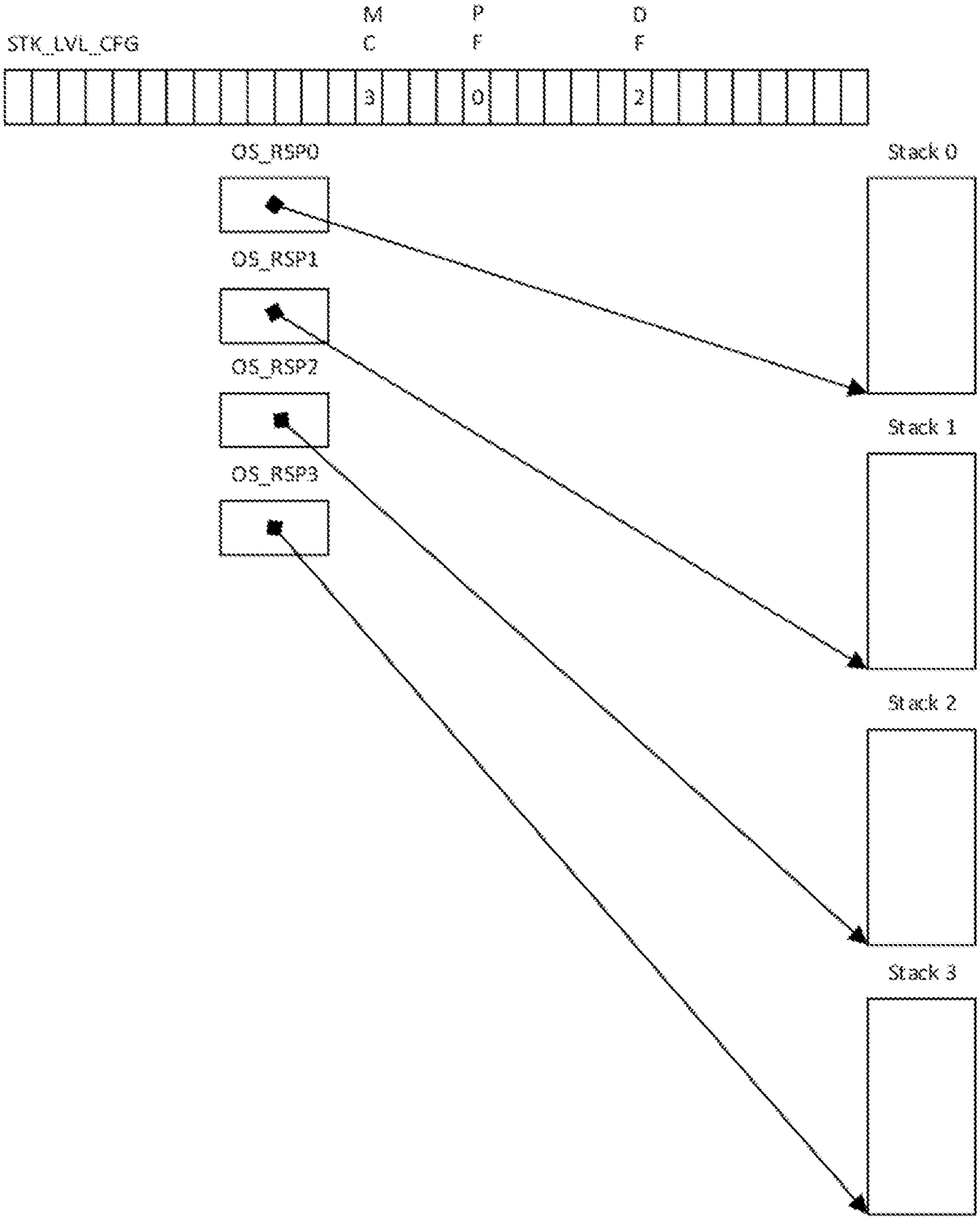
FIG. 6 illustrates exemplary elements of OS configuration.

FIG. 6 illustrates elements of OS configuration. This example supports four stack levels. The right of the figure illustrates four separate regions of memory, one for each stack supported by the OS. By way of example, there are provided a first stack0 602, a second stack1 604, a third stack2 606 and a fourth stack3 608. The example supports four configuration registers (labeled OS_RSP0 603, OS_RSP1 605, OS_RSP2 607, and OS_RSP3 609), each pointing to the base of one of the four stacks 602, 604, 606, 608.

There may be an additional configuration register (e.g., IA32_FRED_STKLVLS MSR 610). This 64-bit register 610 contains a 2-bit field for each of 32 exception vectors. In the illustration, the double fault exception (DF, vector 8) is assigned stack level 2, the page fault exception (PF, vector 14) stack level 0, and the machine check exception (MC, vector 18) stack level 3.

When one of these exceptions occurs, the CPU (or core thereof) will determine the event stack level by using the exception vector to select a 2-bit value (0-3) from the IA32_FRED_STKLVLS register 610. Delivery of the event then uses that event stack level, combined with the current stack level (not illustrated) to determine which stack (e.g., first stack0 602, second stack1 604, third stack2 606 or fourth stack3 608) is used to deliver the event. For example, an exception with vector v (or for a special interrupt, to which the ISA may assign a fixed vector not used for any exception) that occurs while CPL=0, FRED event delivery ensures that the new stack level is at least the value of IA32_FRED_STKLVLS[2v+1:2v].

When FRED transitions are enabled (e.g., CR4.FRED=IA32_EFER.LMA=1), interrupt (e.g., IDT) event delivery of exceptions and interrupts is replaced with FRED event delivery. In addition, legacy operations of certain instructions (e.g., SYSCALL and SYSENTER) may be replaced with FRED event delivery. Note that these changes do not affect the processor's handling of exceptions and interrupts prior to event delivery. For example, any determination that an event causes a virtual machine (VM) exit or is converted into a double fault occurs normally.

A functionality of FRED event delivery is to establish a new context, that of the event handler in ring 0, while saving the old context (such as the context when the event happened) for a subsequent return. Some parts of the new context have fixed values, while others depend on the old context, the nature of the event being delivered, and software configuration.

Figure 7:
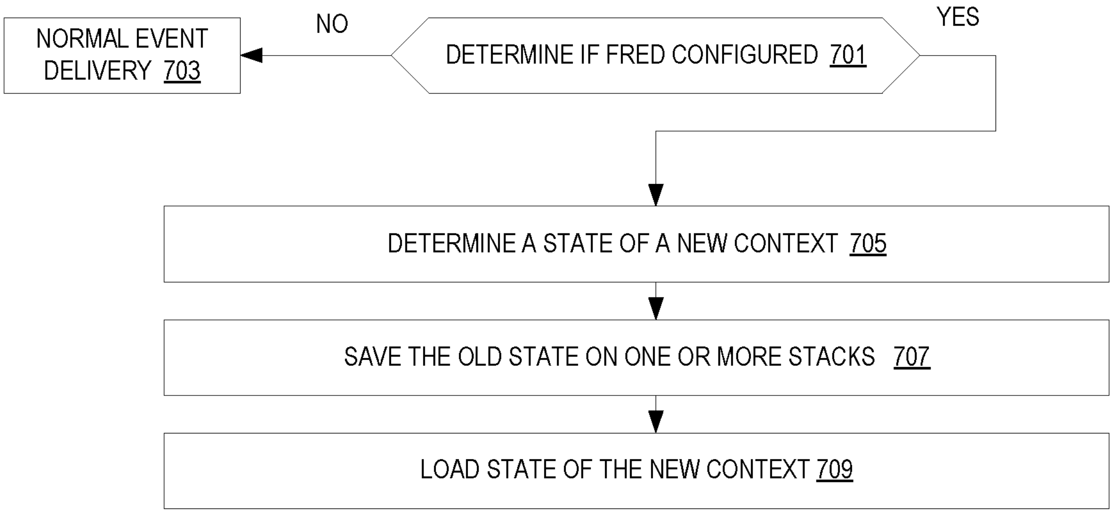
FIG. 7 illustrates an exemplary method for FRED event delivery.

FIG. 7 illustrates an example of a method for FRED event delivery. This method is to be performed by FRED logic 130, for example. At 701, a determination of if FRED event delivery is configured is made. For example, is CR4.FRED=IA32_EFER.LMA=1? If not ("NO" in 701), then non-FRED event delivery is used at 703.

When FRED is configured ("YES" in 701), a determination of a state of a new context is made at 705. A context of an event handler invoked by FRED event delivery includes one or more segment registers (e.g., CS and SS), an instruction pointer (e.g., RIP), a flags register (e.g., EFLAGS, RFLAGS), the stack pointer (RSP), and the base address of a segment (e.g., GS.base). The context also includes the shadow-stack pointer (SSP) if supervisor shadow stacks are enabled.

FRED event delivery establishes this context by loading these registers when necessary. The values to be loaded into RIP, RFLAGS, RSP, and SSP depend upon the old context, the nature of the event being delivered, and software configuration.

FRED event delivery uses two entry points, depending on the CPL at the time the event occurred. This allows an event handler to identify the appropriate return instruction (e.g., ERETU or ERETS). Specifically, the new RIP value that FRED event delivery establishes is (IA32_FRED_CONFIG &~FFFH) for events that occur while CPL=3 and (IA32_FRED_CONFIG & ~FFFH)+26 for events that occur while CPL=0.

A new RFLAGS value established by FRED event delivery may be the old value with bits cleared in positions that are set in the IA32_FMASK MSR and at certain fixed positions defined by the ISA (the latter ensuring that specific bits, e.g., RFLAGS.RF and RFLAGS.TF will be zero).

FRED transitions may support multiple (e.g., 4) different stacks for use in ring 0. The stack currently in use is identified with a 2-bit value called the current stack level (CSL).

FRED event delivery determines the event's stack level and then uses that to determine whether the CSL should change. An event's stack level is based on the CPL, the nature and type of the event, the event's vector (for some event types), and/or MSRs configured by system software: 1) if the event occurred while CPL=3, was not a nested exception encountered during event delivery, and was not a double fault (#DF), the event's stack level is 0; 2) if the event occurred while CPL=0, was a nested exception encountered during event delivery, or was a #DF, at least one the following items apply: if the event is a markable interrupt, the event's stack level is the stack level for interrupts (in IA32_FRED_CONFIG[10:9]); if the event is an exception or a special interrupt with a vector fixed by the ISA (e.g., NMI), the event's stack level is the value IA32_FRED_STKLVLS[2v+1:2v], where v is the event's vector (in the range 0-31); and the stack level of all other events is 0.

If the event occurred while CPL=3, the new stack level is the event's stack level; otherwise, the new stack level is the maximum of the CSL and the event's stack level.

After determining the new stack level, a new RSP value is identified as follows: 1) if either the CPL or the stack level is changing, the new RSP value will be that of the FRED_RSP MSR corresponding to the new stack level; and 2) otherwise, the new RSP value will be the current RSP value decremented by the OS-specified size of the protected area on the stack. In either case, the new RSP value may then be aligned to a 64-byte boundary.

If supervisor shadow stacks are enabled, a new SSP value may be determined as follows: if either the CPL or the stack level is changing, the new SSP value will be that of the FRED_SSP MSR corresponding to the new stack level. The new SSP value may be subject to the following: a general-protection fault (#GP) occurs if the new stack level is 0 and IA32_PL0_SSP[2]=1. Because bit 0 of each FRED_SSP MSR is the MSR's verified bit, that bit is not loaded into SSP and instead bit 0 of the new SSP value is always zero. Otherwise, the new SSP value will be the current SSP value decremented by the OS-specified size of the protected area on the stack.

At 707, at least the old state is saved onto one or more stacks. FRED event delivery may save information about the old context on the stack of the event handler. The top 40 bytes of the event handler's stack may contain the context in the same format as that following IDT event delivery. FRED event delivery may also save information about the event being delivered as well as auxiliary information that will guide a subsequent return instruction. When supervisor shadow stacks are enabled, FRED event delivery may also save information on the event handler's shadow stack. Note that memory accesses used to store information on the stacks may be performed with supervisor privilege.

FRED event delivery may save 64 bytes of information on the regular stack. Before doing so, RSP is loaded with the new determined value discussed above and this value is used to reference the new stack. Note that if FRED event delivery incurs a nested exception or VM exit after this point, the nested exception or VM exit restores the value that was in RSP before the first event occurred before the CPU delivers that nested exception or VM exit.

One or more of the following are pushed onto the stack (e.g., first stack0 602, second stack1 604, third stack2 606 or fourth stack3 608): the first 8 bytes pushed (bytes 63:56 of the 64-byte stack frame) are always zero; the next 8 bytes pushed (bytes 55:48) contain event data and are defined as follows: 1) if the event being delivered is a page fault (#PF), the value pushed is that which the page fault loads into a control register such as CR2 (generally, this is the faulting linear address); 2) if the event being delivered is a debug exception, event data identifies the nature of the debug exception (for example, bits 3:0—when set, each of these bits indicates that the corresponding breakpoint condition was met. Any of these bits may be set even if its corresponding enabling bit in DR7 is not set; bits 10:4 are not currently defined; bit 11 indicates that the cause of the debug exception was acquisition of a bus lock; bit 12 is not currently defined; bit 13 i bit indicates that the cause of the debug exception was "debug register access detected."; bit 14 is indicates that the cause of the debug exception was the execution of a single instruction; bit 15 is not currently defined; bit 16 indicates that a debug exception (#DB) or a breakpoint exception (#BP) occurred inside an RTM region while advanced debugging of transactional regions was enabled; bits 63:17 are not currently defined; 3) if the event being delivered is a device-not-available exception, the value pushed is that which the device-not-available exception establishes in an extended feature disable (XFD) error MSR (e.g., IA32_XFD_ERR MSR) which is loaded when an extended feature disable causes a device-not-available error; and 4) for any other event, the value pushed is zero.

The next 8 bytes pushed (bytes 47:40) contain event information. These 64 bits of information have the following format in some examples: bits 15:0 contain the error code (defined only for certain exceptions; zero if there is none); bits 31:16 are not used and are saved as zero; bits 39:32 contain the event's vector (in some examples, for a system call or system enter instruction which use FRED event delivery but not IDT event delivery), vectors 1 and 2 are used, respectively); bits 47:40 are not used and are saved as zero; bits 51:48 encode the event type as follows: 0=external interrupt; 2=non-markable interrupt; 3=hardware exception (e.g., page fault); 4=software interrupt (INT n); 5=privileged software exception (INT1); 6=software exception (INT3 or INTO); and 7=other event (used for example SYSCALL and SYSENTER); bits 55:52 are not used and are saved as zero; bit 56 is set to 1 to indicate that the event was incident to enclave execution (specifically, it is set in any of the following cases: the event occurred while the logical processor was in enclave mode, the event was injected by VM entry and the guest interruptibility-state field in the VMCS indicates an "enclave interruption" (bit 4 of the field is 1), the event was a debug exception that was pending following a VM entry for which guest interruptibility indicates an "enclave interruption", the event was a debug exception that was pending following an execution of RSM for which SMRAM indicates an "enclave interruption", the event was an exception that was encountered during delivery of any of the events above, otherwise, the bit is cleared to 0; bit 57 is set to 1 if the logical processor had been in 64-bit mode when the event occurred (0 indicates an event incident); bits 61:58 contain the length of the instruction causing the event if the event type is software interrupt (INT n), privileged software exception (INT1), software exception (INT3 or INTO), or other event (when used for SYSCALL or SYSENTER); and bits 63:62 are not used and are saved as zero.

The remaining 40 bytes pushed (bytes 39:0) are the return state and have generally the same format as that used by IDT event delivery, for example. The following items detail the format of the return state on the stack from bottom (highest address) to top: 1) SS selector of the interrupted context (low 16 bits of a 64-bit field) where bits 63:16 of this field are cleared to zero; 2) RSP of the interrupted context (64 bits); 3) RFLAGS of the interrupted context (64 bits) where bit 16 of the RFLAGS field (corresponding to the RF bit) is saved as 1 when delivering events that do the same for IDT event delivery (these are faults other than instruction breakpoints) as well as any traps or interrupts delivered following partial execution of an instruction (e.g., between iterations of a REP-prefixed string instruction). Delivery of other events saves in bit 16 the value that RFLAGS.RF had at the time the event occurred; 4) CS selector of the interrupted context (low 16 bits of a 64-bit field). FRED event delivery saves additional information in the upper portion of this field (this information guides the execution of the FRED return instructions): bit 16 is set to 1 if the event being delivered is a non-markable interrupt (NMI) and is otherwise cleared to 0, bit 17 is set to 1 for FRED event delivery of SYSCALL, SYSENTER, or INT n (for any value of n) and is otherwise cleared to 0, bit 18 is set to 1 for FRED event delivery of an exception if interrupt blocking by STI was in effect at the time the exception occurred and is otherwise cleared to 0, bits 23:19 are cleared to zero, bits 25:24: for delivery of events that occur while CPL=0, these bits report the current stack level (CSL) at the time the event occurred and for delivery of events that occur while CPL=3, these bits are cleared to 0, bits 63:26 are cleared to zero; 5) RIP of the interrupted context (64 bits). If the event type is software interrupt (INT n), privileged software exception (INT1), software exception (INT3 or INTO), or other event (when used for SYSCALL or SYSENTER); the RIP value saved references the instruction after the one that caused the event being delivered. (If delivery of such an event encounters an exception, the RIP value saved by delivery of the exception will reference the instruction that caused the original event.)

Information is saved on the shadow stack (e.g., shadow stack 120) when supervisor shadow stacks are enabled. How FRED event delivery interacts with the shadow stack depends on whether a new value is being loaded into SSP. If either the CPL or the stack level is changing, the new SSP value is loaded from the FRED_SSP MSR corresponding to the new stack level. In this case, the new shadow stack is checked for a token. This token management may differ from what is done for IDT event delivery. FRED token management depends on whether the FRED_SSP MSR had already been verified (indicated by bit 0 of the MSR being set). If the MSR had not been verified, FRED event delivery marks the base of the new shadow stack with a busy token as follows. It reads 8 bytes from the address in SSP (which was just loaded from the MSR), locking the address read. If the value read is equal to the SSP value (indicating a valid free token), the lock is released, and the value is written back but with bit 0 set (indicating that the token is now busy). This same value is loaded into the MSR. This sets bit 0 of the MSR, indicating that it has been verified. Otherwise, the lock is released, the value is written back without change, and a general-protection fault occurs. If the MSR had already been verified, a confirmation that the base of the new shadow stack has a valid busy token is performed by reading 8 bytes from the address in SSP. If the value read does not equal the SSP value with bit 0 set (indicating a busy token), a general protection fault occurs.

In either case (CPL or stack level changing), the SSP is loaded with the new value. Note that if FRED event delivery subsequently incurs a nested exception or VM exit, the old SSP value is implicitly restored.

If neither the CPL nor the stack level is changing, SSP is not loaded from a FRED_SSP MSR. Instead, if the current SSP value is not 8-byte aligned, 4 bytes of zeroes are pushed on the shadow stack, resulting in an SSP value that is 8-byte aligned.

If the event being delivered occurred while CPL=0, the old CS selector, the old linear instruction pointer, and the old SSP are pushed onto the shadow stack. If SSP had been loaded from a FRED_SSP MSR, these pushes are onto the new shadow stack after the token management outlined above; if it had not been, the existing shadow stack (e.g., shadow stack 120) is used. Each of these three values is pushed in a separate 8-byte field on the shadow stack (e.g., shadow stack 120).

After saving the old context and other information, registers are loaded to establish the new context at 709. For events that occur while CPL=3, the CS, SS, and GS segments as well as the IA32_KERNEL_GS_BASE MSR may be updated. For CS, the selector is set to IA32_STAR[47:32] AND FFFCH (forcing CS.RPL to 0), the base address is set to 0. The limit is set to FFFFFH and the G bit is set to 1, the type is set to 11 (execute/read accessed code) and the S bit is set to 1, and the DPL is set to 0, the P and L bits are each set to 1, and the D bit is set to 0. For SS, the selector is set to IA32 STAR[47:32]+8, the base address is set to 0. The limit is set to FFFFFH and the G bit is set to 1, the type is set to 3 (read/write accessed data) and the S bit is set to 1, and the DPL is set to 0, and the P and B bits are each set to 1. For GS, the value of the GS base address and the value stored in IA32_KERNEL_GS_BASE MSR are swapped.

For events that occurs while CPL=0, there are no modifications to CS, SS, or GS. After updating the segment registers (if done), RIP, RFLAGS, and CSL are updated with the values determined before.

If the event occurred while CPL=3 and user shadow stacks are enabled, the IA32_PL3_SSP MSR is loaded with the old value of SSP. The value loaded into the MSR may be adjusted so that bits 63:N get the value of bit N−1, where N is the CPU's maximum linear-address width.

If supervisor indirect branch tracking is enabled, the IA32_S_CET MSR may be updated to set the TRACKER value to WAIT_FOR_ENDBRANCH and to clear the SUPPRESS bit to 0.

FRED event delivery of a non-markable interrupt (NMI) blocks NMIs.

A debug trap (single-step trap or data or I/O breakpoint) may be pending at the time another event is delivered. Such a trap may have been pending if the previous instruction was MOV SS or POP SS, as these instructions block debug traps on the following instruction boundary, for example.

Debug traps that may have been pending at the time the original event occurred are dropped, regardless of the event being delivered. By way of example, any pending data or I/O breakpoints (or single-step traps) are cleared when INT n, INT3, INTO, SYSCALL, or SYSENTER are delivered using FRED event delivery.

FIGS. 8(A)-(E) illustrate exemplary pseudocode for FRED event delivery.

As noted above, FRED supports two new return instructions—ERETS (event return to supervisor) and ERETU (event return to user). Details about the operations of these two instructions are discussed below.

Figure 9:
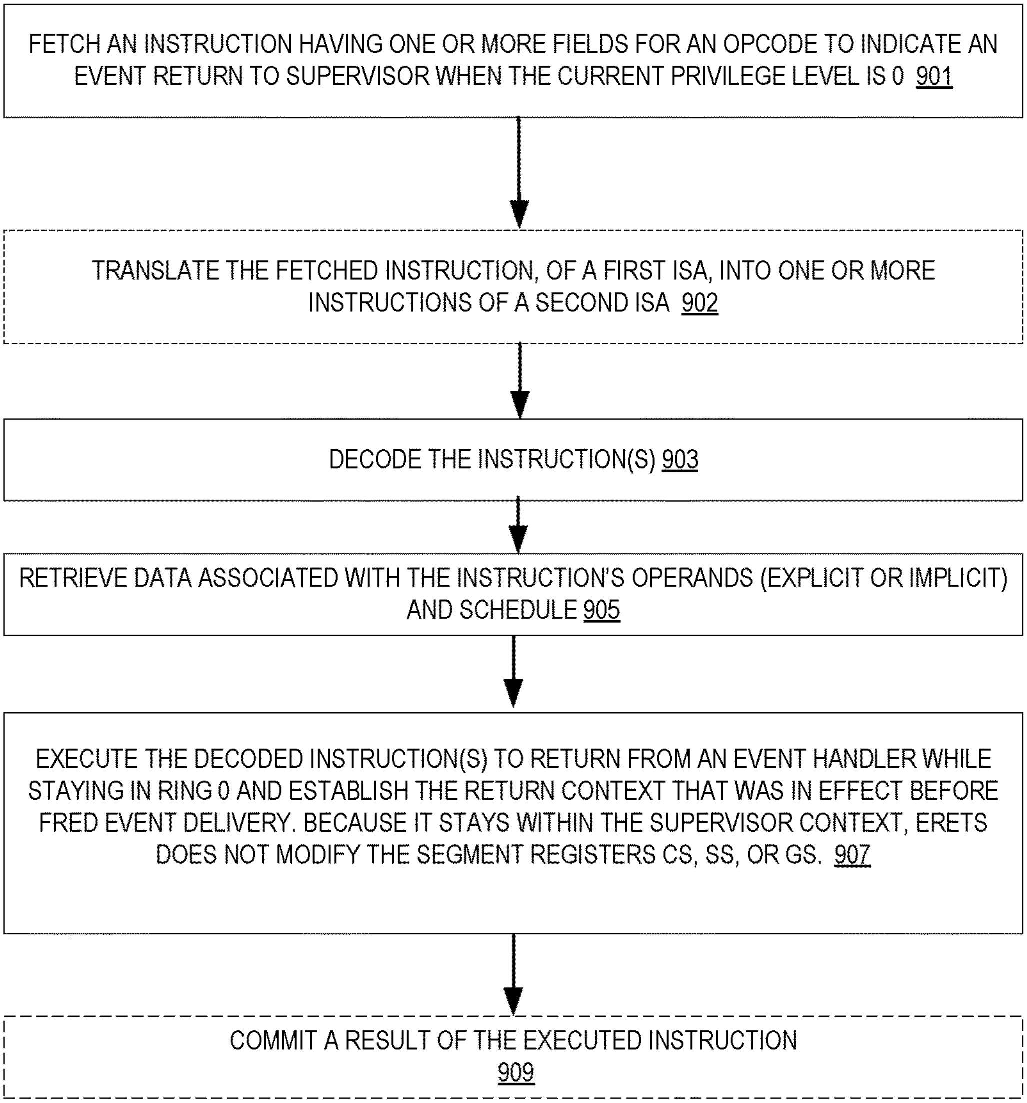
FIG. 9 illustrates an exemplary handling of an event return to supervisor (ERETS) instruction.

FIG. 9 illustrates an example of the handling of an ERETS instruction. It is to be noted that this example as shown in FIG. 9 is independent from the other exemplary methods such as those shown in any one of FIGS. 10, 12, 13, 15, 16, 17, 18, 19, 21, 23, 24, 25, 26, 28. At 901, a single instruction having one or more fields for an opcode (also referred to as operation code, instruction machine code, instruction code, instruction syllable) to indicate an event return to supervisor when the current privilege level is 0 is fetched. The opcode is f2 0f 01 ca.

The fetched single instruction, of a first ISA, may be translated into one or more instructions of a second ISA at 902. This translation may be performed by hardware. As an alternative, this translation is performed by software layer such as a just-in-time compiler or an ahead-of-time compiler.

The fetched instruction, or translated instruction(s), is/are decoded at 903. The decoding may result in a plurality of microoperations being generated. Note that a decoder to properly decode this instruction has not previously existed.

Data associated with the instruction (or instructions) operands (either explicit or implicit) are retrieved at 905 and the decoded instruction(s) is/are scheduled.

The decoded instruction(s) are executed at 907 to return from an event handler while staying in ring 0, establishing the return context that was in effect before FRED event delivery. Note that because this execution stays within a supervisor context, the execution does not modify the segment registers (e.g., CS, SS, or GS). The return context can now be used by subsequent instructions.

The execution of the instruction (and/or the operand retrieval) begins by loading and checking the return context from the stack. When supervisor shadow stacks are enabled, the execution then checks the shadow stack (e.g., shadow stack 120) to confirm the validity of this control-flow transfer. Finally, the return context is established by loading the appropriate registers.

A result of the executed instruction is committed at 909.

Figure 10:
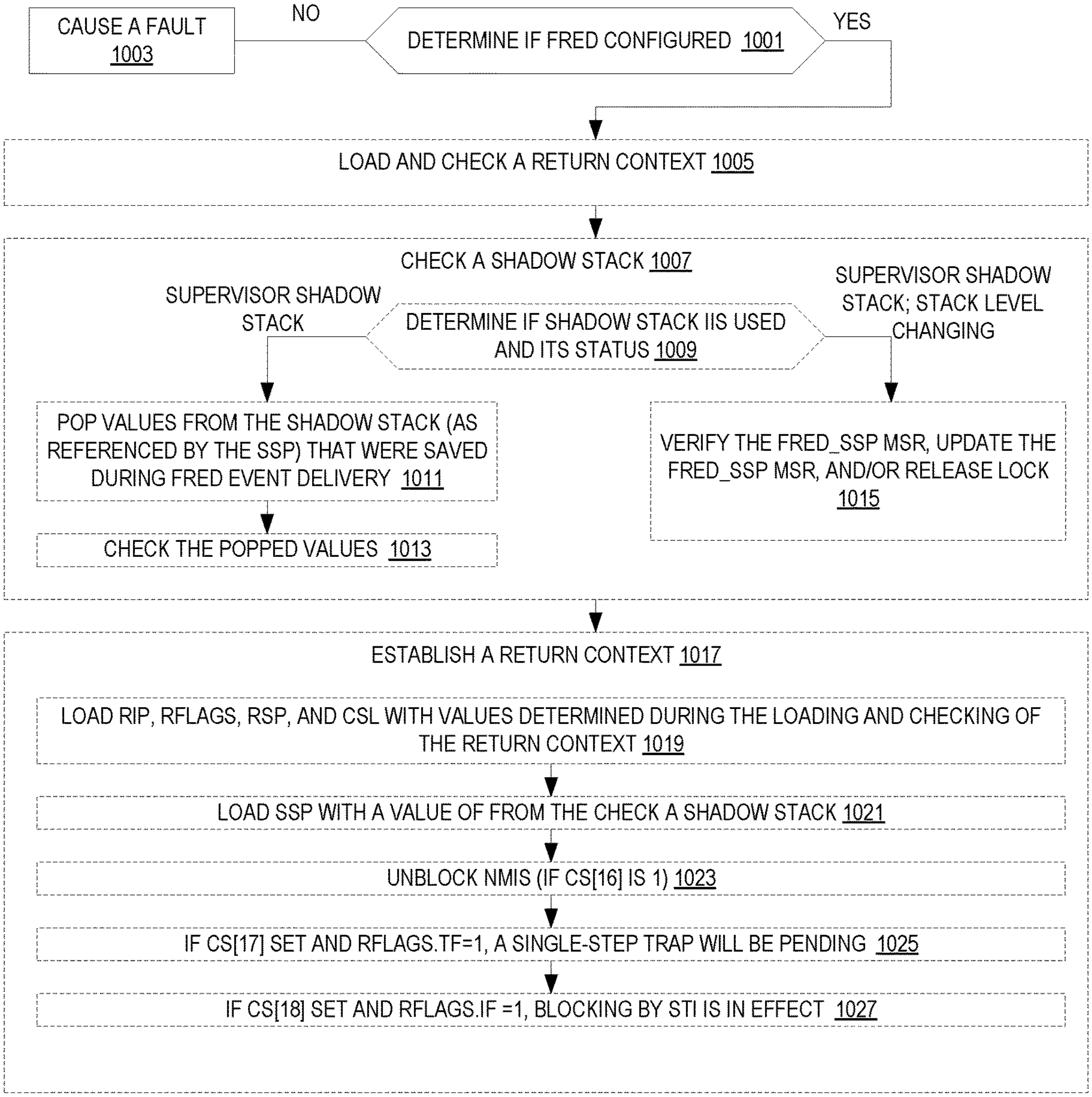
FIG. 10 illustrates an exemplary execution of an ERETS instruction.

FIG. 10 illustrates an exemplary execution of an ERETS instruction. It is to be noted that this example as shown in FIG. 10 is independent from the other exemplary methods such as those shown in any one of FIGS. 9, 12, 13, 15, 16, 17, 18, 19, 21, 23, 24, 25, 26, 28. A check may be made to determine if FRED was configured correctly at 1001. When FRED was not configured correctly ("NO" in 1001), then a fault (such as a general protection fault) is raised at 1003.

At 1005, when FRED is configured properly ("YES" in 1001) (or in examples where this check is not made), a return context is popped from the regular stack (as referenced by the RSP) that was saved by a FRED event delivery and checked.

The checked context is held to update register state when the instruction completes. The table below shows what is popped and what check may be performed.

| Item Popped | Check(s) | Other Act(s) |
|---|---|---|
| RIP of the return context (64-bit value) | Is the value canonical relative to the current paging mode | GP fault if check fails |
| CS selector of the return context (e.g., the low 16 bits of a CS 64-bit field) | Bits 23:19 and 63:26 of this field must be zero | GP fault if check fails; Establish a new stack level as the minimum CSL and the value of bits 25:24 of the CS field; Bits 18:16 of this field determine how ERETS manages certain events; Bits 15:0 are not used to load CS. |
| RFLAGS of the return context (64 bits) | Bit 1 of this field must be 1; Bit 3, bit 5, bits 13:12 (IOPL), bit 15, bit 17 (VM), and bits 63:22 of the field must be 0 | GP fault if check fails |
| RSP of the return context (e.g., 64 bits) | | |
| SS selector of the interrupted context (e.g., low 16 bits of a 64-bit field). | Bits 63:16 of this field must be zero. | GP fault if check fails |

At 1007, the shadow stack (e.g., shadow stack 120) may be checked. At 1009, a determination of if a shadow stack is used and its status is made. By way of example, if a supervisor shadow stack enabled and, if so, is the stack level changing.

If supervisor shadow stacks are enabled, values from the shadow stack (referenced by SSP) that were saved by FRED event delivery are popped at 1011. The checks of these values may include:

| Item Popped | Check(s) | Other Act(s) |
|---|---|---|
| SSP of the return context (64-bit value) | 1) Is this value 4-byte aligned and bits 1:0 set to zero; 2) Is this value canonical relative to the current paging mode | Control protection exception if check 1 fails; A general protection fault if check 2 fails |
| The linear instruction pointer of the return context (64-bit value) | This value must equal the RIP of the return context that was popped from the regular stack | Control protection exception if check fails |
| CS of the return context (64-bit value). | This value must equal the current CS selector (bits 63:16 of the value must be 0) | Control protection exception if check fails |

If supervisor shadow stacks are enabled and the stack level is changing (based on the value popped from the regular stack; see above), subsequent operation of instructions depends on the values of the FRED_SSP MSR for the CSL (not the new stack level) and of the SSP. At 1015 the FRED_SSP MSR is verified, the FRED_SSP MSR is updated, and/or a lock is released. (That is, if the instruction is executing with CSL=2 and is returning to stack level 1, the relevant MSR is IA32_FRED_SSP2.) The checks of these values may include:

1) If bit 0 of the FRED_SSP MSR is set and the remaining bits are equal to the corresponding bits in the SSP, the MSR is verified and no other action is performed;

2) If the value of the FRED_SSP MSR equals that of SSP (implying that the FRED_SSP MSR bit 0 is clear), 8 bytes from the address in the SSP are read. If the value read equals the SSP value with bit 0 set to 1 (and thus is a locked token), that value is loaded into the FRED_SSP MSR. This sets bit 0 of the FRED_SSP MSR to 1, indicating that the FRED_SSP MSR is now verified. (If any other value is read, the MSR is not modified.)

3) If the FRED_SSP MSR has any other value, 8 bytes from the address in SSP are read which locks the address read. If the value read equals the SSP value, but with bit 0 set to 1 (indicating a busy token), the lock is released and the value of SSP is written back. The clears bit 0 in the token, indicating that it is now free. (The token is freed because SSP does not match the FRED_SSP MSR.) If any other value is read, the lock is released, and the value read is written back. Regardless of the value read, the FRED_SSP MSR is not modified.

At 1017, a return context is established. This may include one or more operations. At 1019, RIP, RFLAGS, RSP, and CSL are loaded with the values that were popped earlier from the regular stack. If supervisor shadow stacks are enabled, SSP is loaded with the value that was popped earlier from the shadow stack at 1021. Non-markable interrupts (NMIs) may be unblocked when bit 16 of the popped CS field (above the selector) is 1 at 1023. When bit 17 of the popped CS field is 1 and execution will result in RFLAGS.TF=1, a single-step trap may be pending upon completion at 1025 of ERETS. When bit 18 of that field is 1 and execution will result in RFLAGS.IF=1, a blocking by STI may be in effect upon completion of the instruction at 1027.

FIGS. 11(A)-(B) illustrate exemplary pseudocode for an execution of ERETS.

Figure 12:
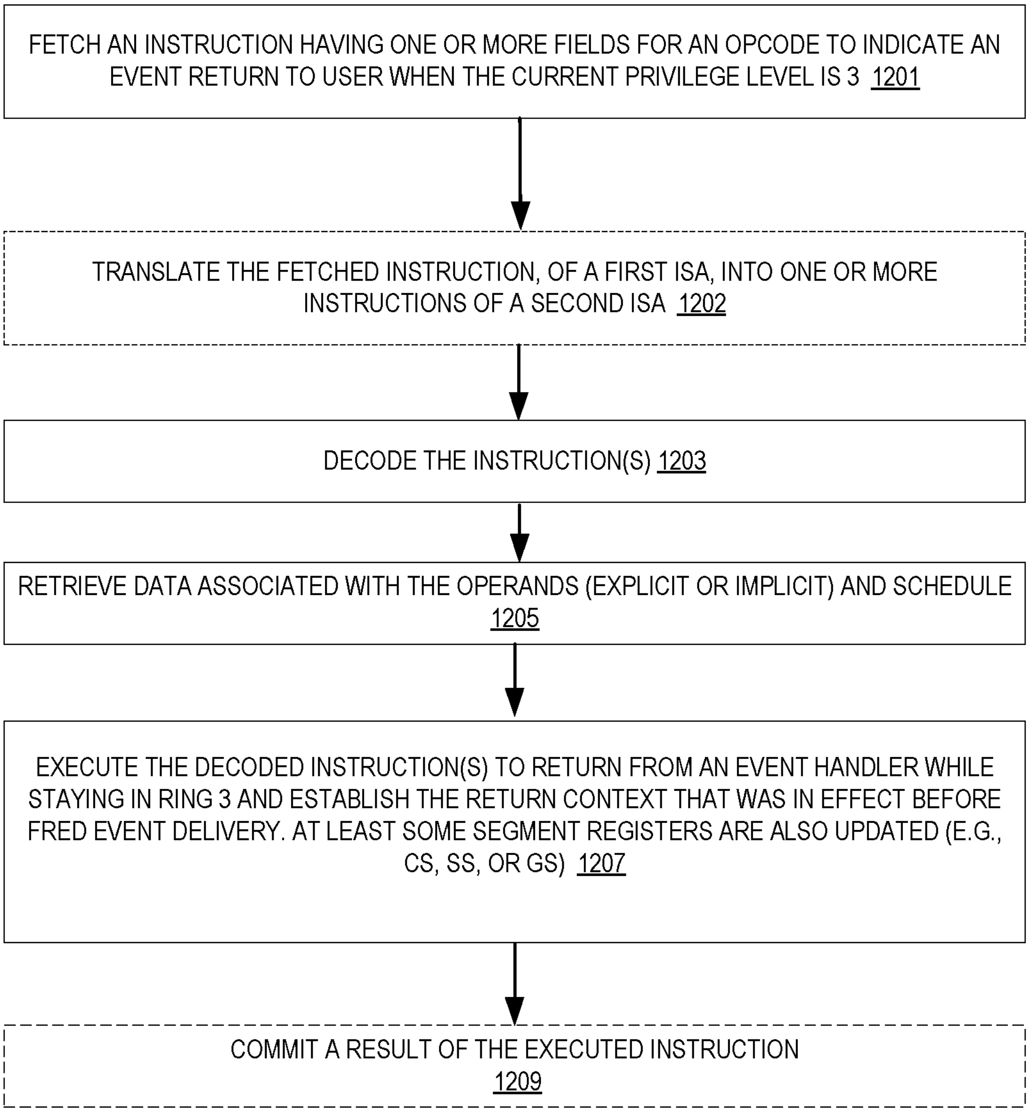
FIG. 12 illustrates an exemplary handling of an event return to user (ERETU) instruction.

FIG. 12 illustrates an example of the handling of an ERETU instruction. It is to be noted that this example as shown in FIG. 12 is independent from the other exemplary methods such as those shown in any one of FIGS. 9, 10, 13, 15, 16, 17, 18, 19, 21, 23, 24, 25, 26, 28. At 1201, a single instruction having one or more fields for an opcode to indicate an event return to user when the current privilege level is 3 is fetched. In this example, the opcode is f3 0f 01 ca.

The fetched single instruction, of a first ISA, is translated into one or more instructions of a second ISA at 1202. This translation may be performed by hardware. However, this translation may also be performed by software layer such as a just-in-time compiler or an ahead-of-time compiler.

The fetched instruction, or translated instruction(s), is/are decoded at 1203. The decoding may result in a plurality of microoperations being generated. Note that a decoder to properly decode this instruction has not previously existed.

Data associated with the instruction (or instructions) operands (either explicit or implicit) are retrieved at 1205 and the decoded instruction(s) is/are scheduled.

The decoded instruction(s) are executed at 1207 to return from an event handler while staying in ring 3 and establish the return context that was in effect before FRED event delivery. The change of context includes updates to the segment registers CS, SS, or GS. The return context can now be used by subsequent instructions.

The execution of the instruction (and/or the operand retrieval) may begin by loading and checking the return context from the stack. When supervisor shadow stacks are enabled, the execution then checks the shadow stack (e.g., shadow stack 120) to confirm the validity of this control-flow transfer. Finally, the return context is established by loading the appropriate registers.

A result of the executed instruction is committed at 1209, for example.

Figure 13:
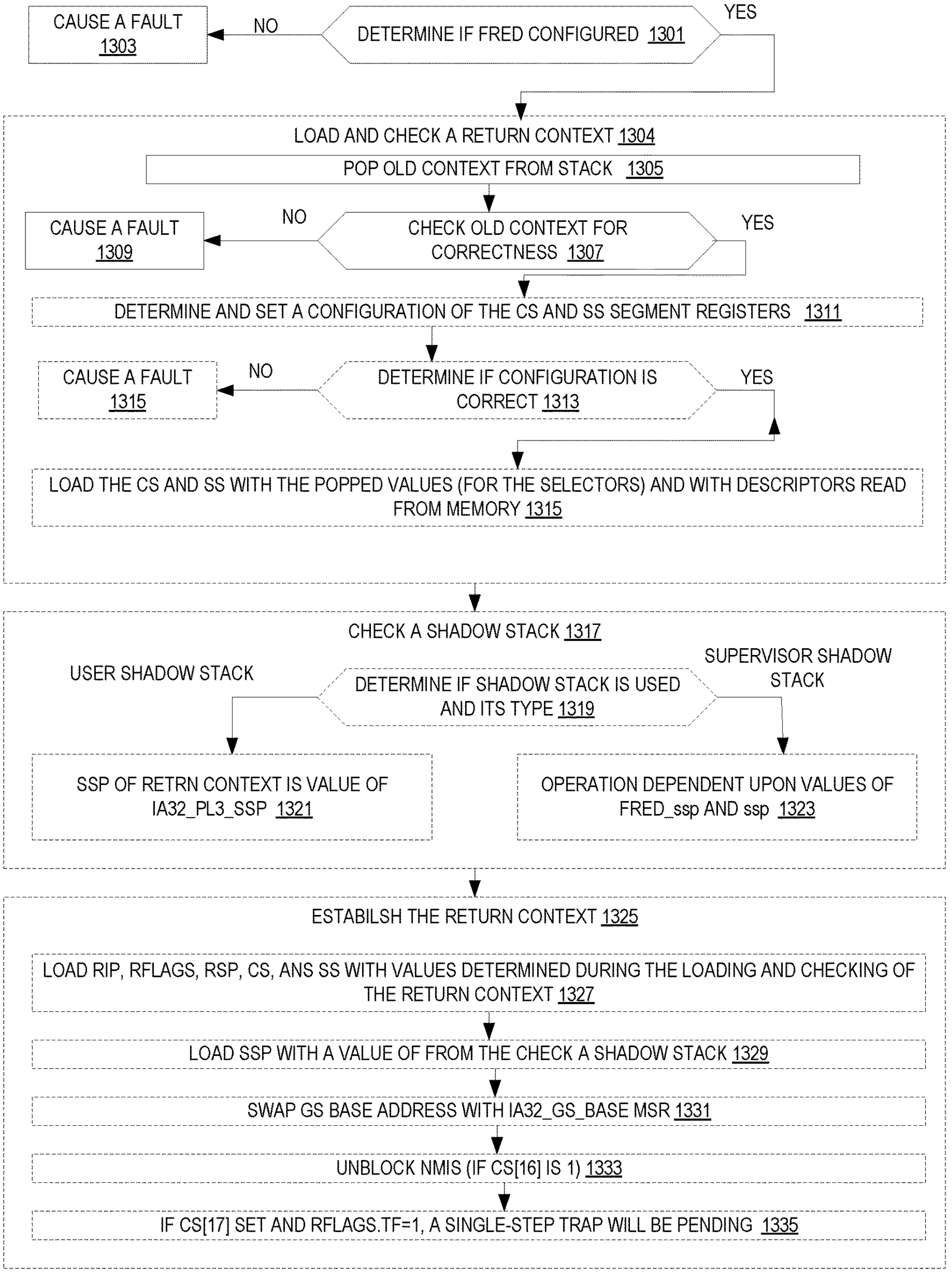
FIG. 13 illustrates an exemplary execution of an ERETU instruction.

FIG. 13 illustrates an example of an execution of an ERETU instruction. It is to be noted that this example as shown in FIG. 13 is independent from the other exemplary methods such as those shown in any one of FIGS. 9, 10, 12, 15, 16, 17, 18, 19, 21, 23, 24, 25, 26, 28. A check may be made to determine if FRED was configured correctly at 1301. When FRED was not configured correctly ("NO" at 1301), then a fault (such as a general protection fault) is raised at 1303.

At 1304, when FRED is configured properly ("YES" at 1301) (or in an example where this check is not made), a return context is popped from the regular stack (as referenced by the RSP) that was saved by a FRED event delivery and checked. The checked context is held to update register state when the instruction completes. This act may include several sub-acts.

At 1305, the old context is popped from the stack. At 1307, at least a portion of the popped values are checked for correctness. When there is an incorrect usage ("NO" at 1307), a fault is raised at 1309. The table below shows what is popped and what check is performed according to some examples.

SS are established in a standard configuration for ring 3 in 64-bit mode such that for CS the selector is set to IA32_STAR[63:48]+16 (decimal); the base address is set to 0. The limit is set to FFFFFH and the G bit is set to 1, the type is set to 11b (execute/read accessed code) and the S bit is set to 1, the DPL is set to 3 (decimal), the P and L bits are each set to 1, and the D bit is set to 0; and for SS the selector is set to IA32_STAR[63:48]+8, the base address is set to 0. The limit is set to FFFFFH and the G bit is set to 1, the type is set to 3 (read/write accessed data) and the S bit is set to 1, and the DPL is set to 3, and the P and B bits are each set to 1.

When the selector popped for CS is IA32_STAR[63:48] and the selector popped for SS is IA32_STAR[63:48]+8, CS and SS may be established in a standard configuration for ring 3 in compatibility mode such that for CS the selector is set to IA32_STAR[63:48], the base address may be set to 0. The limit is set to FFFFFH and the G bit is set to 1, the type is set to 11 (execute/read accessed code) and the S bit is set to 1, the DPL is set to 3, the P bit is set to 1, and the D and L bits are each set to 0; and for SS the selector is set to IA32_STAR[63:48]+8, the base address is set to 0. The limit is set to FFFFFH and the G bit is set to 1, the type is set to 3 (read/write accessed data) and the S bit is set to 1, the DPL is set to 3, and the P and B bits are each set to 1.

By way of example, when the CS and SS have different values that detailed above, the selectors popped for CS and SS are used to load descriptors from a global descriptor table (GDT) (e.g., used to define the characteristics of the various memory segments used during program execution, including the base address, the size, and access privileges like executability and writability) and/or local descriptor table (LDT) (e.g., a memory table) as would be done by an execution of an interrupt return instruction (such as IRET). A check of if bits 1:0 of the selector popped for CS is made, and a general protection fault is made when those bits do not indicate a return to ring 3. A general protection fault is generated when the return is to compatibility mode and the RIP of the return context would be beyond the new CS segment limit. In general, if determining if configuration is correct results in "NO", a fault is caused at 1314.

| Item Popped | Check(s) | Other Act(s) |
|---|---|---|
| RIP of the return context (64-bit value) | Check once CS configuration determined | |
| CS selector of the return context (e.g., the low 16 bits of a CS 64-bit field) | Bits 63:18 of this field must be zero | GP fault if check fails; Bits 17:16 of the field determine how the instruction execution manages events |
| RFLAGS of the return context (64 bits) | Bit 1 of this field must be 1; Bit 3, bit 5, bits 13:12 (IOPL), bit 15, bit 17 (VM), and bits 63:22 of the field must be 0 | GP fault if check fails |
| RSP of the return context (e.g., 64 bits) | | |
| SS selector of the interrupted context (e.g., low 16 bits of a 64-bit field). | Bits 63:16 of this field must be zero. | GP fault if check fails |

After popping and checking the above fields as noted ("YES" at 1307), a determination and configuration of the CS and SS segment registers is made at 1311. This determination and configuration may be different depending on the values for the popped CS selector. When the selector popped for CS is IA32_STAR[63:48]+16 and the selector popped for SS is IA32_STAR[63:48]+8 (decimal), CS and If the execution is returning to 64-bit mode (e.g., where the descriptor loaded for CS sets the L bit), a general protection fault occurs if the RIP of the return context is not canonical relative to the current paging mode.

When there is no fault ("YES" at 1313), the CS and SS will be loaded with the popped values (for the selectors) and with the descriptors read from memory at 1315.

At 1317, the shadow stack is checked. At 1319, a determination of if a shadow stack is used and its type is made. By way of example, is a supervisor shadow stack enabled or a user shadow stack? When user shadow stacks are enabled, the SSP of the return context is the value of IA32_PL3_SSP MSR at 1321. Note that if the return is to compatibility mode, a general protection fault occurs if IA32_PL3_SSP [63:32] are not all zero and if the return is to 64-bit mode, a general protection occurs if the value of IA32_PL3_SSP is not canonical relative to the current paging mode.

When supervisor shadow stacks are enabled, operation of ERETU depends on the values of the FRED_SSP MSR for the CSL and of SSP at 1323. If bit 0 of the FRED_SSP MSR is set and the remaining bits are equal to the corresponding bits in the SSP, the MSR is verified, and no other action is performed. If the value of the FRED_SSP MSR equals that of SSP (implying that the FRED_SSP MSR bit 0 is clear), 8 bytes from the address in the SSP are read. If the value read equals the SSP value with bit 0 set to 1 (and thus is a locked token), that value is loaded into the FRED_SSP MSR. This sets bit 0 of the FRED_SSP MSR to 1, indicating that the FRED_SSP MSR is now verified. (If any other value is read, the MSR is not modified.). If the FRED_SSP MSR has any other value, 8 bytes from the address in SSP are read which locks the address read. If the value read equals the SSP value, but with bit 0 set to 1 (indicating a busy token), the lock is released and the value of SSP is written back. The clears bit 0 in the token, indicating that it is now free. (The token is freed because SSP does not match the FRED_SSP MSR.) If any other value is read, the lock is released, and the value read is written back. Regardless of the value read, the FRED_SSP MSR is not modified.

At 1325, a return context is established. This may include one or more operations. At 1327, RIP, RFLAGS, RSP, CS, and SSL are loaded with the values that were determined earlier. All 64 bits of RIP, RFLAGS, and RSP are loaded. If shadow stacks are enabled, the SSP is loaded with the value that was popped earlier from the shadow stack at 1329.

The value of the GS base address and that of the IA32_KERNEL_GS_BASE MSR may be swapped at 1331.

Non-markable interrupts (NMIs) may be unblocked when bit 16 of the popped CS field (above the selector) is 1 at 1333. When bit 17 of the popped CS field is 1 and execution will result in RFLAGS.TF=1, a single-step trap may be pending upon completion of ERETS. When bit 18 of that field is 1 and execution will result in RFLAGS.IF=1, a blocking by STI may be in effect upon completion of the instruction at 1335.

FIGS. 14(A)-(C) illustrate an example of pseudocode for an execution of ERETU.

Support for FRED may include changes to so-called legacy instructions, e.g. those that can cause a ring transition.

Figure 15:
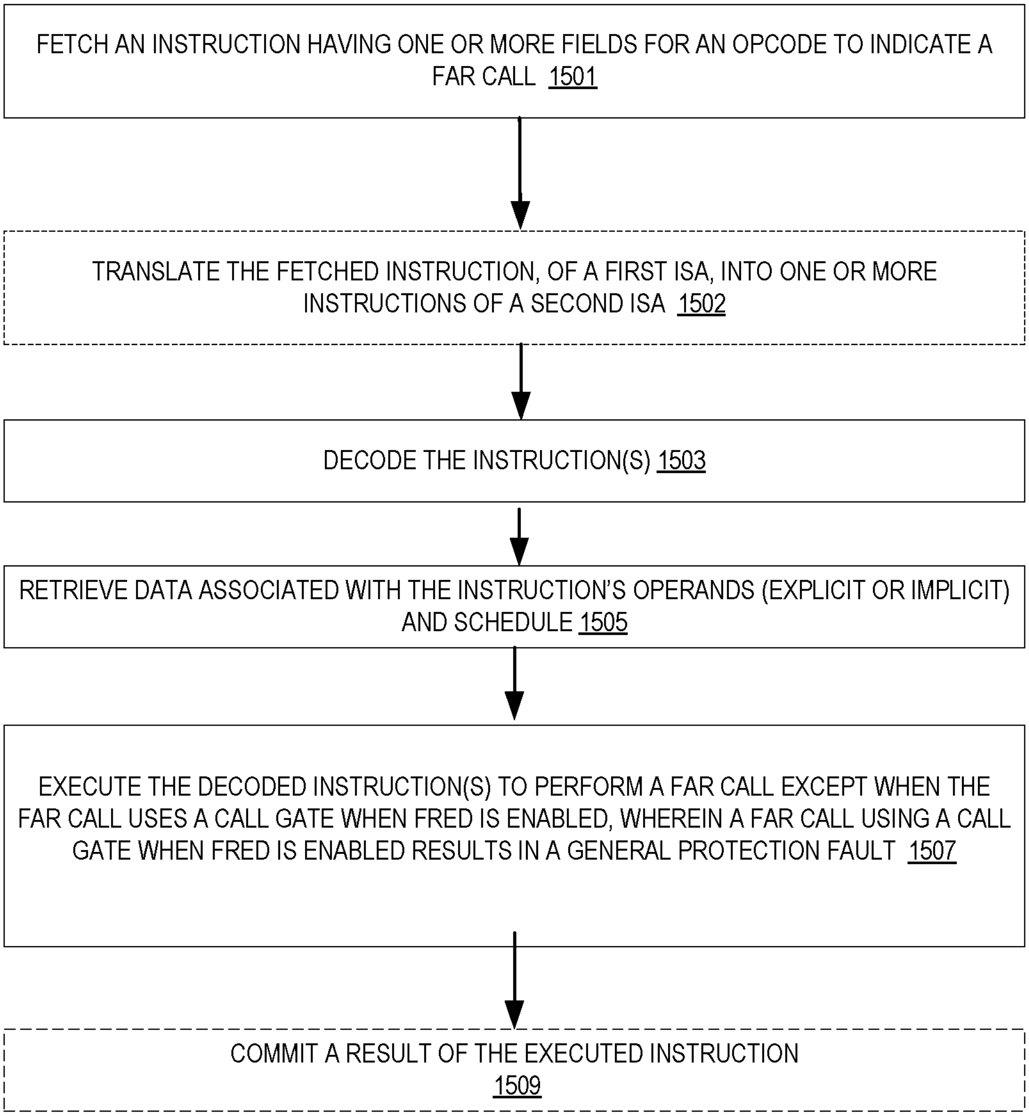
FIG. 15 illustrates an exemplary handling of a far CALL instruction.

FIG. 15 illustrates an example of the handling of a far CALL instruction. It is to be noted that this example as shown in FIG. 15 is independent from the other exemplary methods such as those shown in any one of FIGS. 9, 10, 12, 13, 16, 17, 18, 19, 21, 23, 24, 25, 26, 28. At 1501, a single instruction having one or more fields for an opcode to indicate a far call and one or more fields for addressing information is fetched. The opcode may be one of 9A or FF. An absolute address may be provided by the addressing information. An indirect address may be given by the addressing information. For example, in 32-bit mode, if a selector points to a gate, then RIP=32-bit zero extended displacement taken from gate; else RIP=zero extended 16-bit offset from far pointer referenced in the instruction. A far call is a call to a procedure located in a different segment than a current code segment.

The fetched single instruction, of a first ISA, may be translated into one or more instructions of a second ISA at 1502. This translation may be performed by hardware. However, this translation may also be performed by software layer such as a just-in-time compiler or an ahead-of-time compiler.

The fetched instruction, or translated instruction(s), is/are decoded at 1503. The decoding may result in a plurality of microoperations being generated.

Data associated with the instruction (or instructions) operands (either explicit or implicit) are retrieved at 1505 and the decoded instruction(s) is/are scheduled.

The decoded instruction(s) are executed at 1507 to attempt to perform a far call using the addressing information. When executing a far call in real-address or virtual-8086 mode, the current value of both the CS and EIP registers is pushed on the stack for use as a return-instruction pointer. Then a "far branch" to the code segment and offset specified with the target operand (using the addressing information) for the called procedure is performed. The target operand specifies an absolute far address either directly with a pointer (ptr16:16 or ptr16:32) or indirectly with a memory location (m16:16 or m16:32). With the pointer method, the segment and offset of the called procedure is encoded in the instruction using a 4-byte (16-bit operand size) or 6-byte (32-bit operand size) far address immediate. With the indirect method, the target operand specifies a memory location that contains a 4-byte (16-bit operand size) or 6-byte (32-bit operand size) far address. The operand-size attribute determines the size of the offset (16 or 32 bits) in the far address. The far address is loaded directly into the CS and EIP registers. If the operand-size attribute is 16, the upper two bytes of the EIP register are cleared.

In protected mode, a segment selector part of the far address is used to access the corresponding descriptor in the GDT or LDT. The descriptor type (code segment, call gate, task gate, or TSS) and access rights determine the type of call operation to be performed. If the selected descriptor is for a code segment, a far call to a code segment at the same privilege level is performed. (If the selected code segment is at a different privilege level and the code segment is non-conforming, a general-protection exception is generated.) A far call to the same privilege level in protected mode is very similar to one carried out in real-address or virtual-8086 mode. The target operand specifies an absolute far address either directly with a pointer (ptr16:16 or ptr16:32) or indirectly with a memory location (m16:16 or m16:32). The operand-size attribute determines the size of the offset (16 or 32 bits) in the far address. The new code segment selector and its descriptor are loaded into CS register; the offset from the instruction is loaded into the EIP register.

A call gate can also be used to perform a far call to a code segment at the same privilege level. Using this mechanism provides an extra level of indirection and is an exemplary method of making calls between 16-bit and 32-bit code segments. When executing an inter-privilege-level far call, the code segment for the procedure being called must be accessed through a call gate. The segment selector specified by the target operand identifies the call gate. The target operand can specify the call gate segment selector either directly with a pointer (ptr16:16 or ptr16:32) or indirectly with a memory location (m16:16 or m16:32). The processor obtains the segment selector for the new code segment and the new instruction pointer (offset) from the call gate descriptor. In some examples, FRED disables the use of call gates to code segments at a numerically lower privilege level.

The execution of the instruction performs a check to determine if FRED is enabled. When FRED is enabled, a reference to a call gate causes a general protection fault.

On inter-privilege-level calls, the processor (e.g., processor 101) switches to the stack for the privilege level of the called procedure. The segment selector for the new stack segment is specified in the TSS for the currently running task. The branch to the new code segment occurs after the stack switch. (Note that when using a call gate to perform a far call to a segment at the same privilege level, no stack switch occurs.) On the new stack, the processor pushes the segment selector and stack pointer for the calling procedure's stack, an optional set of parameters from the calling procedures stack, and the segment selector and instruction pointer for the calling procedure's code segment. (A value in the call gate descriptor determines how many parameters to copy to the new stack.) Finally, the processor branches to the address of the procedure being called within the new code segment.

Executing a task switch with the instruction is similar to executing a call through a call gate. The target operand specifies the segment selector of the task gate for the new task activated by the switch (the offset in the target operand is ignored). The task gate in turn points to the TSS for the new task, which contains the segment selectors for the task's code and stack segments. Note that the TSS also contains the EIP value for the next instruction that was to be executed before the calling task was suspended. This instruction pointer value is loaded into the EIP register to re-start the calling task.

The instruction can also specify the segment selector of the TSS directly, which eliminates the indirection of the task gate.

A result of the executed instruction is committed at 1509, for example.

Figure 16:
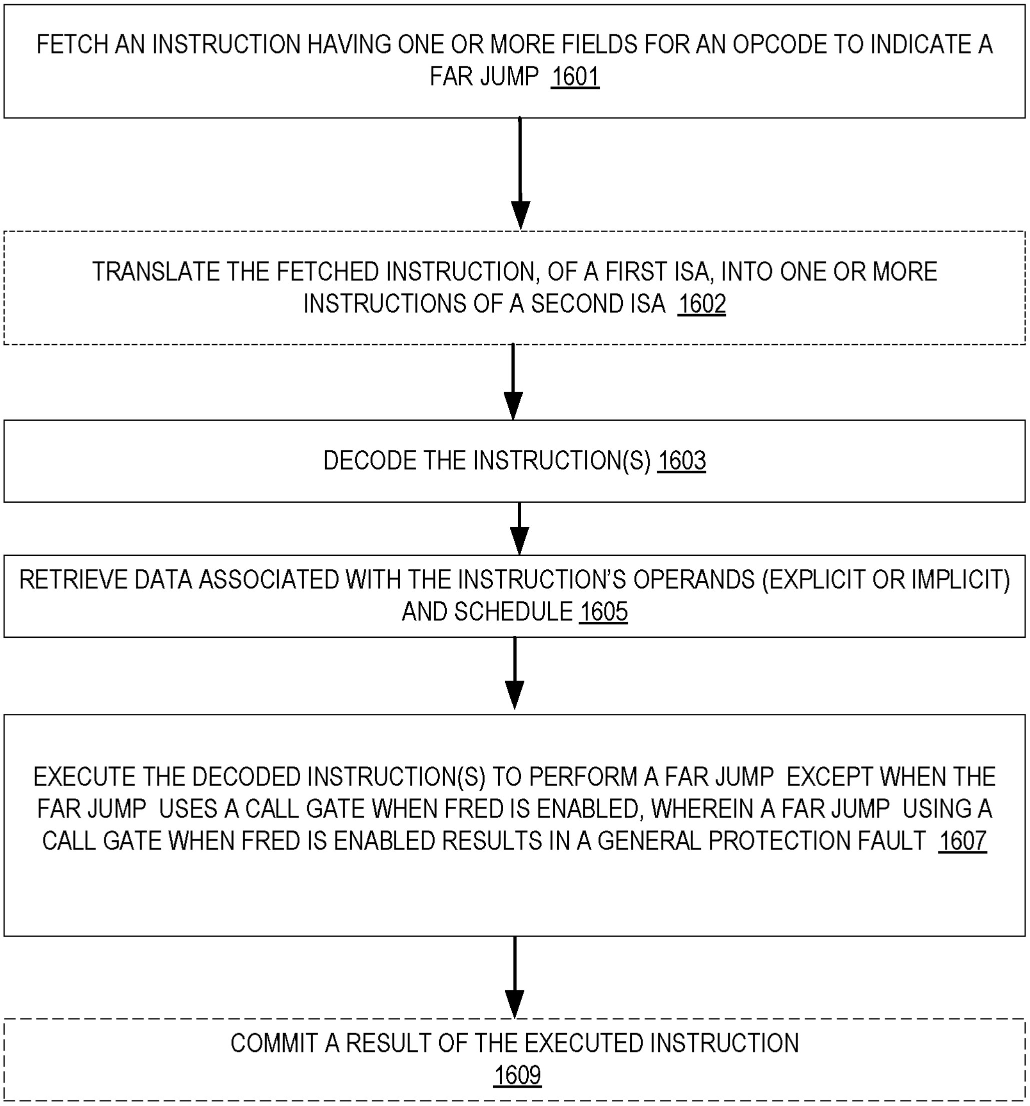
FIG. 16 illustrates an exemplary handling of a far jump instruction.

FIG. 16 illustrates an example of the handling of a far jump instruction. It is to be noted that this example as shown in FIG. 16 is independent from the other exemplary methods such as those shown in any one of FIGS. 9, 10, 12, 13, 15, 17, 18, 19, 21, 23, 24, 25, 26, 28. At 1601, a single instruction having one or more fields for an opcode to indicate a far jump and one or more fields for addressing information is fetched. The opcode may be one of EA cd, EA cp, or FF/5. An absolute address may be provided by the addressing information. An indirect address may be given by the addressing information.

The fetched single instruction, of a first ISA, may be translated into one or more instructions of a second ISA at 1602. This translation may be performed by hardware. However, this translation may also be performed by software layer such as a just-in-time compiler or an ahead-of-time compiler.

The fetched instruction, or translated instruction(s), is/are decoded at 1603. The decoding may result in a plurality of microoperations being generated.

Data associated with the instruction (or instructions) operands (either explicit or implicit) are retrieved at 1605 and the decoded instruction(s) is/are scheduled.

The decoded instruction(s) are executed at 1607 to attempt perform a far JUMP using the addressing information. When executing a far jump in real-address or virtual-8086 mode, the processor may jump to the code segment and offset specified with the target operand. Here the target operand specifies an absolute far address either directly with a pointer (ptr16:16 or ptr16:32) or indirectly with a memory location (m16:16 or m16:32). With the pointer method, the segment and address of the called procedure is encoded in the instruction, using a 4-byte (16-bit operand size) or 6-byte (32-bit operand size) far address immediate.

With the indirect method, the target operand specifies a memory location that contains a 4-byte (16-bit operand size) or 6-byte (32-bit operand size) far address. The far address is loaded directly into the CS and EIP registers. If the operand-size attribute is 16, the upper two bytes of the EIP register are cleared.

When the processor is operating in protected mode, the JMP instruction can be used to perform the following three types of far jumps: a far jump to a conforming or non-conforming code segment; a far jump through a call gate; or a task switch. In protected mode, the processor always uses the segment selector part of the far address to access the corresponding descriptor in the GDT or LDT. The descriptor type (code segment, call gate, task gate, or TSS) and access rights determine the type of jump to be performed.

If the selected descriptor is for a code segment, a far jump to a code segment at the same privilege level is performed. (If the selected code segment is at a different privilege level and the code segment is non-conforming, a general-protection exception is generated.) A far jump to the same privilege level in protected mode is very similar to one carried out in real-address or virtual-8086 mode. The target operand specifies an absolute far address either directly with a pointer (ptr16:16 or ptr16:32) or indirectly with a memory location (m16:16 or m16:32). The operand size attribute determines the size of the offset (16 or 32 bits) in the far address. The new code segment selector and its descriptor are loaded into CS register, and the offset from the instruction is loaded into the EIP register. Note that a call gate can also be used to perform far call to a code segment at the same privilege level. Using this mechanism provides an extra level of indirection and is the preferred method of making jumps between 16-bit and 32-bit code segments.

When executing a far jump through a call gate, the segment selector specified by the target operand identifies the call gate. (The offset part of the target operand is ignored.) The processor then jumps to the code segment specified in the call gate descriptor and begins executing the instruction at the offset specified in the call gate. No stack switch occurs. Here again, the target operand can specify the far address of the call gate either directly with a pointer (ptr16:16 or ptr16:32) or indirectly with a memory location (m16:16 or m16:32).

The execution of the instruction may perform a check to determine if FRED is enabled. When FRED is enabled (e.g., CR4.FRED=IA32_EFER.LMA=1), a reference to a call gate causes a general protection fault.

Executing a task switch with the JMP instruction is somewhat similar to executing a jump through a call gate. Here the target operand specifies the segment selector of the task gate for the task being switched to (and the offset part of the target operand is ignored). The task gate in turn points to the TSS for the task, which contains the segment selectors for the task's code and stack segments. The TSS also contains the EIP value for the next instruction that was to be executed before the task was suspended. This instruction pointer value is loaded into the EIP register so that the task begins executing again at this next instruction.

The JMP instruction can also specify the segment selector of the TSS directly, which eliminates the indirection of the task gate.

A result of the executed instruction is committed at 1609, for example.

Figure 17:
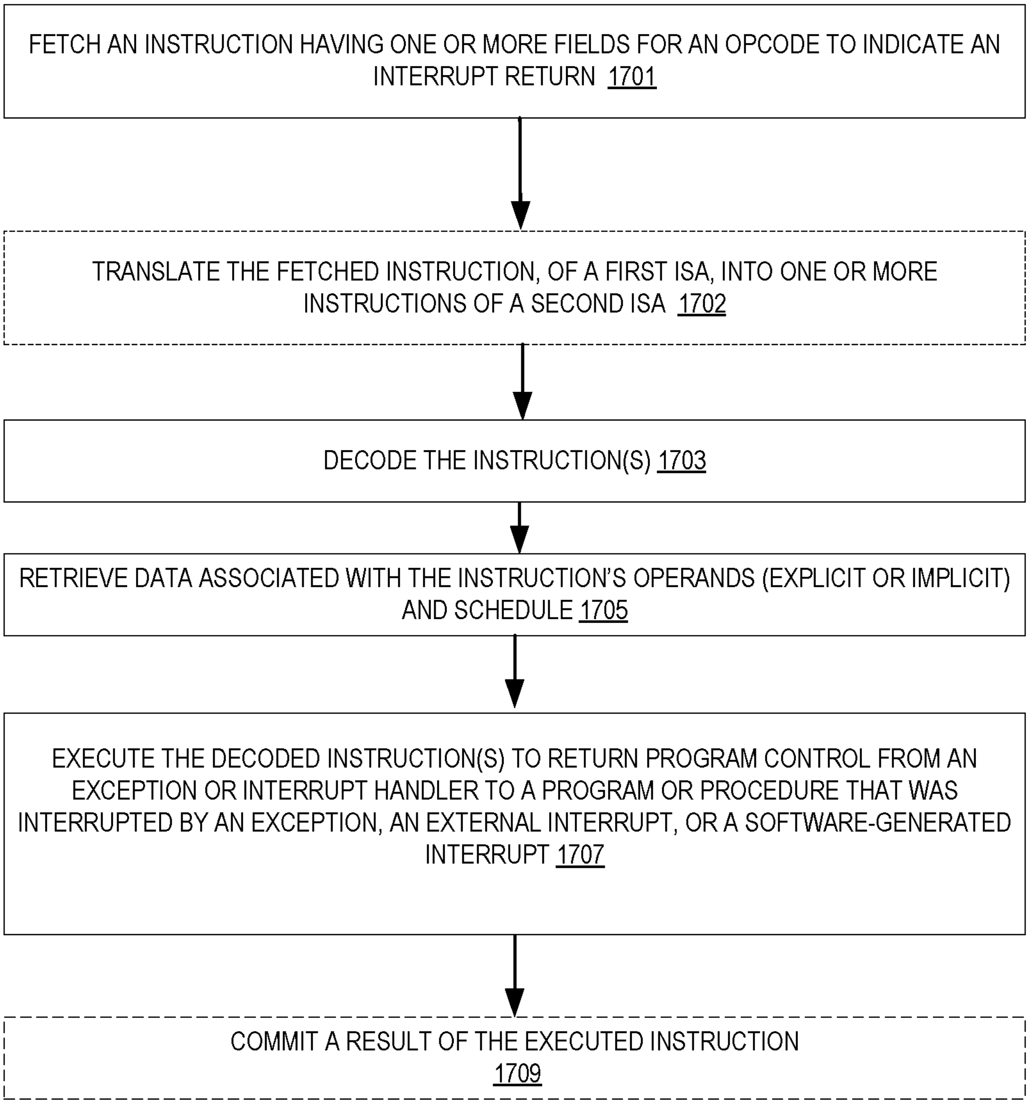
FIG. 17 illustrates an exemplary handling of an interrupt return (IRET) instruction.

FIG. 17 illustrates an example of the handling of an interrupt return (IRET) instruction. It is to be noted that this example as shown in FIG. 17 is independent from the other exemplary methods such as those shown in any one of FIGS. 9, 10, 12, 13, 15, 16, 18, 19, 21, 23, 24, 25, 26, 28. At 1701, a single instruction having one or more fields for an opcode to indicate an interrupt return is fetched. The opcode may be CF.

The fetched single instruction, of a first ISA, may be translated into one or more instructions of a second ISA at 1702. This translation is performed by hardware. However, this translation may also be performed by software layer such as a just-in-time compiler or an ahead-of-time compiler.

The fetched instruction, or translated instruction(s), is/are decoded at 1703. The decoding may result in a plurality of microoperations being generated.

Data associated with the instruction (or instructions) operands (either explicit or implicit) are retrieved at 1705 and the decoded instruction(s) is/are scheduled.

The decoded instruction(s) are executed at 1707 to return program control from an exception or interrupt handler to a program or procedure that was interrupted by an exception, an external interrupt, or a software-generated interrupt.

In real-address mode, the IRET instruction may perform a far return to the interrupted program or procedure. During this operation, the processor pops the return instruction pointer, return code segment selector, and EFLAGS image from the stack to the EIP, CS, and EFLAGS registers, respectively, and then resumes execution of the interrupted program or procedure. In protected mode, the action of the IRET instruction may depend on the settings of the NT (nested task) and VM flags in the EFLAGS register and the VM flag in the EFLAGS image stored on the current stack. Depending on the setting of these flags, the processor performs the following types of interrupt returns: return from virtual-8086 mode; return to virtual-8086 mode; intra-privilege level return; inter-privilege level return; and return from nested task (task switch). When in protected mode, if the RPL value of the target code segment is greater than the CPL and when FRED transitions are enabled, such an execution may cause a general protection fault.

If the NT flag (EFLAGS register) is cleared, the IRET instruction performs a far return from the interrupt procedure, without a task switch. The code segment being returned to must be equally or less privileged than the interrupt handler routine (as indicated by the RPL field of the code segment selector popped from the stack).

As with a real-address mode interrupt return, the IRET instruction pops the return instruction pointer, return code segment selector, and EFLAGS image from the stack to the EIP, CS, and EFLAGS registers, respectively, and then resumes execution of the interrupted program or procedure. If the return is to another privilege level, the IRET instruction also pops the stack pointer and SS from the stack, before resuming program execution. If the return is to a virtual mode, the processor also pops the data segment registers from the stack.

If the NT flag is set, the IRET instruction performs a task switch (return) from a nested task (a task called with a CALL instruction, an interrupt, or an exception) back to the calling or interrupted task. The updated state of the task executing the IRET instruction is saved in its TSS. If the task is re-entered later, the code that follows the IRET instruction is executed.

If the NT flag is set and the processor is in IA-32e mode, the IRET instruction causes a general protection exception.

If non-markable interrupts (NMIs) are blocked, execution of the IRET instruction unblocks NMIs. This unblocking occurs even if the instruction causes a fault. In such a case, NMIs are unmasked before the exception handler is invoked.

A result of the executed instruction is committed at 1709, for example.

Figure 18:
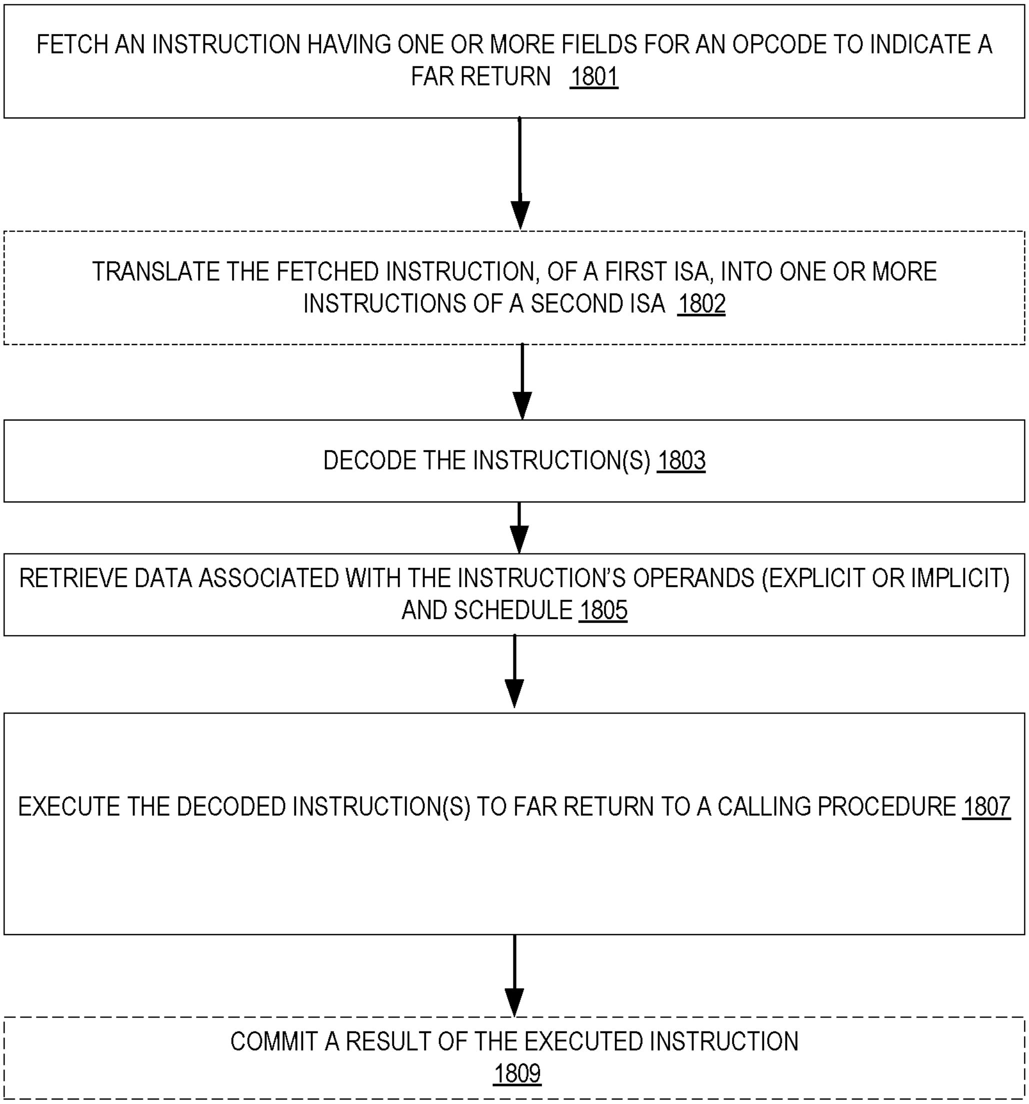
FIG. 18 illustrates an exemplary handling of a far return (RET) instruction.

FIG. 18 illustrates an example of the handling of a far return (RET) instruction. It is to be noted that this example as shown in FIG. 18 is independent from the other exemplary methods such as those shown in any one of FIGS. 9, 10, 12, 13, 15, 16, 17, 19, 21, 23, 24, 25, 26, 28. At 1801, a single instruction having one or more fields for an opcode to indicate a far return is fetched. The single instruction may utilize an immediate to dictate a size of bytes to pop from a stack. The opcode may be CB or CA.

The fetched single instruction, of a first ISA, may be translated into one or more instructions of a second ISA at 1802. This translation may be performed by hardware. However, this translation may also be performed by software layer such as a just-in-time compiler or an ahead-of-time compiler.

The fetched instruction, or translated instruction(s), is/are decoded at 1803. The decoding may result in a plurality of microoperations being generated.

Data associated with the instruction (or instructions) operands (either explicit or implicit) are retrieved at 1805 and the decoded instruction(s) is/are scheduled.

The decoded instruction(s) are executed at 1807 to far return to a calling procedure and may pop the immediate size of bytes to pop from a stack. By way of example, program control is transferred to a return address located on the top of the stack. The address is usually placed on the stack by a CALL instruction, and the return is made to the instruction that follows the CALL instruction. The optional source operand specifies the number of stack bytes to be released after the return address is popped; the default is none. This operand can be used to release parameters from the stack that were passed to the called procedure and are no longer needed. A far return returns to a calling procedure located in a different segment than the current code segment, sometimes referred to as an intersegment return. When executing a far return, the processor (e.g., processor 101) pops the return instruction pointer from the top of the stack into the EIP register, then pops the segment selector from the top of the stack into the CS register. The processor then begins program execution in the new code segment at the new instruction pointer.

When in protected mode, if the RPL value of the target code segment is greater than the CPL and when FRED transitions are enabled, such an execution may cause a general protection fault.

A result of the executed instruction is committed at 1809, for example.

For software interrupts and related instructions (e.g., INT n, INT3, INTO INT1), when FRED transitions are enabled, these instructions may use FRED event delivery. The INT n instruction (opcode CD followed by an immediate byte) generates a software interrupt with a vector specified by the immediate byte. There are 256 such instructions, one for each value of n (0-255). The INT3 (opcode CC) instruction generates a breakpoint exception (#BP) as a trap. The INTO (opcode CE) instruction, if RFLAGS.OF=1, generates an overflow exception (#OF) as a trap and if RFLAGS.OF=0, does not generate an exception and passes control to the next instruction. INTO cannot be executed in 64-bit mode, but it can be executed in compatibility mode. The INT1 (opcode F1) in instruction generates a debug exception (#DB) as a trap. Hardware vendors may use INT1 for hardware debug.

SYSCALL and SYSRET are adjusted for FRED. For example, when FRED transitions are enabled, SYSCALL execution uses FRED event delivery and execution of SYSRET may cause an invalid-opcode exception (#UD).

Figure 19:
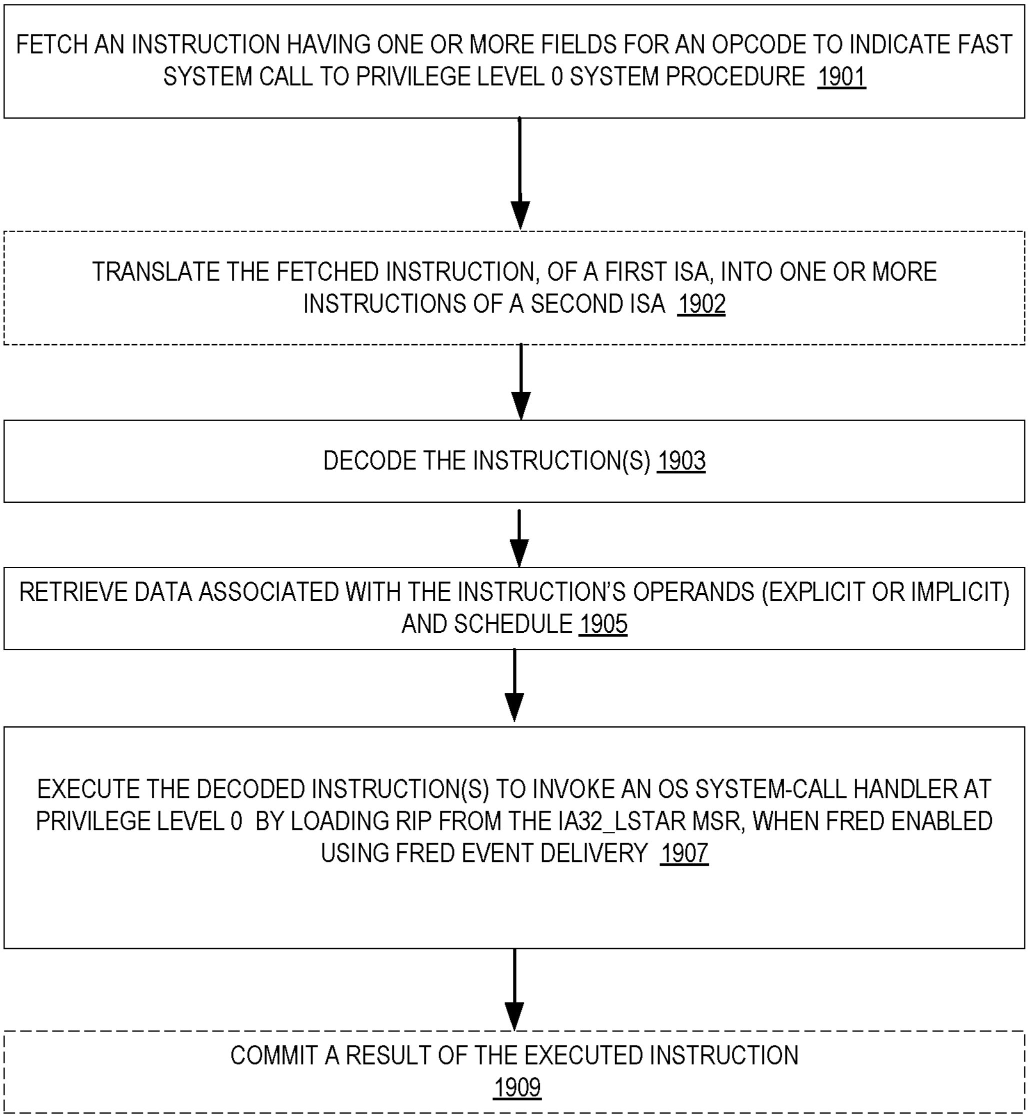
FIG. 19 illustrates an exemplary handling of a system call (SYSCALL) instruction.

FIG. 19 illustrates an example of the handling of a SYSCALL instruction. It is to be noted that this example as shown in FIG. 19 is independent from the other exemplary methods such as those shown in any one of FIGS. 9, 10, 12, 13, 15, 16, 17, 18, 21, 23, 24, 25, 26, 28. At 1901, a single instruction having one or more fields for an opcode to indicate an invocation of an OS system call handler at privilege level 0 is fetched. The opcode may be 0F 05.

The fetched single instruction, of a first ISA, may be translated into one or more instructions of a second ISA at 1902. This translation may be performed by hardware. However, this translation may also be performed by software layer such as a just-in-time compiler or an ahead-of-time compiler.

The fetched instruction, or translated instruction(s), is/are decoded at 1903. The decoding may result in a plurality of microoperations being generated.

Data associated with the instruction (or instructions) operands (either explicit or implicit) are retrieved at 1905 and the decoded instruction(s) is/are scheduled.

The decoded instruction(s) are executed at 1907 to invoke an OS system-call handler at privilege level 0. When FRED is not enabled, the execution of SYSCALL invokes an OS system-call handler at privilege level 0. It does so by loading RIP from the IA32_LSTAR MSR (after saving the address of the instruction following SYSCALL into RCX). The execution of SYSCALL also saves RFLAGS into R11 and then masks RFLAGS using the IA32_FMASK MSR (MSR address C0000084H); specifically, the processor clears in RFLAGS every bit corresponding to a bit that is set in the IA32_FMASK MSR.

The execution of SYSCALL loads the CS and SS selectors with values derived from bits 47:32 of the IA32 STAR MSR. However, the CS and SS descriptor caches are not loaded from the descriptors (in GDT or LDT) referenced by those selectors. Instead, the descriptor caches are loaded with fixed values.

The execution of SYSCALL does not save the stack pointer (RSP). If the OS system-call handler will change the stack pointer, it is the responsibility of software to save the previous value of the stack pointer. This might be done prior to executing SYSCALL, with software restoring the stack pointer with the instruction following SYSCALL (which will be executed after SYSRET). Alternatively, the OS system-call handler may save the stack pointer and restore it before executing SYSRET.

When FRED is enabled, the execution of SYSCALL uses FRED event delivery instead.

A result of the executed instruction is committed at 1909, for example.

FIG. 20 illustrates an example of pseudocode for execution of SYSCALL.

Figure 21:
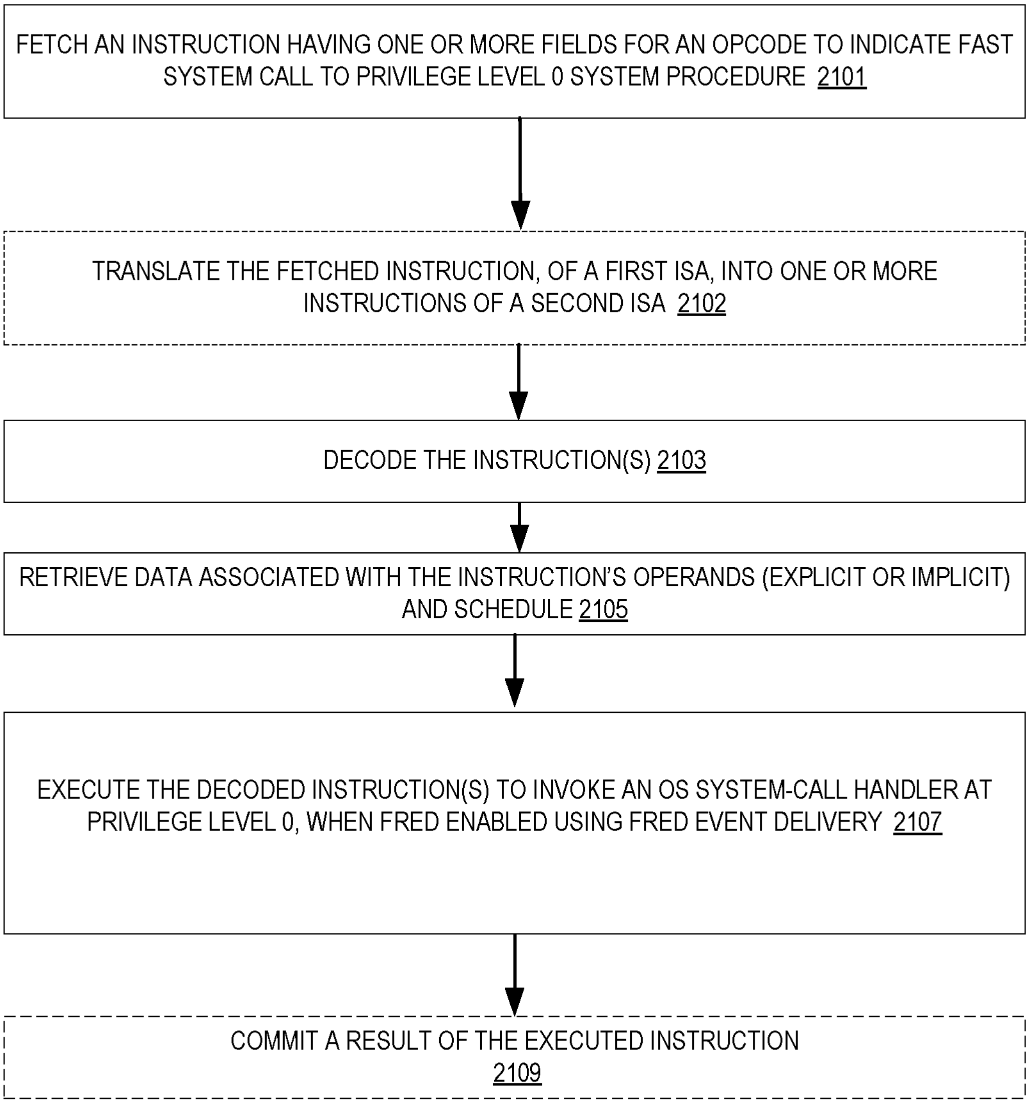
FIG. 21 illustrates an exemplary handling of a system enter (SYSENTER) instruction.

FIG. 21 illustrates an example of the handling of a SYSENTER instruction. It is to be noted that this example as shown in FIG. 17 is independent from the other exemplary methods such as those shown in any one of FIGS. 9, 10, 12, 13, 15, 16, 17, 18, 19, 23, 24, 25, 26, 28. At 2101, a single instruction having one or more fields for an opcode to indicate an invocation of an OS system call handler at privilege level 0 is fetched. The opcode may be 0F 34.

The fetched single instruction, of a first ISA, may be translated into one or more instructions of a second ISA at 2102. This translation may be performed by hardware. However, this translation may also be performed by software layer such as a just-in-time compiler or an ahead-of-time compiler.

The fetched instruction, or translated instruction(s), is/are decoded at 2103. The decoding may result in a plurality of microoperations being generated.

Data associated with the instruction (or instructions) operands (either explicit or implicit) are retrieved at 2105 and the decoded instruction(s) is/are scheduled.

The decoded instruction(s) are executed at 2107 to invoke a privilege level 0 system procedure or routine. When FRED is not enabled, the execution of SYSENTER performs a fast call to a level 0 system procedure or routine. The instruction is optimized to provide the maximum performance for system calls from user code running at privilege level 3 to operating system or executive procedures running at privilege level 0. Prior to executing the SYSENTER instruction, software should specify the privilege level 0 code segment and code entry point, and the privilege level 0 stack segment and stack pointer by writing values to the following MSRs:

IA32_SYSENTER_CS (MSR address 174H)—The lower 16 bits of this MSR are the segment selector for the privilege level 0 code segment. This value is also used to determine the segment selector of the privilege level 0 stack segment. This value cannot indicate a null selector.

IA32_SYSENTER_EIP (MSR address 176H)—The value of this MSR is loaded into RIP (thus, this value references the first instruction of the selected operating procedure or routine). In protected mode, only bits 31:0 are loaded.

IA32_SYSENTER_ESP (MSR address 175H)—The value of this MSR is loaded into RSP (thus, this value contains the stack pointer for the privilege level 0 stack). This value cannot represent a non-canonical address. In protected mode, only bits 31:0 are loaded.

These MSRs can be read from and written to using RDMSR/WRMSR. The WRMSR instruction ensures that the IA32_SYSENTER_EIP and IA32_SYSENTER_ESP MSRs always contain canonical addresses.

While SYSENTER loads the CS and SS selectors with values derived from the IA32_SYSENTER_CS MSR, the CS and SS descriptor caches are not loaded from the descriptors (in GDT or LDT) referenced by those selectors. Instead, the descriptor caches are loaded with fixed values. It is the responsibility of OS software to ensure that the descriptors (in GDT or LDT) referenced by those selector values correspond to the fixed values loaded into the descriptor caches; the SYSENTER instruction does not ensure this correspondence.

The SYSENTER instruction can be invoked from all operating modes except real-address mode.

When FRED is enabled, the execution of SYSENTER may use FRED event delivery instead.

A result of the executed instruction is committed at 2109, for example.

FIG. 22 illustrates an example of pseudocode for execution of SYSENTER.

Figure 23:
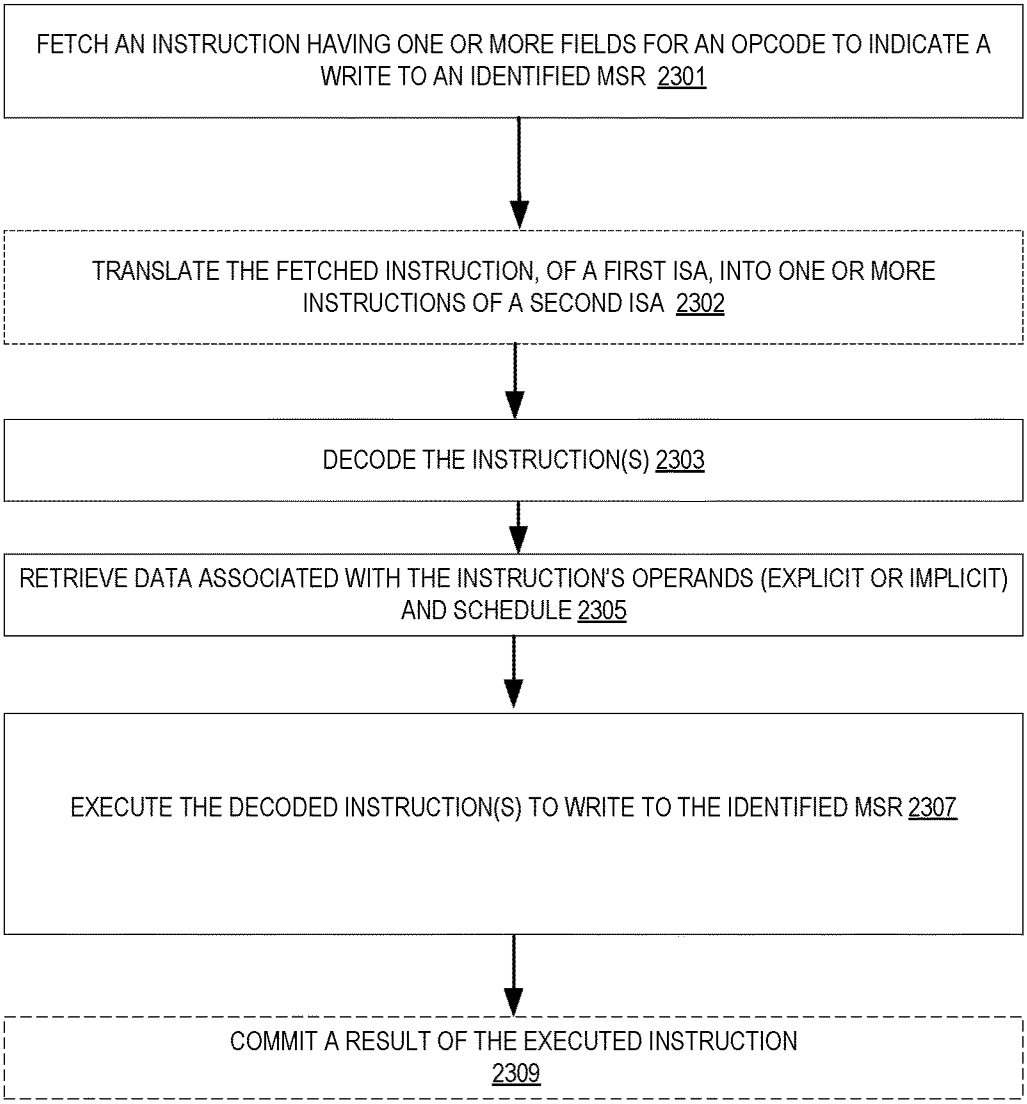
FIG. 23 illustrates an exemplary handling of a write MSR (WRMSR) instruction.

FIG. 23 illustrates an example of the handling of a write MSR (WRMSR) instruction. It is to be noted that this example as shown in FIG. 23 is independent from the other exemplary methods such as those shown in any one of FIGS. 9, 10, 12, 13, 15, 16, 17, 18, 19, 21, 24, 25, 26, 28. At 2301, a single instruction having one or more fields for an opcode to indicate a write to a specified MSR is fetched. The opcode may be 0F 30. The MSR may be specified by a register such as ECX. The value to write may come from other registers such as concatenation of two registers (e.g., EDX:EAX) or a single register.

The fetched single instruction, of a first ISA, may be translated into one or more instructions of a second ISA at 2302. This translation may be performed by hardware. However, this translation may also be performed by software layer such as a just-in-time compiler or an ahead-of-time compiler.

The fetched instruction, or translated instruction(s), is/are decoded at 2303. The decoding may result in a plurality of microoperations being generated.

Data associated with the instruction (or instructions) operands (either explicit or implicit) are retrieved at 2305 and the decoded instruction(s) is/are scheduled.

The decoded instruction(s) are executed at 2307 to write the contents of specified registers (e.g., EDX:EAX) into the 64-bit model specific register (MSR) specified in a different register (e.g., ECX). The contents of the EDX register may be copied to high-order 32 bits of the selected MSR and the contents of the EAX register are copied to low-order 32 bits of the MSR. (On processors that support the Intel 64 architecture, the high-order 32 bits of each of RAX and RDX are ignored.) Undefined or reserved bits in an MSR should be set to values previously read.

This instruction should be executed at privilege level 0 or in real-address mode; otherwise, a general protection exception #GP(0) is generated. Specifying a reserved or unimplemented MSR address in ECX will also cause a general protection exception. The processor (e.g. processor 101) will also generate a general protection exception if software attempts to write to bits in a reserved MSR. When FRED is supported (e.g., by enumerating CPUID.(EAX=7,ECX=1):EAX[bit 17]), a fault is not generated on an attempt to set bit 0 of the IA32_PL0_SSP MSR. However, any write to that MSR by either instruction clears bit 0 of the MSR, regardless of the value of the source operand(s).

A result of the executed instruction is committed at 2309, for example.

Figure 24:
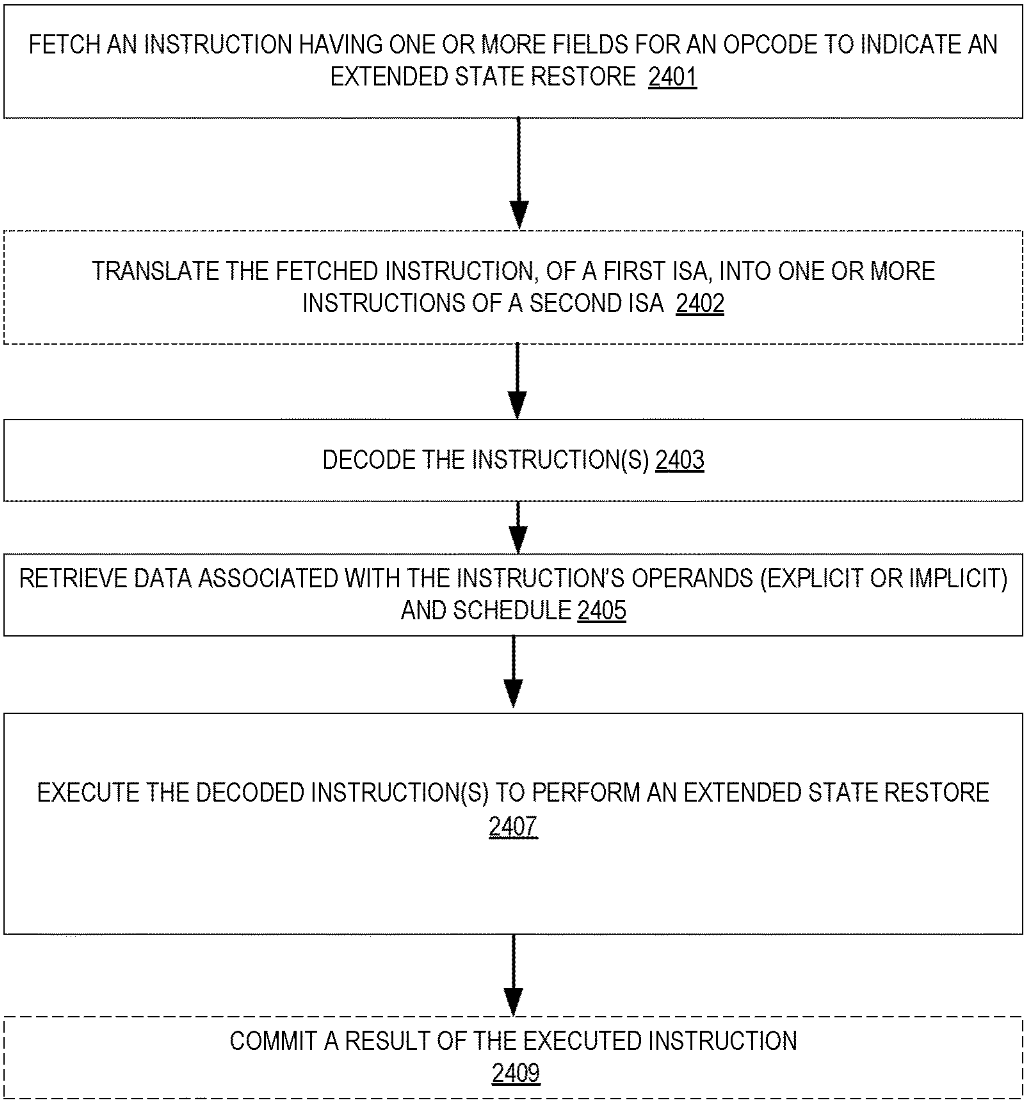
FIG. 24 illustrates an exemplary handling of a restore processor extended state supervisor (XRSTORS) instruction.

FIG. 24 illustrates an example of the handling of a restore processor extended state supervisor (XRSTORS) instruction. It is to be noted that this example as shown in FIG. 24 is independent from the other exemplary methods such as those shown in any one of FIGS. 9, 10, 12, 13, 15, 16, 17, 18, 19, 21, 23, 25, 26, 28. At 2401, a single instruction having one or more fields for an opcode to indicate a restore of state components from a specified memory location is fetched. The opcode may be 0F C7/3. The memory may be specified by a pair of registers (e.g., EDX:EAX).

The fetched single instruction, of a first ISA, may be translated into one or more instructions of a second ISA at 2402. This translation may be performed by hardware. However, this translation may also be performed by software layer such as a just-in-time compiler or an ahead-of-time compiler.

The fetched instruction, or translated instruction(s), is/are decoded at 2403. The decoding may result in a plurality of microoperations being generated.

Data associated with the instruction (or instructions) operands (either explicit or implicit) are retrieved at 2405 and the decoded instruction(s) is/are scheduled.

The decoded instruction(s) are executed at 2407 to perform a full or partial restore of processor state components from a context (e.g., XSAVE) area located at the memory address specified by the implicit source operand. The implicit EDX:EAX register pair specifies a 64-bit instruction mask. The specific state components restored correspond to the bits set in the requested-feature bitmap (RFBM), which is the logical-AND of EDX:EAX and the logical-OR of XCR0 with the IA32_XSS MSR. XRSTORS may be executed only if CPL=0.

When FRED is supported (e.g., by enumerating CPUID.(EAX=7,ECX=1):EAX[bit 17]), a fault is not generated on an attempt to set bit 0 of the IA32_PL0_SSP MSR. However, any write to that MSR by either instruction clears bit 0 of the MSR, regardless of the value of the source operand(s).

A result of the executed instruction is committed at 2409, for example.

64-bit operating systems and their applications may use the GS segment for thread-local storage. Because the operating system and applications use the TLS at different addresses, they use different base addresses for that segment. FRED transitions may ensure that an operating system can always operate with its own GS base address: 1) for events that occur in ring 3, FRED event delivery swaps the GS base address with the IA32_KERNEL_GS_BASE MSR and 2) such that execution of ERETU (the FRED transitions that returns to ring 3) also swaps the GS base address with the IA32_KERNEL_GS_BASE MSR.

An operating system can modify the GS base address of a user thread (e.g., as part of a context switch) by updating the IA32_KERNEL_GS_BASE MSR. However, existing instructions do not allow an operating system to modify the GS segment attributes without compromising its ability always to operate with its own GS base address. This is because the instructions that update those attributes (by loading them from a descriptor table) also update the GS base address.

An execution of an instruction called LKGS ("load into IA32_KERNEL_GS_BASE") may behave like to MOV to GS except that it loads the base address into the IA32_KERNEL_GS_BASE MSR instead of the GS segment's descriptor cache.

Support for LKGS may be enumerated with the feature flag CPUID.(EAX=7,ECX=1):EAX[bit 18].

Figure 25:
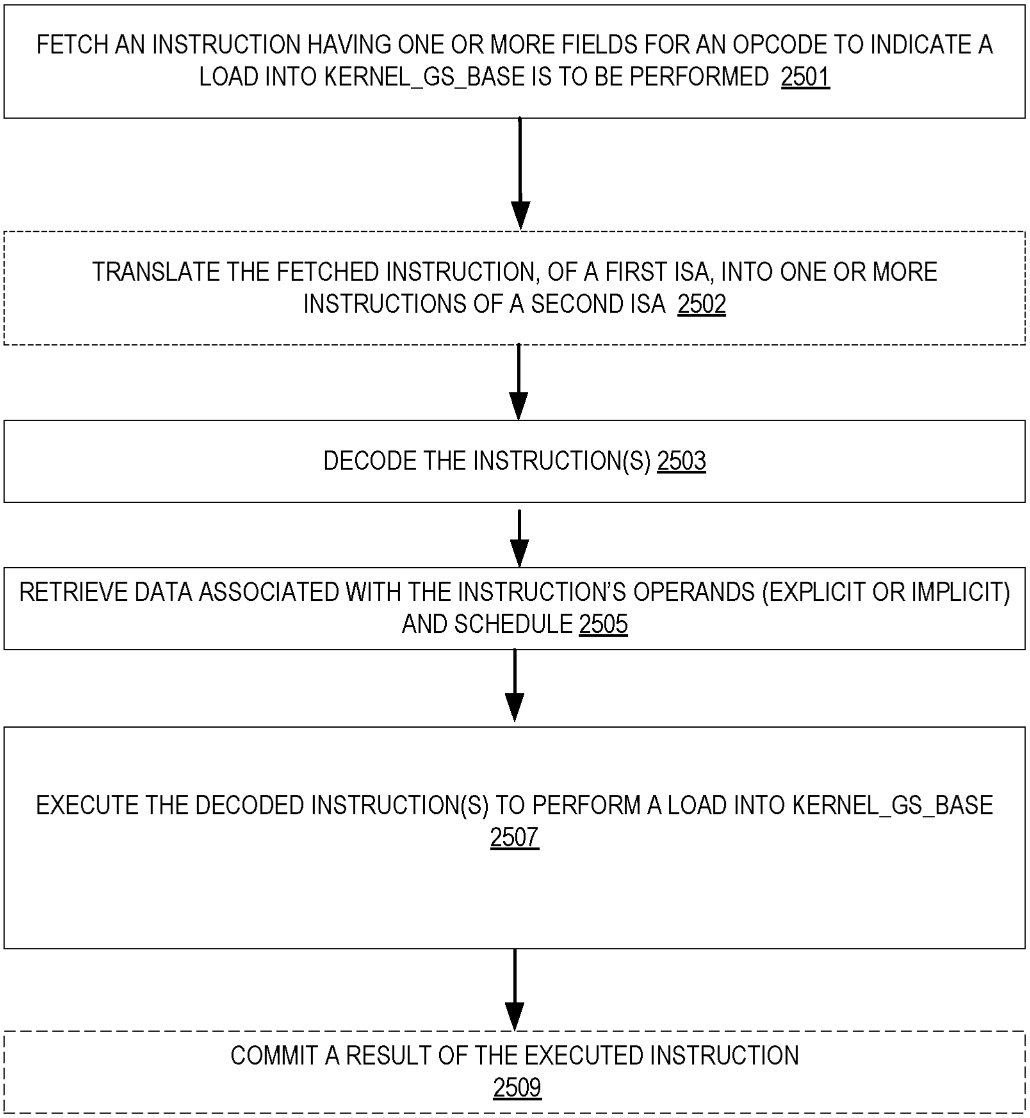
FIG. 25 illustrates an exemplary handling of a load into KERNEL_GS_BASE MSR (LKGS) instruction.

FIG. 25 illustrates an example of the handling of a LKGS instruction. It is to be noted that this example as shown in FIG. 25 is independent from the other exemplary methods such as those shown in any one of FIGS. 9, 10, 12, 13, 15, 16, 17, 18, 19, 21, 23, 24, 26, 28. At 2501, a single instruction having one or more fields for an opcode to indicate a load into KERNEL_GS_BASE MSR of a base address from a descriptor GDT or LDT is fetched. The location of the descriptor is provided by one or more fields defining an operand or operand location. Note the operand may be an immediate, a register storing a 16-bit value, a memory location storing a 16-bit value, etc. The operand may be a segment selector. The opcode may be F2 0F 00/6.

The fetched single instruction, of a first ISA, may be translated into one or more instructions of a second ISA at 2502. This translation may be performed by hardware. However, this translation may also be performed by software layer such as a just-in-time compiler or an ahead-of-time compiler.

The fetched instruction, or translated instruction(s), is/are decoded at 2503. The decoding may result in a plurality of microoperations being generated.

Data associated with the instruction (or instructions) operands (either explicit or implicit) are retrieved at 2505 and the decoded instruction(s) is/are scheduled.

The decoded instruction(s) are executed at 2507 to load a base address of a segment descriptor into KERNEL_GS-_BASE MSR. By way of example, a descriptor from the GDT or the LDT is identified based on the source operand (a GS segment selector). The descriptor is loaded into the GS segment's descriptor cache, but the base address in the loaded descriptor is not loaded into the base address in the descriptor cache (that is unmodified) but is instead loaded into the IA32_KERNEL_GS_BASE MSR (the upper 32 bits of the MSR are cleared). Execution of LKGS may cause an invalid-opcode exception (#UD) if CPL>0.

A result of the executed instruction is committed at 2509, for example.

Figure 26:
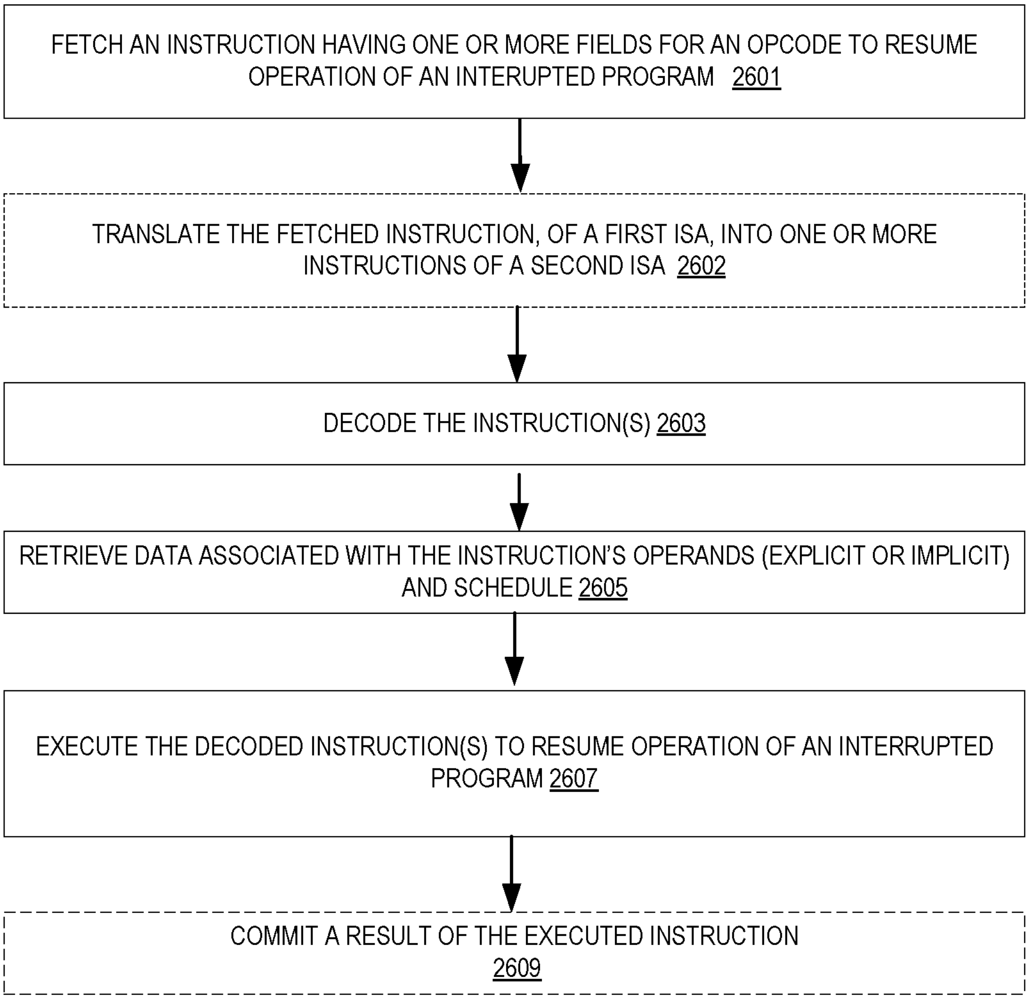
FIG. 26 illustrates an exemplary handling of a resume operation of an interrupted program instruction.

FIG. 26 illustrates an example of the handling of a resume operation of an interrupted program instruction. It is to be noted that this example as shown in FIG. 26 is independent from the other exemplary methods such as those shown in any one of FIGS. 9, 10, 12, 13, 15, 16, 17, 18, 19, 21, 23, 24, 25, 28. The instruction may be a resume from system management mode (RSM) instruction. At 2601, a single instruction having one or more fields for an opcode to indicate a resume operation of an interrupted program is to be performed is fetched. The opcode may be 0F AA.

The fetched single instruction, of a first ISA, may be translated into one or more instructions of a second ISA at 2602. This translation may be performed by hardware. However, this translation may also be performed by software layer such as a just-in-time compiler or an ahead-of-time compiler.

The fetched instruction, or translated instruction(s), is/are decoded at 2603. The decoding may result in a plurality of microoperations being generated.

Data associated with the instruction (or instructions) operands (either explicit or implicit) are retrieved at 2605 and the decoded instruction(s) is/are scheduled.

The decoded instruction(s) are executed at 2607 to return program control from system management mode (SMM) to the application program or operating-system procedure that was interrupted when the processor received an SMM interrupt. The processor's state is restored from the dump created upon entering SMM. If the processor detects invalid state information during state restoration, it enters the shutdown state. The following invalid information can cause a shutdown: 1) any reserved bit of CR4 is set to 1; 2) any illegal combination of bits in CR0, such as (PG=1 and PE=0) or (NW=1 and CD=0); 3) the value stored in the state dump base field is not a 32-KByte aligned address; 4) if FRED transitions would be enabled after RSM (CR4.FRED=IA32_EFER.LMA=1) and CPL would be 1 or 2; or 5) if FRED transitions would be enabled after RSM, CPL would be 3, and the I/O privilege level (IOPL) would be non-zero.

The contents of the model-specific registers are not affected by a return from SMM. The SMM state map used by RSM supports resuming processor context for non-64-bit modes and 64-bit mode.

A result of the executed instruction is committed at 2609, for example.

As noted earlier, a processor (such as processor 101) may support virtualization (e.g., the use of a virtual-machine monitor (VMM) or hypervisor that typically runs on a computer and presents to other software the abstraction of one or more virtual machines (VMs)). Each virtual machine may function as a self-contained platform, running its own "guest operating system" (i.e., an operating system (OS) hosted by the VMM) and other software, collectively referred to as guest software. The guest software expects to operate as if it were running on a dedicated computer rather than a virtual machine. That is, the guest software expects to control various events and have access to hardware resources. The hardware resources may include processor-resident resources (e.g., control registers), resources that reside in memory (e.g., descriptor tables) and resources that reside on the underlying hardware platform (e.g., input-output devices). The events may include internal interrupts, external interrupts, exceptions, platform events (e.g., initialization (INIT) or system management interrupts (SMIs)), and the like.

In a virtual-machine environment, the VMM should be able to have ultimate control over the events and hardware resources as described in the previous paragraph to provide proper operation of guest software running on the virtual machines and for protection from and among guest software running on the virtual machines, To achieve this, the VMM typically receives control when guest software accesses a protected resource or when other events (such as interrupts or exceptions) occur. For example, when an operation in a virtual machine supported by the VMM causes a system device to generate an interrupt, the currently running virtual machine is interrupted and control of the processor is passed to the VMM. The VMM then receives the interrupt, and handles the interrupt itself or invokes an appropriate virtual machine and delivers the interrupt to that virtual machine.

Figure 27:
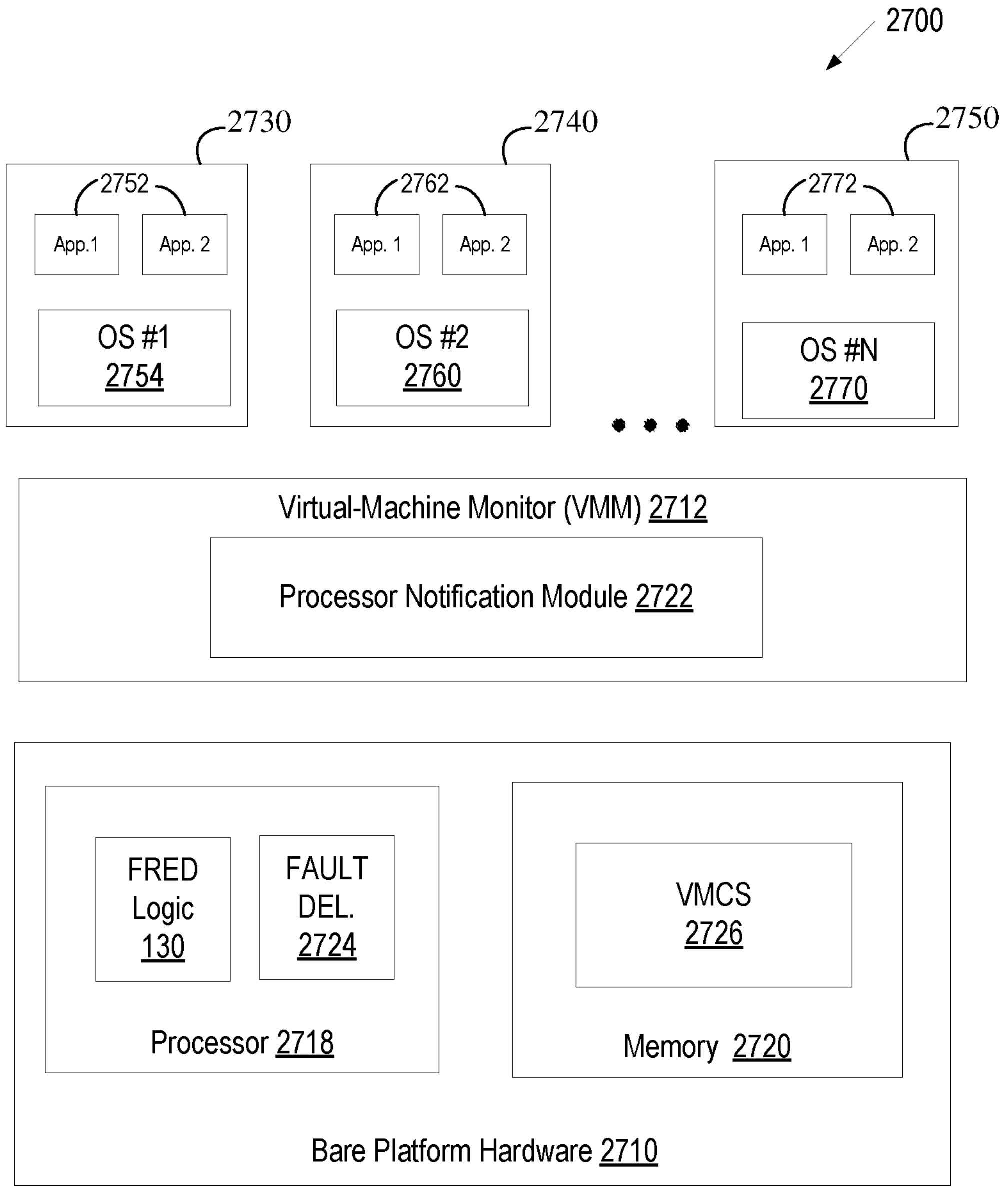
FIG. 27 illustrates an example of a virtual-machine environment.

FIG. 27 illustrates a virtual-machine environment 2700, in which some examples operate. In the virtual-machine environment 2700, bare platform hardware 2710 includes a computing platform, which may be capable, for example, of executing a standard operating system (OS) and/or a virtual-machine monitor (VMM), such as a VMM 2712. FIG. 27 shows three VMs, 2730, 2740 and 2750. The guest software running on each VM may include a guest OS such as a guest OS 2754, 2760 or 2770 and various guest software applications 2752, 2762 and 2772.

The guest OSs 2754, 2760 and 2770 expect to access physical resources (e.g., processor registers, memory and input-output (I/O) devices) within corresponding VMs (e.g., VM 2730, 2740 and 2750) on which the guest OSs are running and to perform other functions. For example, the guest OS expects to have access to all registers, caches, structures, I/O devices, memory and the like, according to the architecture of the processor and platform presented in the VM. The resources that can be accessed by the guest software may either be classified as "privileged" or "non-privileged." For privileged resources, the VMM 2712 facilitates functionality desired by guest software while retaining ultimate control over these privileged resources. Non-privileged resources do not need to be controlled by the VMM 2712 and can be accessed by guest software.

Further, each guest OS expects to handle various fault events such as exceptions (e.g., page faults, general protection faults, etc.), interrupts (e.g., hardware interrupts, software interrupts), and platform events (e.g., initialization (INIT) and system management interrupts (SMIs)). Some of these fault events are "privileged" because they must be handled by the VMM 2712 to ensure proper operation of VMs 2730 through 2750 and for protection from and among guest software.

When a privileged fault event occurs or guest software attempts to access a privileged resource, control may be transferred to the VMM 2712. The transfer of control from guest software to the VMM 2712 is referred to herein as a VM exit. After facilitating the resource access or handling the event appropriately, the VMM 2712 may return control to guest software. The transfer of control from the VMM 2712 to guest software is referred to as a VM entry. The VMM 2712 may request the processor 2718 to perform a VM entry by executing a VM entry instruction.

The processor 2718 (e.g., processor 101) may control the operation of the VMs 2730, 2740 and 2750 in accordance with data stored in a virtual machine control structure (VMCS) 2726. The VMCS 2726 is a structure that may contain state of guest software, state of the VMM 2712, execution control information indicating how the VMM 2712 wishes to control operation of guest software, information controlling transitions between the VMM 2712 and a VM, etc. The VMCS may be stored in memory 2720. Multiple VMCS structures may be used to support multiple VMs.

When a privileged fault event occurs, the VMM 2712 may handle the fault itself or decide that the fault needs to be handled by an appropriate VM. If the VMM 2712 decides that the fault is to be handled by a VM, the VMM 2712 requests the processor 2718 to invoke this VM and to deliver the fault to this VM. The VMM 2712 may accomplish this by setting a fault indicator to a delivery value and generating a VM entry request. The fault indicator may be stored in the VMCS 2726.

The processor 2718 includes fault delivery logic 2724 that receives the request of the VMM 2712 for a VM entry and determines whether the VMM 2722 has requested the delivery of a fault to the VM. The fault delivery logic 2724 may make this determination based on the current value of the fault indicator stored in the VMCS 2726. If the fault delivery logic 2724 determines that the VMM has requested the delivery of the fault to the VM, it delivers the fault to the VM when transitioning control to this VM. Note that FRED logic 130 may be a part of the fault delivery logic 2724 or work with the fault delivery logic 2724.

Delivering of the fault may involve searching a redirection structure for an entry associated with the fault being delivered, extracting from this entry a descriptor of the location of a routine designated to handle this fault, and jumping to the beginning of the routine using the descriptor. Routines designated to handle corresponding interrupts, exceptions or any other faults are referred to as handlers. In some instruction set architectures (ISAs), certain faults are associated with error codes that may need to be pushed onto stack (or provided in a hardware register or via other means) prior to jumping to the beginning of the handler.

During the delivery of a fault, the processor 2718 may perform one or more address translations, converting an address from a virtual to physical form. For example, the address of the interrupt table or the address of the associated handler may be a virtual address. The processor may also need to perform various checks during the delivery of a fault. For example, the processor may perform consistency checks such as validation of segmentation registers and access addresses (resulting in limit violation faults, segment-not-present faults, stack faults, etc.), permission level checks that may result in protection faults (e.g., general-protection faults), etc.

Address translations and checking during fault vectoring may result in a variety of faults, such as page faults, general protection faults, etc. Some faults occurring during the delivery of a current fault may cause a VM exit. For example, if the VMM 2712 requires VM exists on page faults to protect and virtualize the physical memory, then a page fault occurring during the delivery of a current fault to the VM will result in a VM exit.

The fault delivery logic 2724 may address the above possible occurrences of additional faults by checking whether the delivery of the current fault was successful. If the fault delivery logic 2724 determines that the delivery was unsuccessful, it further determines whether a resulting additional fault causes a VM exit. If so, the fault delivery logic 2724 generates a VM exit. If not, the fault delivery logic 2724 delivers the additional fault to the VM.

Figure 28:
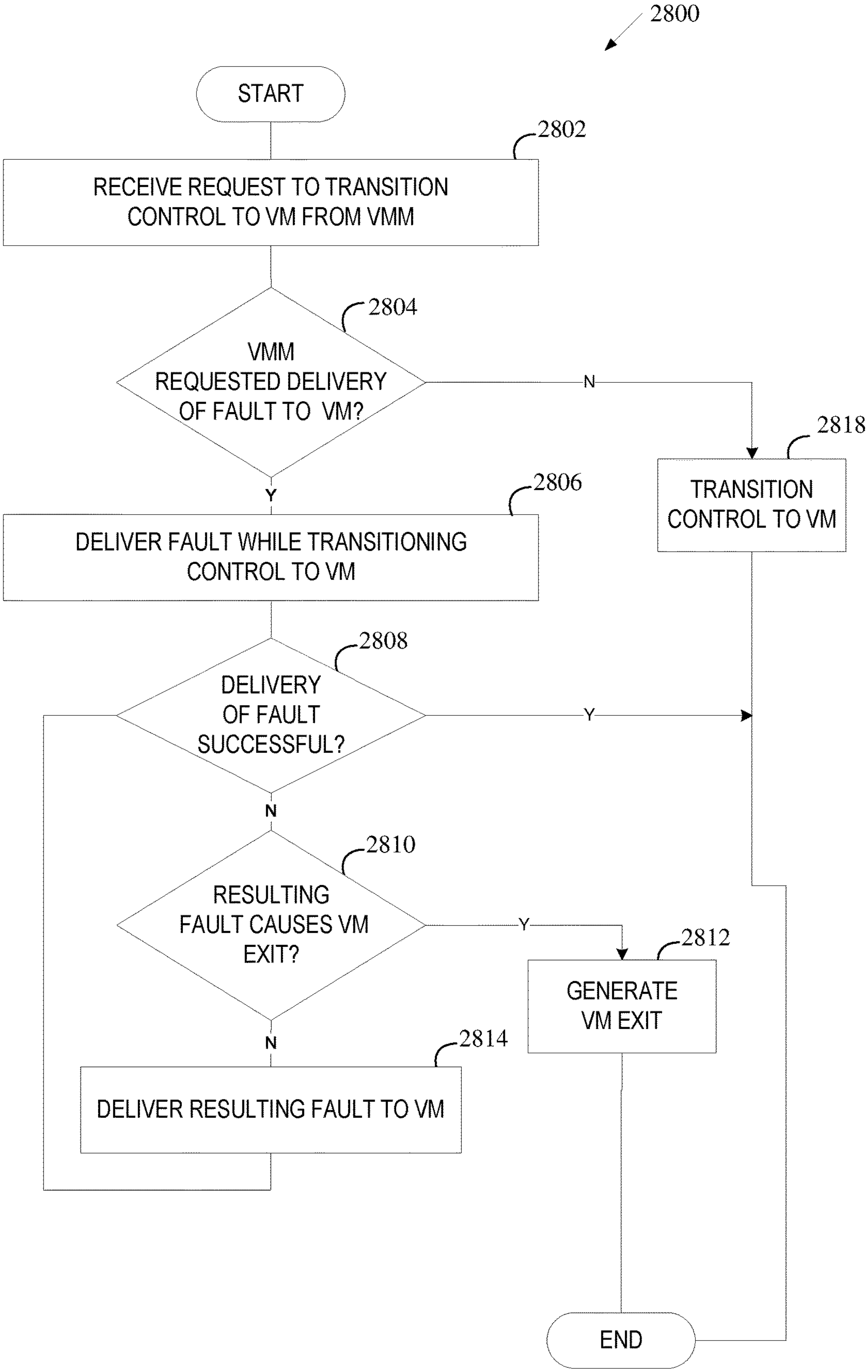
FIG. 28 is a flow diagram of examples of a process for handling faults in a virtual machine environment.

FIG. 28 is a flow diagram of an example of a process 2800 for handling faults in a virtual machine environment. It is to be noted that this example as shown in FIG. 28 is independent from the other exemplary methods such as those shown in any one of FIGS. 9, 10, 12, 13, 15, 16, 17, 18, 19, 21, 23, 24, 25, 26. The process may be performed by processing logic that may include hardware (e.g., circuitry, dedicated logic, programmable logic, microcode, etc.), software (such as that run on a general-purpose computer system or a dedicated machine), or a combination of both. Process 2800 may be performed by fault delivery logic 2724 and/or FRED logic 130.

Referring to FIG. 28, process 2800 begins with processing logic receiving a request to transition control to a VM from a VMM (block 2802). The request to transition control may be received via a VM entry instruction executed by the VMM.

At decision box 2804, processing logic determines whether the VMM has requested a delivery of a fault to the VM that is to be invoked. A fault may be an internal interrupt (e.g., software interrupt), an external interrupt (e.g., hardware interrupt), an exception (e.g., page fault), a platform event (e.g., initialization (INIT) or system management interrupts (SMIs)), or any other fault event. Processing logic may determine whether the VMM has requested the delivery of a fault by reading the current value of a fault indicator maintained by the VMM. The fault indicator may reside in the VMCS or any other data structure accessible to the VMM and processing logic. When the VMM wants to have a fault delivered to a VM, the VMM may set the fault indicator to the delivery value and then generates a request to transfer control to this VM. If no fault delivery is needed during a VM entry, the VMM sets the fault indicator to a no-delivery value prior to requesting the transfer of control to the VM.

If processing logic determines that the VMM has requested a delivery of a fault, processing logic delivers the fault to the VM while transitioning control to the VM (block 2806). Processing logic then checks whether the delivery of the fault was successful (decision box 2808). If so, process 2800 ends. If not, processing logic determines whether a resulting additional fault causes a VM exit (decision box 2810). If so, processing logic generates a VM exit (block 2812). If not, processing logic delivers the additional fault to the VM (block 2814), and, returning to block 2808, checks whether this additional fault was delivered successfully. If so, process 2800 ends. If not, processing logic returns to decision box 2810.

If processing logic determines that the VMM has not requested a delivery of a fault, processing logic transitions control to the VM without performing any fault related operations (block 2818).

When processing logic needs to deliver a fault to a VM, it may search a redirection structure (e.g., the interrupt-descriptor table in the instruction set architecture (ISA) of the Intel® Pentium® 4 (referred to herein as the IA-32 ISA)) for an entry associated with the fault being delivered, may extract from this entry a descriptor of a handler associated with this fault, and may jump to the beginning of the handler using the descriptor. The interrupt-descriptor table may be searched using fault identifying information such as a fault identifier and a fault type (e.g., external interrupt, internal interrupt, non-markable interrupt (NMI), exception, etc.). Certain faults (e.g., some exceptions) may be associated with error codes that need to be pushed onto stack (or provided in a hardware register or via other means) prior to jumping to the beginning of the handler. The fault identifying information and associated error code may be provided by the VMM using a designated data structure. The designated data structure may be part of the VMCS.

Figure 29:
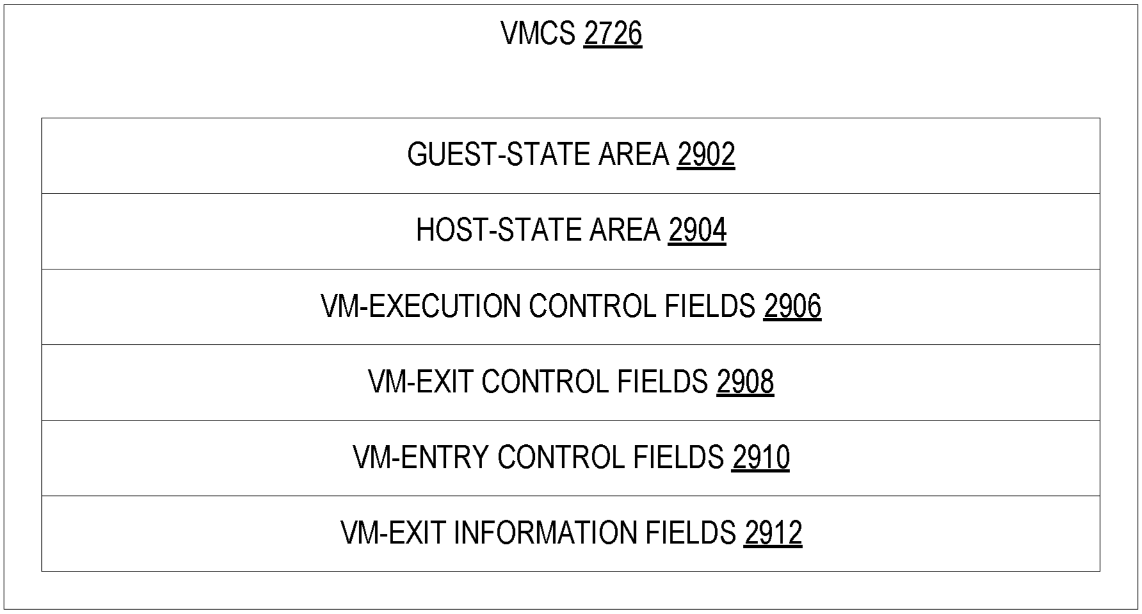
FIG. 29 illustrates exemplary examples of a VMCS.

FIG. 29 illustrates an example of a VMCS. Each virtual machine is a guest software environment that supports a stack (and potentially a shadow stack) including, for example, an operating system and application software. Each VM may operate independently of other virtual machines and uses the same interface to processor(s), memory, storage, graphics, and I/O provided by a physical platform. The software stack acts as if the software stack were running on a platform with no MINA. Software executing in a virtual machine operates with reduced privilege or its original privilege level such that the VMM can retain control of platform resources per a design of the VMM or a policy that governs the VMM, for example.

The VMM may begin a virtual machine extension (VMX) root mode of operation. The VMM starts guest execution by invoking a VM entry instruction. The VMM invokes a launch instruction for execution for a first VM entry of a virtual machine. The VMM invokes a resume for execution for all subsequent VM entries of that virtual machine.

During execution of a virtual machine, various operations or events (e.g., hardware interrupts, software interrupts, exceptions, task switches, and certain VM instructions) may cause a VM exit to the VMM, after which the VMM regains control. VM exits transfer control to an entry point specified by the VMM, e.g., a host instruction pointer. The VMM may take action appropriate to the cause of the VM exit and may then return to the virtual machine using a VM entry.

These transitions of a VM entry and a VM exit are controlled by the VMCS 2726 data structure stored in the memory. The processor controls access to the VMCS 2726 through a component of processor state called the VMCS pointer (one per virtual processor) that is setup by the VMM. A VMM may use a different VMCS for each virtual processor that it supports. For a virtual machine with multiple virtual processors, the VMM could use a different VMCS 2726 for each virtual processor.

The VMCS 2726 may include six logical groups of fields: a guest-state area 2902, a host-state area 2904, VM-execution control fields 2906, VM-exit control fields 2908, VM-entry control fields 2910, and a VM-exit information fields 2912. These six logical groups of fields are merely exemplary and other processors may have more or fewer groups of fields.

The VM-execution control fields 2906 define how the processor 2718 should react in response to different events occurring in the VM. The VM-exit control fields 2908 may define what the processor should do when it exits from the virtual machine, e.g., store a guest state of the VM in the VMCS 2726 and load the VMM (or host) state from the VMCS 2726. The VMM state may be a host state including fields that correspond to processor registers, including the VMCS pointer, selector fields for segment registers, base-address fields for some of the same segment registers, and values of a list of model-specific registers (MSRs) that are used for debugging, program execution tracing, computer performance monitoring, and toggling certain processor features.

The VM-entry control fields 2910 may define what the processor should do upon entry to the virtual machine, e.g., to conditionally load the guest state of the virtual machine from the VMCS, including debug controls, and inject an interrupt or exception, as necessary, to the virtual machine during entry.

The guest-state area 2902 may be a location where the processor stores a VM processor state upon exits from and entries to the virtual machine.

The host-state area 2904 may be a location where the processor stores the VMM processor (or host) state upon exit from the virtual machine.

The VM-exit information fields 2912 may be a location where the processor stores information describing a reason of exit from the virtual machine.

As noted before, the event stack level used by FRED event delivery may depend on whether the event was a nested exception encountered during delivery of another event. For proper virtualization of this detail, processors that support FRED, for example, support a feature called VM nested-exception support. A processor may enumerate VMX nested-exception support by setting bit 58 in a capability MSR (e.g., IA32_VMX_BASIC).

VM vested-exception support changes the way that VM exits establish certain VM-exit information fields 2912 and the way that VM entries use a related VM-entry control field 2910.

The table below illustrates examples of a VM-exit information field 2912

Format of Exit Reason

| Bit Position(s) | Content |
|---|---|
| 15:0 | Basic exit reason |
| 16 | Always cleared to 0 |
| 26:17 | Not currently defined |
| 27 | A VM exit saves this bit as 1 to indicate that the VM exit was incident to enclave mode. |
| 28 | Pending MTF VM exit |
| 29 | VM exit from VMX root operation |
| 30 | Not currently defined |
| 31 | VM-entry failure (0 = true VM exit; 1 = VM-entry failure) |

Event-specific information may be provided for VM exits due to the following vectored events: exceptions (including those generated by interrupt instructions, etc.); external interrupts that occur while the "acknowledge interrupt on exit" VM-exit control is 1; and non-markable interrupts (NMIs). This information is provided in the following VM-exit interruption information fields as shown below:

Format of the VM-Exit Interruption-Information Field

| Bit Position(s) | Content |
|---|---|
| 7:0 | Vector of interrupt or exception |
| 10:8 | Interruption type:<br>0: External interrupt<br>1: Not used<br>2: Non-maskable interrupt (NMI)<br>3: Hardware exception<br>4: Not used<br>5: Privileged software exception<br>6: Software exception<br>7: Not used |

-continued

| Format of the VM-Exit Interruption-Information Field | |
|---|---|
| Bit Position(s) | Content |
| 11 | Error code valid (0 = invalid; 1 = valid) |
| 12 | NMI unblocking due to IRET |
| 13 | VM nested-exception support |
| 30:14 | Not currently defined |
| 31 | Valid |

The VM-exit information field is valid for VM exits due to events that would be delivered to guest software with interrupt (e.g., interrupt descriptor table (IDT) event delivery or FRED event delivery) if they did not cause a VM exit. The field provides details about the nature of the event causing the VM exit. VM nested-exception support is defined by bit 13 of this field, for example, which is always saved as 0 by processors without VM nested-exception support.

With VM nested-exception support, a VM exit saves bit 13 of this field as 1 if the VM exit is due to a nested exception encountered during delivery of an earlier event. This is done even if FRED transitions are not enabled (i.e., even if that earlier event was being delivered using IDT event delivery). Other VM exits for which the field is valid (including VM exit due to #DF) save bit 13 as 0. The value of this bit may be always identical to that of the valid bit of the IDT-vectoring information field.

Additional information is provided for VM exits that occur during event delivery in VMX non-root operations. This VM-exit information field is valid for VM exits due to events encountered during delivery of an earlier event being delivered to guest software with IDT event delivery or FRED event delivery (including SYSCALL and SYSENTER with FRED event delivery). This information may be provided in the following fields for IDT-vectoring information.

| Format of the IDT-Vectoring Information Field | |
|---|---|
| Bit Position(s) | Content |
| 7:0 | Vector of interrupt or exception |
| 10:8 | Interruption type:<br>0: External interrupt<br>1: Not used<br>2: Non-maskable interrupt (NMI)<br>3: Hardware exception<br>4: Software interrupt<br>5: Privileged software exception<br>6: Software exception<br>7: Not used |
| 11 | Error code valid (0 = invalid; 1 = valid) |
| 12 | Not currently defined |
| 13 | VM nested-exception support |
| 30:14 | Not currently defined |
| 31 | Valid |

VM nested-exception support is defined in bit 13 of this field, which is always saved as 0 by processors without VM nested-exception support. With VM nested-exception support, a VM exit saves bit 13 as 1 if the earlier event was itself a nested exception encountered during delivery of another event. The bit does not communicate information about the later event that caused the VM exit. This feature applies even if FRED is not enabled (and thus the earlier event was being delivered using IDT event delivery). Other VM exits for which the field is valid (including VM exits due to events encountered during delivery of #DF) save bit 13 as 0.

Software establishes a valid value in the VM-entry interruption information field of the VM-entry control field to specify an event to be injected at the end of the next VM entry. Examples of this VM-entry interruption information field are detailed below:

| Format of the VM-Entry Interruption-Information Field | |
|---|---|
| Bit Position(s) | Content |
| 7:0 | Vector of interrupt or exception |
| 10:8 | Interruption type:<br>0: External interrupt<br>1: Reserved<br>2: Non-maskable interrupt (NMI)<br>3: Hardware exception (e.g., #PF)<br>4: Software interrupt (INT n)<br>5: Privileged software exception (INT1)<br>6: Software exception (INT3 or INTO)<br>7: Other event |
| 11 | Deliver error code (0 = do not deliver; 1 = deliver) |
| 12 | Reserved |
| 13 | VM nested-exception support |
| 30:14 | Reserved |
| 31 | Valid |

VM nested-exception support is defined by bit 13 of this field. (For processors without VM nested-exception support, VM entry fails if this bit is 1.) With VM nested-exception support, VM entry allows bit 13 to be 1 if the field indicates injection of a hardware exception (bits 10:8, the type, should have value 3). If FRED transitions will be enabled in the guest and thus the injected exception will be delivered using FRED event delivery, the event's stack level is determined as if the event had been a nested exception encountered during delivery of another event. If FRED transitions will not be enabled in the guest, bit 13 of the field is ignored. If the field indicates injection of any other event (bits 10:8 have value other than 3), VM entry fails if this bit is 1.

Note that in some examples, some of the above fields have different names. For events causing VM exits instead of VM-exit interruption information the name Exiting-event identification is used and instead of VM-exit interruption error code the name Exiting-event error code is used. For VM exits occurring during event delivery the name IDT-vectoring information is replaced with Original-event identification and the name IDT-vectoring error code is replaced with Original-event error code. For events injected by VM entry the name VM-entry interruption information is replaced with Injected-event identification and VM-entry exception error code is replaced with Injected-event error code.

In some examples, additional VMCS fields are defined for the event data saved by FRED event delivery. The first field is a 64-bit VMX control field called injected-event data. If VM-entry injection of an event uses FRED event delivery, the event data saved on the stack is the value of this field (see Section 9.5.4). The second new field is a 64-bit exit-information field called original-event data. If a VM exit occurs during FRED event delivery, the event data that would have saved on the stack is instead stored into this field.

A VMM (or its hosting operating system) should be able to use FRED transitions as well as allowed guest software to do so. For that reason, VM transitions (VM entries and VM exits) must establish context sufficient to support FRED event delivery immediately after the transition. In addition, VM exits should be able to save the corresponding guest context before loading that for the VMM.

To support this context management, for example, new fields are added to the VMCS that correspond to the configuration MSRs detailed above (e.g., IA32_FRED_ CONFIG, IA32_FRED_RSP0, IA32_FRED_RSP1, IA32_ FRED_RSP2, IA32_FRED_RSP3, IA32_FRED_STKLVLS, IA32_FRED_SSP1, IA32_FRED_SSP2, IA32_FRED_ SSP3, and IA32_STAR, IA32_FMASK, IA32_ KERNEL_ GS_BASE, and IA32_PL0_SSP (also known as IA32_FRED_SSP0).

Fields for some of these MSRs are added to both the host-state and guest-state areas of the VMCS, for example. VMCS fields may not be needed for all of these MSRs. By way of example, fields are not added for the following MSRs: IA32_FRED_RSP0, IA32_STAR, and IA32_KERNEL_GS_BASE. Before VM entry, a virtual-machine monitor should ensure that these MSRs contain the values expected by guest software in the virtual machine being entered (e.g., with a WRMSR instruction).

A VMM (or its hosting operating system) should be able to use FRED transitions as well as allow guest software to do so. For that reason, VM transitions (VM entries and VM exits) establish context sufficient to support FRED event delivery immediately after the transition. In addition, VM exits should be able to save the corresponding guest context before loading that for the VMM.

To support this context management, the VMCS includes fields that correspond to the configuration MSRs identified earlier in some examples. For example, fields for the MSRs for FRED transitions: IA32_FRED_CONFIG, IA32_ FRED_RSP0, IA32_FRED_RSP1, IA32_FRED_RSP2, IA32_ FRED_RSP3, IA32_FRED_STKLVLS, IA32_FRED_ SSP1, IA32_FRED_SSP2, and IA32_FRED_SSP3; and fields for MSRs used by FRED transitions: IA32_STAR, IA32_FMASK, IA32_KERNEL_GS_BASE, and IA32_PL0_SSP (also known as IA32_FRED_SSP0).

Fields for some of these MSRs may be added to both the host-state and guest-state areas of the VMCS. Note that VMCS fields are not needed for all of these MSRs. By way of example, fields are not included for the following MSRs: IA32_FRED_RSP0, IA32_STAR, and IA32_KERNEL_GS_BASE. Before VM entry, a virtual-machine monitor should ensure that these MSRs contain the values expected by guest software in the virtual machine being entered (e.g., with the WRMSR instruction).

As noted earlier, each VM exit must establish the configuration required for FRED transitions immediately after the VM exit. The CPL is always 0 after any VM exit. For that reason, delivery of an event that arrives immediately a VM exit cannot cause a ring transition; the return from such an event will use ERETS, not ERETU. As a result, the following MSRs will not be needed for delivery of and return from such an event: IA32_FRED_RSP0 and IA32_PL0_SSP (aka IA32_FRED_SSP0). If CPL=0, FRED event delivery loads RSP from a FRED_RSP MSR only if the stack level is numerically increasing; consequently, such FRED event delivery would not use IA32_FRED_RSP0 or IA32_PL0_SSP. Similarly, ERETS uses IA32_FRED_SSPi only when returning from stack level i to a numerically lower stack level; as a result, ERETS would never use IA32_PL0_SSP. (ERETS does not use the FRED_RSP MSRs at all.) IA32_STAR. FRED event delivery uses this MSR only when loading CS and SS when delivering an event that arrives in ring 3. ERETS does not use this MSR. IA32_KERNEL_GS_BASE. FRED event delivery swaps this MSR with the GS base address only when delivering an event that arrives in ring 3. ERETS does not do this swapping.

The host-state area 2904 may include 64-bit fields for the following MSRs (an exemplary encoding pair for each field is shown parenthetically): IA32_FRED_CONFIG (2C08H/ 2C09H), IA32_FRED_RSP1 (2C0AH/2C0BH), IA32_FRED_RSP2 (2C0CH/2C0DH), IA32_FRED_RSP3 (2C0EH/2C0FH), IA32_FRED_STKLVLS (2C10H/ 2C11H), IA32_FRED_SSP1 (2C12H/2C13H), IA32_FRED_SSP2 (2C14H/2C15H), IA32_FRED_SSP3 (2C16H/2C17H), and IA32_FMASK (2C18H/2C19H).

Since the MSRs of the host-state area 2084 will be loaded by VM exits, it must be possible for their guest values to be saved earlier by those VM exits. For that reason, corresponding fields are added to the guest-state area 2902 of the VMCS 2726. In addition, the guest-state area includes a field corresponding to the IA32_PL0_SSP MSR (which FRED transitions use as IA32_FRED_SSP0).

Bit 0 of each of these MSRs is the MSR's verified bit. As noted, any of execution of WRMSR that loads one of these MSRs (or, for IA32_PL0_SSP, of XRSTORS) will clear the MSR's verified bit. Thus, WRMSR and XRSTORS do not suffice for VMM context management as using them might lose the value of the verified bit established by guest software. The only way that a VMM can fully restore a guest's context (including the proper setting of the FRED_ SSP MSRs' verified bits) is by loading those MSRs from the VMCS.

The host-state area 2904 includes 64-bit fields for the following MSRs (an exemplary encoding pair for each field is shown parenthetically): IA32_FRED_CONFIG (291AH/ 291BH), IA32_FRED_RSP1 (291CH/291DH), IA32_FRED_RSP2 (291EH/291FH), IA32_FRED_RSP3 (2820H/2821H), IA32_FRED_STKLVLS (2822H/2823H), IA32_FRED_SSP1 (2824H/2825H), IA32_FRED_SSP2 (2826H/2827H), IA32_FRED_SSP3 (2828H/2829H), IA32_FMASK (282AH/282BH), and IA32_PL0_SSP (282CH/282DH).

Management of FRED context is supported using VM-Entry Controls that govern the basic operation of VM entries.

Definitions of VM-Entry Controls

| Bit Position(s) | Name | Description |
|---|---|---|
| 2 | Load debug controls | This control determines whether DR7 and the IA32_DEBUGCTL MSR are loaded on VM entry. The first processors to support the virtual-machine extensions supported only the 1-setting of this control. |
| 9 | IA-32e mode guest | On processors that support Intel 64 architecture, this control determines whether the logical |

-continued

| Definitions of VM-Entry Controls | | |
|---|---|---|
| Bit Position(s) | Name | Description |
| | | processor is in IA-32e mode after VM entry. Its value is loaded into IA32__EFER.LMA as part of VM entry.1 This control must be 0 on processors that do not support Intel 64 architecture. |
| 10 | Entry to SMM | This control determines whether the logical processor is in system-management mode (SMM) after VM entry. This control must be 0 for any VM entry from outside SMM. |
| 11 | Deactivate dualmonitor treatment | If set to 1, the default treatment of SMIs and SMM is in effect after the VM entry (see Section 34.15.7). This control must be 0 for any VM entry from outside SMM. |
| 13 | Load IA32__PERF__GLOBAL__CTRL | This control determines whether the IA32__PERF__GLOBAL__CTRL MSR is loaded on VM entry. |
| 14 | Load IA32__PAT | This control determines whether the IA32__PAT MSR is loaded on VM entry. |
| 15 | Load IA32__EFER | This control determines whether the IA32__EFER MSR is loaded on VM entry. |
| 16 | Load IA32__BNDCFGS | This control determines whether the IA32__BNDCFGS MSR is loaded on VM entry. |
| 17 | Conceal VMX from PT | If this control is 1, Intel Processor Trace does not produce a paging information packet (PIP) on a VM entry or a VMCS packet on a VM entry that returns from SMM (see Chapter 35). |
| 18 | Load IA32__RTIT__CTL | This control determines whether the IA32__RTIT__CTL MSR is loaded on VM entry. |
| 20 | Load CET state | This control determines whether CET-related MSRs and SPP are loaded on VM entry. |
| 22 | Load PKRS | This control determines whether the IA32__PKRS MSR is loaded on VM entry. |
| 23 | Load FRED | This control determines if VM entries load the guest FRED state in the identified Guest-State Area. |

In some examples, a secondary VM-exit control 0 is "save FRED." If this control is set, VM exits save the guest FRED state. In some exasmples, a secondary VM-exit control 1 is "load FRED." If this control is set, VM exits load the host FRED state identified in The host-state area.

FRED transitions may be enabled in VM non-root operation. When handling VM exits due to events, a VMM may specify that VM exits should occur on the occurrence of events that would be delivered with FRED event delivery. These events include external interrupts, non-markable interrupts (NMIs), and exceptions (including those generated by INT1, INT3, and INT0). If such an event occurs, any specified VM exit occurs as it would if FRED transitions were not enabled. FRED event delivery does not occur.

FRED event delivery of a non-markable interrupt (NMI) blocks NMIs. That does not change in VM non-root operation. Note, however, that an NMI is delivered in VM non-root operation only if the "NMI exiting" VM-execution control is 0.

As specified above, the execution of either ERETS or ERETU unblocks NMIs if bit 16 of the popped CS field is 1. The following items detail how this behavior is changed, for example, in VM non-root operation, depending on the settings of certain VM-execution controls: If the "NMI exiting" VM-execution control is 0, this behavior of ERETS and ERETU is not modified (they unblock NMIs as indicated above). If the "NMI exiting" VM-execution control is 1, ERETS and ERETU do not unblock physical NMIs. If the "virtual NMIs" VM-execution control is 1 (which implies that the "NMI exiting" VM-execution control is also 1), the logical processor tracks virtual-NMI blocking. In this case, ERETS and ERETU each unblocks virtual NMIs if bit 16 of the popped CS field is 1.

FRED transitions may be enabled following a VM entry when a guest mode (e.g., IA-32e mode guest) VM-entry control is set and a bit of a control register (e.g., bit 29 of CR4) field in the guest-state area is set.

A VM entry may cause a check to be performed on various VMX controls including those related to event injection. When FRED transitions are enabled following VM entry, the following relaxations may apply to checks on a injected-event field when the valid bit (e.g., bit 31) in that field is set by checking if the field's "event type" (bits 10:8) is 7 (other event), the field's vector of interrupt or exception (bits 7:0) may have value 1 (indicating SYSCALL), but there are no checks on the field's "deliver error code" bit (bit 11).

Regardless of whether FRED transitions will be enabled following VM entry, for example, processors with VMX nested-exception support apply the following relaxation to checks on the VM-entry interruption field when the valid bit (bit 31) in that field is set checking if the field's "event type" (bits 10:8) is 3 (hardware exception). Note that bit 13 of the field may have value 1 (indicating a nested exception).

Support for FRED transitions may impact VM-entry state checking several ways such as the ways in which host FRED state is checked, the ways in which guest FRED state is checked, and new checks on existing guest state if FRED transitions are enabled after VM entry.

When the "load FRED" VM-exit control is 1, the host FRED state is checked in the VMCS. If the field for any MSR contains a value that is not valid for that MSR, VM entry fails as is normally the case when checking host state. The properties that must hold include for the IA32_FRED_CONFIG MSR bit 2, bits 5:4, and bit 11 of the field must be 0 and the upper bits of the field must be such that the field's value is canonical relative to the processor's maximum linear-address width; for the IA32_FRED_RSP1-IA32_FRED_RSP3 MSRs, the value of each of these fields must be canonical relative to the processor's maximum linear-address width; and/or for the IA32_FRED_SSP1-IA32_FRED_SSP3 MSRs bits 2:1 of each of these fields must be 0 and the upper bits of each field must be such that the field's value is canonical relative to the processor's maximum linear-address width.

When the "load FRED" VM-entry control is 1, the guest FRED state is checked in the VMCS. If the field for any MSR contains a value that is not valid for that MSR, VM entry fails as is normally the case when checking guest state. The properties that should hold include: for the IA32_FRED_CONFIG MSR bit 2, bits 5:4, and bit 11 of the field must be 0 and the upper bits of the field must be such that its value is canonical relative to the processor's maximum linear-address width; for the IA32_FRED_RSP1-IA32_FRED_RSP3 MSRs the value of each of these fields must be canonical relative to the processor's maximum linear-address width; for the IA32_FRED_SSP1-IA32_FRED_SSP3 MSRs bits 2:1 of each of these fields must be 0 and the upper bits of each field must be such that its value is canonical relative to the processor's maximum linear-address width; and/or for the IA32_PL0_SSP MSR bit 1 of the field must be 0 and the upper bits of the field must be such that its value is canonical relative to the processor's maximum linear-address width.

As noted elsewhere, software cannot enter ring 1 or ring 2 while FRED transitions are enabled. In addition, the IOPL must be 0 when CPL is 3. Checks are added to VM entry to enforce these limitations. By way of example, when FRED transitions ware enabled following VM entry, the following checks are performed on the guest state area in the VMCS: the DPL value (bits 6:5) in the SS attributes field must be 0 or 3, and if the DPL value in the SS attributes field is 3, the IOPL value (bits 13:12) in the RFLAGS field must be 0.

When the "load FRED" VM-entry control is 1, the guest FRED state identified in guest state area from the VMCS is loaded. Unlike the WRMSR instruction, VM entry sets bit 0 of a FRED_SSP MSR (the MSR's verified bit) when bit 0 is set in the corresponding field in the guest-state area of the VMCS. This applies also to the IA32_PL0_SSP MSR.

When the valid bit in the VM-entry interruption field is 1, an event is injected in some examples. Injection of an external interrupt, a non-markable interrupt (NMI), an exception (including those caused by INT1, INT3, and INT0), or a software interrupt uses FRED event delivery (instead of IDT event delivery) if FRED transitions ware enabled after the VM entry, for example. When bit 13 of the VM-entry interruption field is 1 (implying that the event is an exception) and the injected event is delivered using FRED event delivery, the event's stack level is determined as if the event had been encountered during delivery of another event. When VM injects a page fault (#PF) delivered using FRED event delivery, the current value of CR2 is pushed on the stack as specified. Similarly, VM-entry injection of a debug exception (#DB) with FRED event delivery pushes the current value of DR6 and VM-entry injection of a device-not-available exception (#NM) pushes the current value of the IA32_XFD_ERR_MSR.

In some examples, when FRED event delivery is used for an event injected by VM entry, the event data saved is the value of the injected-event-data field in the VMCS. When FRED event delivery is used for such an event injected by VM entry, the instruction length saved is the value of the VM-entry instruction-length field in the VMCS. The following items describe the exemplary existing treatment of RIP by VM-entry event injection:

1. If VM entry successfully injects (with no nested exception) an event with type external interrupt, NMI, or hardware exception, the guest RIP (as loaded from the VMCS) is pushed on the stack.
2. If VM entry successfully injects (with no nested exception) an event with type software interrupt, privileged software exception, or software exception, the guest RIP is incremented by the VM-entry instruction length before being pushed on the stack.
3. If VM entry encounters an exception while injecting an event and that exception does not cause a VM exit, the guest RIP is pushed on the stack regardless of event type or VM-entry instruction length.
4. If VM entry encounters a VM exit while injecting an event (perhaps due to an exception), the RIP value saved by the VM exit is the guest RIP loaded from the VMCS. If the injected event had type software interrupt, privileged software exception, or software exception, the value saved for the VM-exit instruction length is the VM-entry instruction length. Item #2 of this existing treatment will apply also if VM entry is injecting SYSCALL or SYSENTER using FRED event delivery. For item #4, the treatment of the instruction length is extended to apply also to the injection of SYSCALL and SYSENTER.

FRED transitions may also interact with VM exits. When the "save FRED" VM-exit control is 1, a VM exit causes a save of the guest FRED state identified in the guest state area into the VMCS. When the "load FRED" VM-exit control is 1, a VM exit causes a load of the host FRED state identified in the host state area from the VMCS.

If an event that would use FRED event delivery instead causes a VM exit, information about the event is saved into the VM-exit interruption-information and VM-exit interruption error-code fields of the VMCS, as would be done if FRED transitions were not enabled, with the following exceptions: when bit 11 of the VM-exit interruption-information field indicates whether the error code field is valid (for events the occur while FRED transitions are enabled, this bit is always saved as 1) and for events the occur while FRED transitions are enabled, the VM-exit interruption error code may be always defined; when bit 13 of the exiting-event identification field is set if the VM exit is due to a nested exception encountered during delivery of an earlier event. Other VM exits (including VM exit due to #DF) clear the bit.

A VM exit may occur during FRED event delivery, due either to a nested exception (configured to cause a VM exit) or to some VMX-specific occurrence (e.g., an EPT violation). This may be treated same way as a VM exit incident to IDT event delivery. Specifically, no register state is updated by the FRED event delivery that encountered the VM exit. In these cases, information about the event is saved into the IDT-vectoring information and IDT-vectoring interruption error-code fields of the VMCS, as would be done if FRED transitions were not enabled, with the following exceptions: when bit 11 of the IDT-vectoring information field indicates whether the error code field is valid (for VM exits that occur during FRED event delivery, this bit is always saved as 1) and for VM exits that occur during FRED event delivery, the IDT-vectoring interruption error code may be always defined. In general, for features that have special treatment during IDT event delivery (e.g., conversion of EPT violations to virtualization exceptions), that special treatment applies as well to FRED event delivery; when bit 13 of the original-event identification field is set if the original event was a nested exception encountered during delivery of another event. Other VM exits (including VM exit due to events encountered during delivery of #DF) clear the bit.

A VM exit may occur during execution of ERETS or ERETU due either to an exception (if configured to cause a VM exit) or to some VMX-specific occurrence (e.g., an EPT violation). This is treated in the same way, generally, as VM exits incident to other instructions that is for fault-like VM exits, no register state is updated. By way of example, an execution of ERETS and ERETU that causes a VM exit does not unblock NMIs (or virtual NMIs). Because of this, such a VM exit that results from a fault, EPT violation, page-modification log-full event, SPPT misconfiguration, or SPPT miss encountered by ERETS or ERETU never sets bit 12 of the exit qualification.

Examples detailed herein may be embodied in many different types of architectures, systems, instruction formats, etc. of which some are detailed below.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 30:
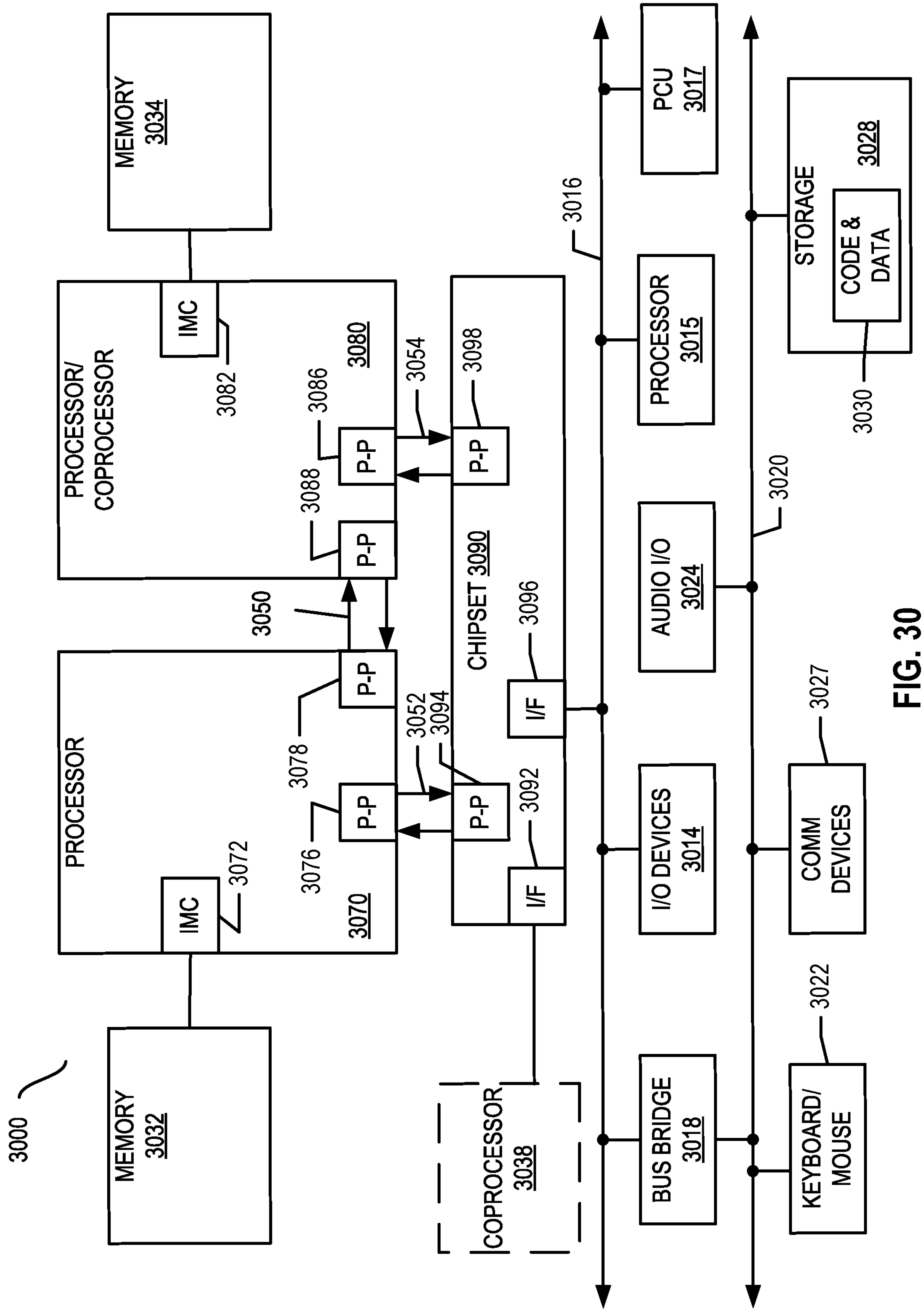
FIG. 30 illustrates examples of an exemplary system.

FIG. 30 illustrates examples of an exemplary system. Multiprocessor system 3000 is a point-to-point interconnect system and includes a plurality of processors including a first processor 3070 and a second processor 3080 coupled via a point-to-point interconnect 3050. In some examples, the first processor 3070 and the second processor 3080 are homogeneous. In some examples, first processor 3070 and the second processor 3080 are heterogenous.

Processors 3070 and 3080 are shown including integrated memory controller (IMC) units circuitry 3072 and 3082, respectively. Processor 3070 also includes as part of its interconnect controller units point-to-point (P-P) interfaces 3076 and 3078; similarly, second processor 3080 includes P-P interfaces 3086 and 3088. Processors 3070, 3080 may exchange information via the point-to-point (P-P) interconnect 3050 using P-P interface circuits 3078, 3088. IMCs 3072 and 3082 couple the processors 3070, 3080 to respective memories, namely a memory 3032 and a memory 3034, which may be portions of main memory locally attached to the respective processors.

Processors 3070, 3080 may each exchange information with a chipset 3090 via individual P-P interconnects 3052, 3054 using point to point interface circuits 3076, 3094, 3086, 3098. Chipset 3090 may optionally exchange information with a coprocessor 3038 via a high-performance interface 3092. In some examples, the coprocessor 3038 is a special-purpose processor, such as, for example, a high-throughput MIC processor, a network or communication processor, compression engine, graphics processor, GPGPU, embedded processor, or the like.

A shared cache (not shown) may be included in either processor 3070, 3080 or outside of both processors, yet connected with the processors via P-P interconnect, such that either or both processors' local cache information may be stored in the shared cache if a processor is placed into a low power mode.

Chipset 3090 may be coupled to a first interconnect 3016 via an interface 3096. In some examples, first interconnect 3016 may be a Peripheral Component Interconnect (PCI) interconnect, or an interconnect such as a PCI Express interconnect or another I/O interconnect. In some examples, one of the interconnects couples to a power control unit (PCU) 3017, which may include circuitry, software, and/or firmware to perform power management operations with regard to the processors 3070, 3080 and/or co-processor 3038. PCU 3017 provides control information to a voltage regulator to cause the voltage regulator to generate the appropriate regulated voltage. PCU 3017 also provides control information to control the operating voltage generated. In various examples, PCU 3017 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 3017 is illustrated as being present as logic separate from the processor 3070 and/or processor 3080. In other cases, PCU 3017 may execute on a given one or more of cores (not shown) of processor 3070 or 3080. In some cases, PCU 3017 may be implemented as a microcontroller (dedicated or general-purpose) or other control logic configured to execute its own dedicated power management code, sometimes referred to as P-code. In yet other examples, power management operations to be performed by PCU 3017 may be implemented externally to a processor, such as by way of a separate power management integrated circuit (PMIC) or another component external to the processor. In yet other examples, power management operations to be performed by PCU 3017 may be implemented within BIOS or other system software.

Various I/O devices 3014 may be coupled to first interconnect 3016, along with an interconnect (bus) bridge 3018 which couples first interconnect 3016 to a second interconnect 3020. In some examples, one or more additional processor(s) 3015, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 3016. In some examples, second interconnect 3020 may be a low pin count (LPC) interconnect. Various devices may be coupled to second interconnect 3020 including, for example, a keyboard and/or mouse 3022, communication devices 3027 and a storage unit circuitry 3028. Storage unit circuitry 3028 may be a disk drive or other mass storage device which may include instructions/code and data 3030, in some examples. Further, an audio I/O 3024 may be coupled to second interconnect 3020. Note that other architectures than the point-to-point architecture described above are possible. For example, instead of the point-to-point architecture, a system such as multiprocessor system 3000 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 31:
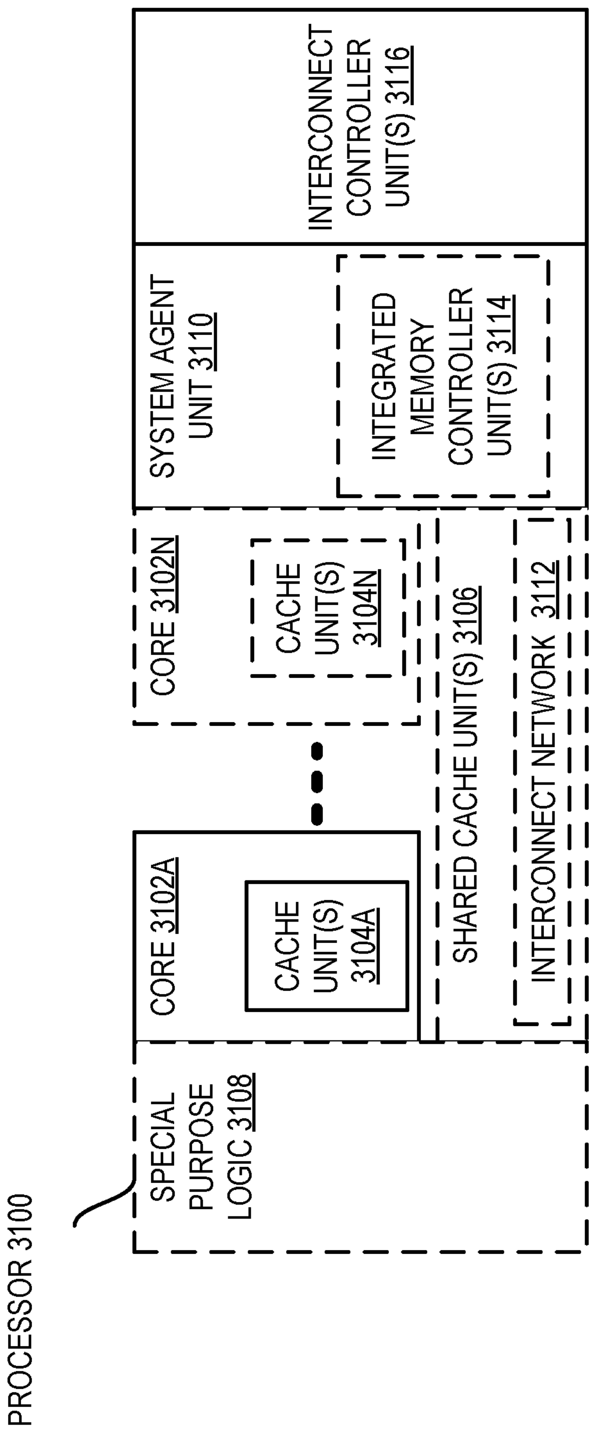
FIG. 31 illustrates a block diagram of examples of a processor that may have more than one core, may have an integrated memory controller, and may have integrated graphics.

FIG. 31 illustrates a block diagram of examples of a processor 3100 that may have more than one core, may have an integrated memory controller, and may have integrated graphics. The solid lined boxes illustrate a processor 3100 with a single core 3102A, a system agent 3110, a set of one or more interconnect controller units circuitry 3116, while the optional addition of the dashed lined boxes illustrates an alternative processor 3100 with multiple cores 3102(A)-(N), a set of one or more integrated memory controller unit(s) circuitry 3114 in the system agent unit circuitry 3110, and special purpose logic 3108, as well as a set of one or more interconnect controller units circuitry 3116. Note that the processor 3100 may be one of the processors 3070 or 3080, or co-processor 3038 or 3015 of FIG. 30.

Thus, different implementations of the processor 3100 may include: 1) a CPU with the special purpose logic 3108 being integrated graphics and/or scientific (throughput) logic (which may include one or more cores, not shown), and the cores 3102(A)-(N) being one or more general purpose cores (e.g., general purpose in-order cores, general purpose out-of-order cores, or a combination of the two); 2) a coprocessor with the cores 3102(A)-(N) being a large number of special purpose cores intended primarily for graphics and/or scientific (throughput); and 3) a coprocessor with the cores 3102(A)-(N) being a large number of general purpose in-order cores. Thus, the processor 3100 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 3100 may be a part of and/or may be implemented on one or more substrates using any of a number of process technologies, such as, for example, BiCMOS, CMOS, or NMOS.

A memory hierarchy includes one or more levels of cache unit(s) circuitry 3104(A)-(N) within the cores 3102(A)-(N), a set of one or more shared cache units circuitry 3106, and external memory (not shown) coupled to the set of integrated memory controller units circuitry 3114. The set of one or more shared cache units circuitry 3106 may include one or more mid-level caches, such as level 2 (L2), level 3 (L3), level 4 (L4), or other levels of cache, such as a last level cache (LLC), and/or combinations thereof. While in some examples ring-based interconnect network circuitry 3112 interconnects the special purpose logic 3108 (e.g., integrated graphics logic), the set of shared cache units circuitry 3106, and the system agent unit circuitry 3110, alternative examples use any number of well-known techniques for interconnecting such units. In some examples, coherency is maintained between one or more of the shared cache units circuitry 3106 and cores 3102(A)-(N).

In some examples, one or more of the cores 3102(A)-(N) are capable of multi-threading. The system agent unit circuitry 3110 includes those components coordinating and operating cores 3102(A)-(N). The system agent unit circuitry 3110 may include, for example, power control unit (PCU) circuitry and/or display unit circuitry (not shown). The PCU may be or may include logic and components needed for regulating the power state of the cores 3102(A)-(N) and/or the special purpose logic 3108 (e.g., integrated graphics logic). The display unit circuitry is for driving one or more externally connected displays.

The cores 3102(A)-(N) may be homogenous or heterogeneous in terms of architecture instruction set; that is, two or more of the cores 3102(A)-(N) may be capable of executing the same instruction set, while other cores may be capable of executing only a subset of that instruction set or a different instruction set.

Exemplary Core Architectures

In-Order and Out-of-Order Core Block Diagram

Figure 32A:
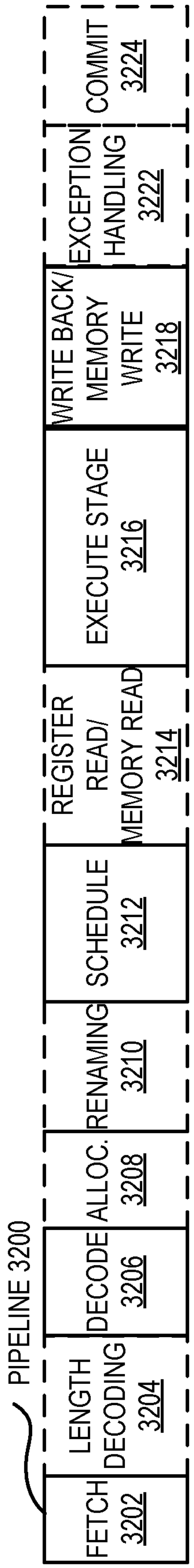
FIG. 32(A) is a block diagram illustrating both an exemplary in-order pipeline and an exemplary register renaming, out-of-order issue/execution pipeline according to examples of the invention.
Figure 32B:
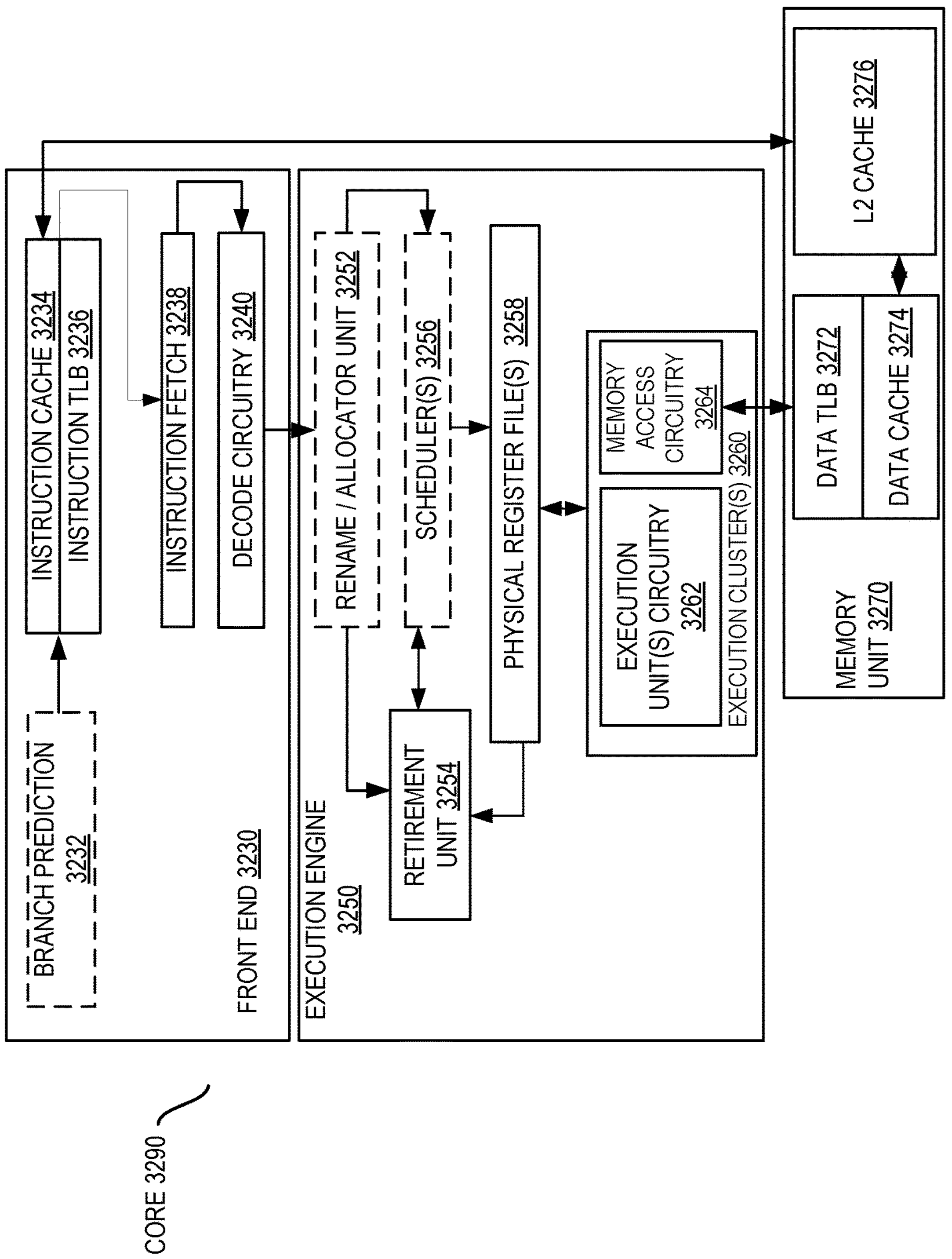
FIG. 32(B) is a block diagram illustrating both an exemplary example of an in-order architecture core and an exemplary register renaming, out-of-order issue/execution architecture core to be included in a processor according to examples of the invention.

FIG. 32(A) is a block diagram illustrating both an exemplary in-order pipeline and an exemplary register renaming, out-of-order issue/execution pipeline according to examples of the invention. FIG. 32(B) is a block diagram illustrating both an exemplary example of an in-order architecture core and an exemplary register renaming, out-of-order issue/execution architecture core to be included in a processor according to examples of the invention. The solid lined boxes in FIGS. 32(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 32(A), a processor pipeline 3200 includes a fetch stage 3202, an optional length decode stage 3204, a decode stage 3206, an optional allocation stage 3208, an optional renaming stage 3210, a scheduling (also known as a dispatch or issue) stage 3212, an optional register read/memory read stage 3214, an execute stage 3216, a write back/memory write stage 3218, an optional exception handling stage 3222, and an optional commit stage 3224. One or more operations can be performed in each of these processor pipeline stages. For example, during the fetch stage 3202, one or more instructions are fetched from instruction memory, during the decode stage 3206, the one or more fetched instructions may be decoded, addresses (e.g., load store unit (LSU) addresses) using forwarded register ports may be generated, and branch forwarding (e.g., immediate offset or an link register (LR)) may be performed. In one example, the decode stage 3206 and the register read/memory read stage 3214 may be combined into one pipeline stage. In one example, during the execute stage 3216, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 3200 as follows: 1) the instruction fetch 3238 performs the fetch and length decoding stages 3202 and 3204; 2) the decode unit circuitry 3240 performs the decode stage 3206; 3) the rename/allocator unit circuitry 3252 performs the allocation stage 3208 and renaming stage 3210; 4) the scheduler unit(s) circuitry 3256 performs the schedule stage 3212; 5) the physical register file(s) unit(s) circuitry 3258 and the memory unit circuitry 3270 perform the register read/memory read stage 3214; the execution cluster 3260 perform the execute stage 3216; 6) the memory unit circuitry 3270 and the physical register file(s) unit(s) circuitry 3258 perform the write back/memory write stage 3218; 7) various units (unit circuitry) may be involved in the exception handling stage 3222; and 8) the retirement unit circuitry 3254 and the physical register file(s) unit(s) circuitry 3258 perform the commit stage 3224.

FIG. 32(B) shows processor core 3290 including front-end unit circuitry 3230 coupled to an execution engine unit circuitry 3250, and both are coupled to a memory unit circuitry 3270. The core 3290 may be a reduced instruction set computing (RISC) core, a complex instruction set computing (CISC) core, a very long instruction word (VLIW) core, or a hybrid or alternative core type. As yet another option, the core 3290 may be a special-purpose core, such as, for example, a network or communication core, compression engine, coprocessor core, general purpose computing graphics processing unit (GPGPU) core, graphics core, or the like.

The front end unit circuitry 3230 may include branch prediction unit circuitry 3232 coupled to an instruction cache unit circuitry 3234, which is coupled to an instruction translation lookaside buffer (TLB) 3236, which is coupled to instruction fetch unit circuitry 3238, which is coupled to decode unit circuitry 3240. In one example, the instruction cache unit circuitry 3234 is included in the memory unit circuitry 3270 rather than the front-end unit circuitry 3230. The decode unit circuitry 3240 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 3240 may further include an address generation unit circuitry (AGU, not shown). In one example, the AGU generates an LSU address using forwarded register ports, and may further perform branch forwarding (e.g., immediate offset branch forwarding, LR register branch forwarding, etc.). The decode unit circuitry 3240 may be implemented using various different mechanisms. Examples of suitable mechanisms include, but are not limited to, look-up tables, hardware implementations, programmable logic arrays (PLAs), microcode read only memories (ROMs), etc. In one example, the core 3290 includes a microcode ROM (not shown) or other medium that stores microcode for certain macroinstructions (e.g., in decode unit circuitry 3240 or otherwise within the front end unit circuitry 3230). In one example, the decode unit circuitry 3240 includes a micro-operation (micro-op) or operation cache (not shown) to hold/cache decoded operations, micro-tags, or micro-operations generated during the decode or other stages of the processor pipeline 3200. The decode unit circuitry 3240 may be coupled to rename/allocator unit circuitry 3252 in the execution engine unit circuitry 3250.

The execution engine circuitry 3250 includes the rename/allocator unit circuitry 3252 coupled to a retirement unit circuitry 3254 and a set of one or more scheduler(s) circuitry 3256. The scheduler(s) circuitry 3256 represents any number of different schedulers, including reservations stations, central instruction window, etc. In some examples, the scheduler(s) circuitry 3256 can include arithmetic logic unit (ALU) scheduler/scheduling circuitry, ALU queues, arithmetic generation unit (AGU) scheduler/scheduling circuitry, AGU queues, etc. The scheduler(s) circuitry 3256 is coupled to the physical register file(s) circuitry 3258. Each of the physical register file(s) circuitry 3258 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) unit circuitry 3258 includes vector registers unit circuitry, writemask registers unit circuitry, and scalar register unit circuitry. These register units may provide architectural vector registers, vector mask registers, general-purpose registers, etc. The physical register file(s) unit(s) circuitry 3258 is overlapped by the retirement unit circuitry 3254 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 3254 and the physical register file(s) circuitry 3258 are coupled to the execution cluster(s) 3260. The execution cluster(s) 3260 includes a set of one or more execution units circuitry 3262 and a set of one or more memory access circuitry 3264. The execution units circuitry 3262 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 3256, physical register file(s) unit(s) circuitry 3258, and execution cluster(s) 3260 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain examples are implemented in which only the execution cluster of this pipeline has the memory access unit(s) circuitry 3264). It should also be understood that where separate pipelines are used, one or more of these pipelines may be out-of-order issue/execution and the rest in-order.

In some examples, the execution engine unit circuitry 3250 may perform load store unit (LSU) address/data pipelining to an Advanced Microcontroller Bus (AHB) interface (not shown), and address phase and writeback, data phase load, store, and branches.

The set of memory access circuitry 3264 is coupled to the memory unit circuitry 3270, which includes data TLB unit circuitry 3272 coupled to a data cache circuitry 3274 coupled to a level 2 (L2) cache circuitry 3276. In one exemplary example, the memory access units circuitry 3264 may include a load unit circuitry, a store address unit circuit, and a store data unit circuitry, each of which is coupled to the data TLB circuitry 3272 in the memory unit circuitry 3270. The instruction cache circuitry 3234 is further coupled to a level 2 (L2) cache unit circuitry 3276 in the memory unit circuitry 3270. In one example, the instruction cache 3234 and the data cache 3274 are combined into a single instruction and data cache (not shown) in L2 cache unit circuitry 3276, a level 3 (L3) cache unit circuitry (not shown), and/or main memory. The L2 cache unit circuitry 3276 is coupled to one or more other levels of cache and eventually to a main memory.

The core 3290 may support one or more instructions sets (e.g., the x86 instruction set (with some extensions that have been added with newer versions); the MIPS instruction set; the ARM instruction set (with optional additional extensions such as NEON)), including the instruction(s) described herein. In one example, the core 3290 includes logic to support a packed data instruction set extension (e.g., AVX1, AVX2), thereby allowing the operations used by many multimedia applications to be performed using packed data.

Exemplary Execution Unit(s) Circuitry

Figure 33:
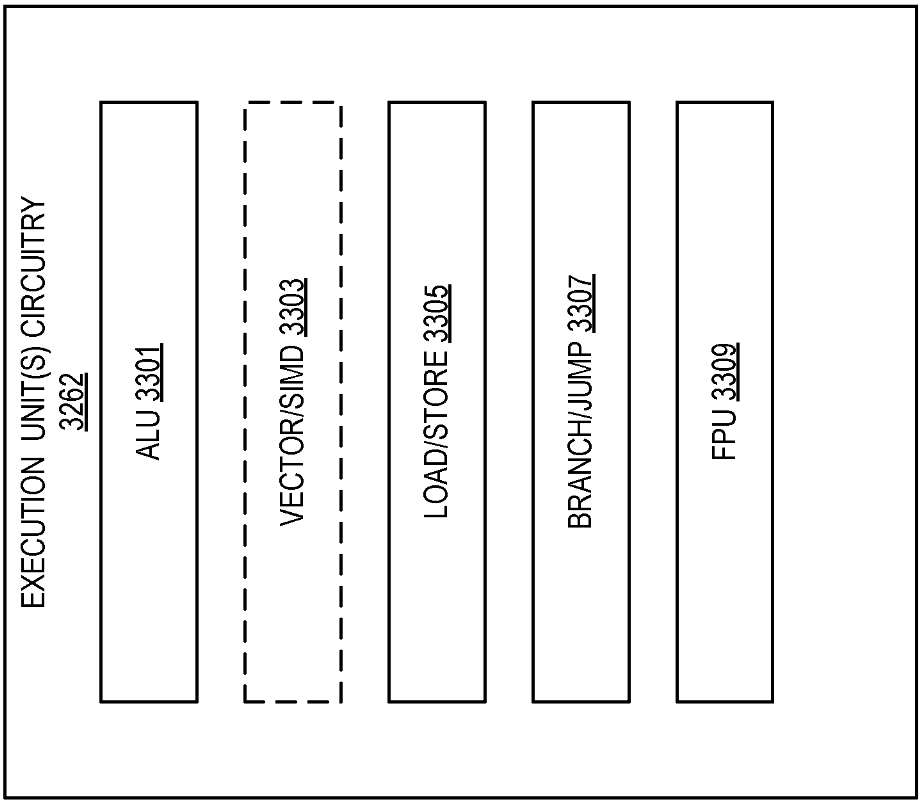
FIG. 33 illustrates examples of execution unit(s) circuitry, such as execution unit(s) circuitry of FIG. 32(B).

FIG. 33 illustrates examples of execution unit(s) circuitry, such as execution unit(s) circuitry 3262 of FIG. 32(B). As illustrated, execution unit(s) circuitry 3262 may include one or more ALU circuits 3301, vector/SIMD unit circuits 3303, load/store unit circuits 3305, and/or branch/jump unit circuits 3307. ALU circuits 3301 perform integer arithmetic and/or Boolean operations. Vector/SIMD unit circuits 3303 perform vector/SIMD operations on packed data (such as SIMD/vector registers). Load/store unit circuits 3305 execute load and store instructions to load data from memory into registers or store from registers to memory. Load/store unit circuits 3305 may also generate addresses. Branch/jump unit circuits 3307 cause a branch or jump to a memory address depending on the instruction. Floating-point unit (FPU) circuits 3309 perform floating-point arithmetic. The width of the execution unit(s) circuitry 3262 varies depending upon the example and can range from 16-bit to 1,024-bit. In some examples, two or more smaller execution units are logically combined to form a larger execution unit (e.g., two 128-bit execution units are logically combined to form a 256-bit execution unit).

Exemplary Register Architecture

Figure 34:
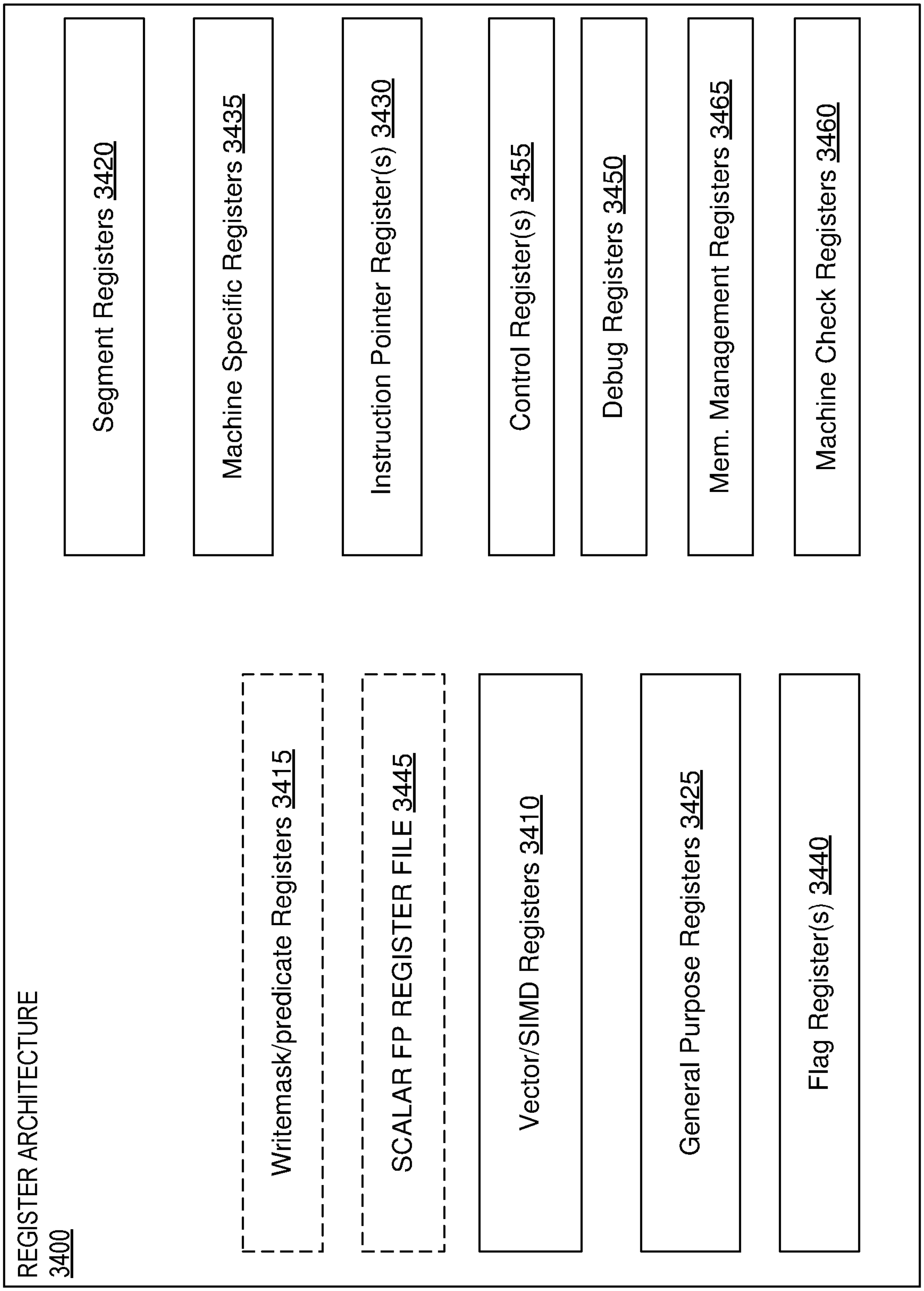
FIG. 34 is a block diagram of a register architecture according to some examples.

FIG. 34 is a block diagram of a register architecture 3400 according to some examples. As illustrated, there are vector/SIMD registers 3410 that vary from 128-bit to 1,024 bits width. In some examples, the vector/SIMD registers 3410 are physically 512-bits and, depending upon the mapping, only some of the lower bits are used. For example, in some examples, the vector/SIMD registers 3410 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 3400 includes writemask/predicate registers 3415. For example, in some examples, there are 8 writemask/predicate registers (sometimes called k0 through k7) that are each 16-bit, 32-bit, 64-bit, or 128-bit in size. Writemask/predicate registers 3415 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 3415 corresponds to a data element position of the destination. In other examples, the writemask/predicate registers 3415 are scalable and consists of a set number of enable bits for a given vector element (e.g., 8 enable bits per 64-bit vector element).

The register architecture 3400 includes a plurality of general-purpose registers 3425. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 3400 includes scalar floating-point register 3445 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 3440 (e.g., EFLAGS, RFLAGS, etc.) store status and control information for arithmetic, compare, and system operations. For example, the one or more flag registers 3440 may store condition code information such as carry, parity, auxiliary carry, zero, sign, and overflow. In some examples, the one or more flag registers 3440 are called program status and control registers.

Segment registers 3420 contain segment points for use in accessing memory. In some examples, these registers are referenced by the names CS, DS, SS, ES, FS, and GS.

Machine specific registers (MSRs) 3435 control and report on processor performance. Most MSRs 3435 handle system-related functions and are not accessible to an application program. Machine check registers 3460 consist of control, status, and error reporting MSRs that are used to detect and report on hardware errors.

One or more instruction pointer register(s) 3430 store an instruction pointer value. Control register(s) 3455 (e.g., CR0-CR4) determine the operating mode of a processor (e.g., processor 3070, 3080, 3038, 3015, and/or 3100) and the characteristics of a currently executing task. Debug registers 3450 control and allow for the monitoring of a processor or core's debugging operations.

Memory management registers 3465 specify the locations of data structures used in protected mode memory management. These registers may include a GDTR, IDRT, task register, and a LDTR register.

Alternative examples of the invention may use wider or narrower registers. Additionally, alternative examples of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 35:
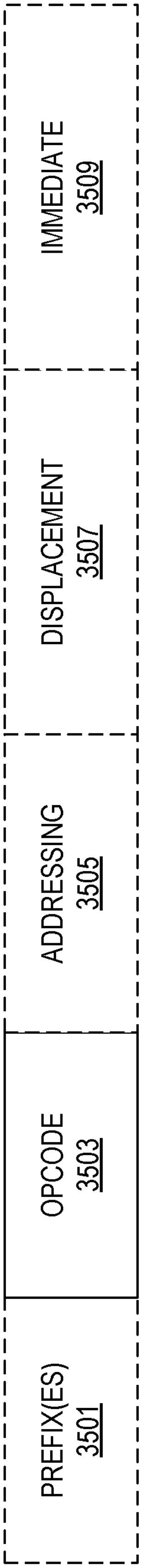
FIG. 35 illustrates examples of an instruction format.

FIG. 35 illustrates examples of an instruction format. As illustrated, an instruction may include multiple components including, but not limited to, one or more fields for: one or more prefixes 3501, an opcode 3503, addressing information 3505 (e.g., register identifiers, memory addressing information, etc.), a displacement value 3507, and/or an immediate 3509. Note that some instructions utilize some or all of the fields of the format whereas others may only use the field for the opcode 3503. In some examples, the order illustrated is the order in which these fields are to be encoded, however, it should be appreciated that in other examples these fields may be encoded in a different order, combined, etc.

The prefix(es) field(s) 3501, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 3503 is used to at least partially define the operation to be performed upon a decoding of the instruction. In some examples, a primary opcode encoded in the opcode field 3503 is 1, 2, or 3 bytes in length. In other examples, a primary opcode can be a different length. An additional 3-bit opcode field is sometimes encoded in another field.

Figure 36:
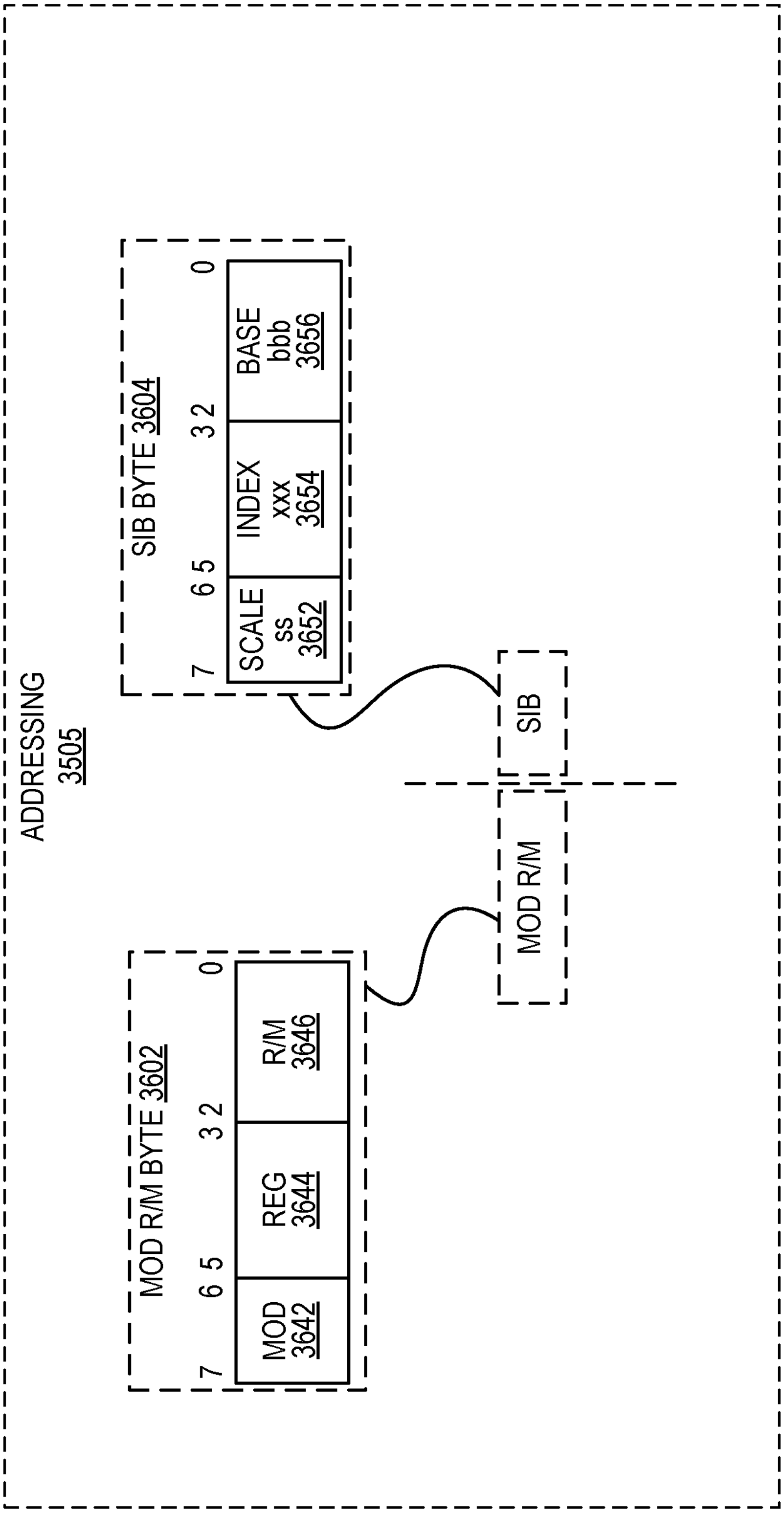
FIG. 36 illustrates examples of an addressing field.

The addressing field 3505 is used to address one or more operands of the instruction, such as a location in memory or one or more registers. FIG. 36 illustrates examples of the addressing field 3505. In this illustration, an optional ModR/M byte 3602 and an optional Scale, Index, Base (SIB) byte 3604 are shown. The ModR/M byte 3602 and the SIB byte 3604 are used to encode up to two operands of an instruction, each of which is a direct register or effective memory address. Note that each of these fields are optional in that not all instructions include one or more of these fields. The MOD R/M byte 3602 includes a MOD field 3642, a register field 3644, and R/M field 3646.

The content of the MOD field 3642 distinguishes between memory access and non-memory access modes. In some examples, when the MOD field 3642 has a value of b11, a register-direct addressing mode is utilized, and otherwise register-indirect addressing is used.

The register field 3644 may encode either the destination register operand or a source register operand, or may encode an opcode extension and not be used to encode any instruction operand. The content of register index field 3644, directly or through address generation, specifies the locations of a source or destination operand (either in a register or in memory). In some examples, the register field 3644 is supplemented with an additional bit from a prefix (e.g., prefix 3501) to allow for greater addressing.

The R/M field 3646 may be used to encode an instruction operand that references a memory address, or may be used to encode either the destination register operand or a source register operand. Note the R/M field 3646 may be combined with the MOD field 3642 to dictate an addressing mode in some examples.

The SIB byte 3604 includes a scale field 3652, an index field 3654, and a base field 3656 to be used in the generation of an address. The scale field 3652 indicates scaling factor. The index field 3654 specifies an index register to use. In some examples, the index field 3654 is supplemented with an additional bit from a prefix (e.g., prefix 3501) to allow for greater addressing. The base field 3656 specifies a base register to use. In some examples, the base field 3656 is supplemented with an additional bit from a prefix (e.g., prefix 3501) to allow for greater addressing. In practice, the content of the scale field 3652 allows for the scaling of the content of the index field 3654 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement field 3507 provides this value. Additionally, in some examples, a displacement factor usage is encoded in the MOD field of the addressing field 3505 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 3507.

In some examples, an immediate field 3509 specifies an immediate for the instruction. An immediate may be encoded as a 1-byte value, a 2-byte value, a 4-byte value, etc.

Figure 37:
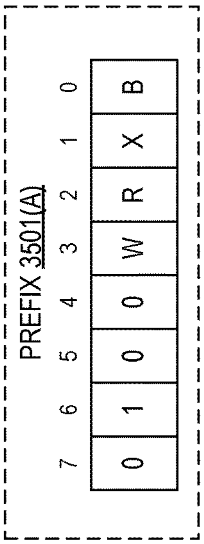
FIG. 37 illustrates examples of a first prefix.

FIG. 37 illustrates examples of a first prefix 3501(A). In some examples, the first prefix 3501(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 3501(A) may specify up to three registers using 3-bit fields depending on the format: 1) using the reg field 3644 and the R/M field 3646 of the Mod R/M byte 3602; 2) using the Mod R/M byte 3602 with the SIB byte 3604 including using the reg field 3644 and the base field 3656 and index field 3654; or 3) using the register field of an opcode.

In the first prefix 3501(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 3644 and MOD R/M R/M field 3646 alone can each only address 8 registers.

In the first prefix 3501(A), bit position 2 (R) may an extension of the MOD R/M reg field 3644 and may be used to modify the ModR/M reg field 3644 when that field encodes a general purpose register, a 64-bit packed data register (e.g., a SSE register), or a control or debug register. R is ignored when Mod R/M byte 3602 specifies other registers or defines an extended opcode.

Bit position 1 (X) X bit may modify the SIB byte index field 3654.

Bit position B (B) B may modify the base in the Mod R/M R/M field 3646 or the SIB byte base field 3656; or it may modify the opcode register field used for accessing general purpose registers (e.g., general purpose registers 3425).

Figure 38A:
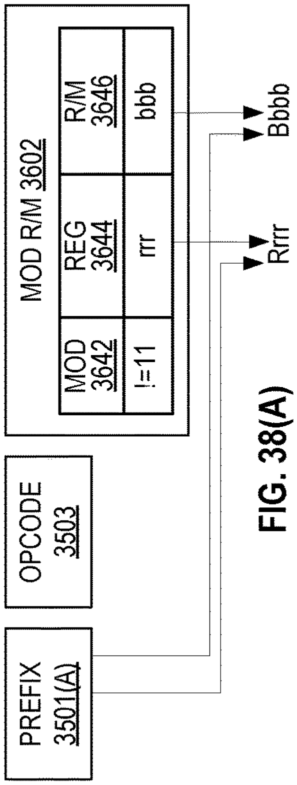
FIGS. 38(A)-(D) illustrate examples of how the R, X, and B fields of the first prefix 3501(A) are used.
Figure 38B:
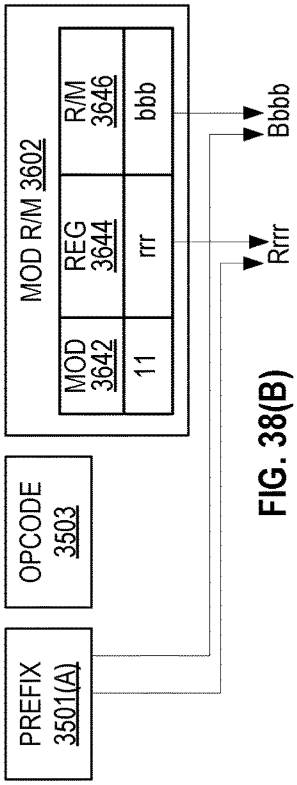
Figure 38C:
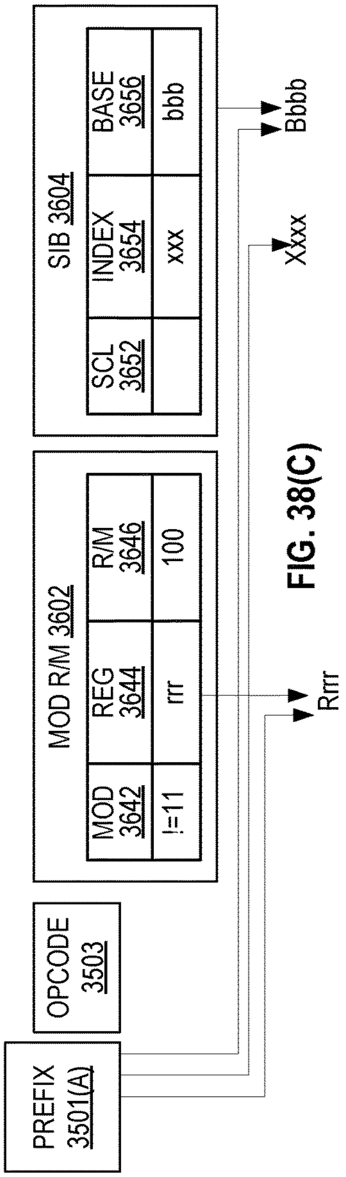
Figure 38D:
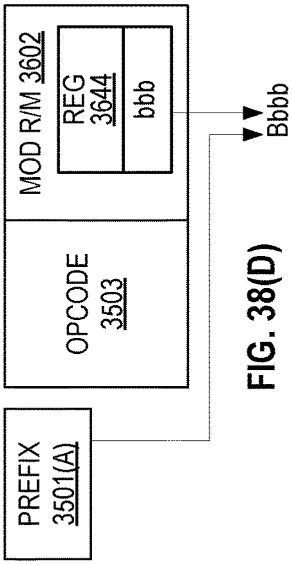

FIGS. 38(A)-(D) illustrate examples of how the R, X, and B fields of the first prefix 3501(A) are used. FIG. 38(A) illustrates R and B from the first prefix 3501(A) being used to extend the reg field 3644 and R/M field 3646 of the MOD R/M byte 3602 when the SIB byte 36 04 is not used for memory addressing. FIG. 38(B) illustrates R and B from the first prefix 3501(A) being used to extend the reg field 3644 and R/M field 3646 of the MOD R/M byte 3602 when the SIB byte 36 04 is not used (register-register addressing). FIG. 38(C) illustrates R, X, and B from the first prefix 3501(A) being used to extend the reg field 3644 of the MOD R/M byte 3602 and the index field 3654 and base field 3656 when the SIB byte 36 04 being used for memory addressing. FIG. 38(D) illustrates B from the first prefix 3501(A) being used to extend the reg field 3644 of the MOD R/M byte 3602 when a register is encoded in the opcode 3503.

Figure 39A:
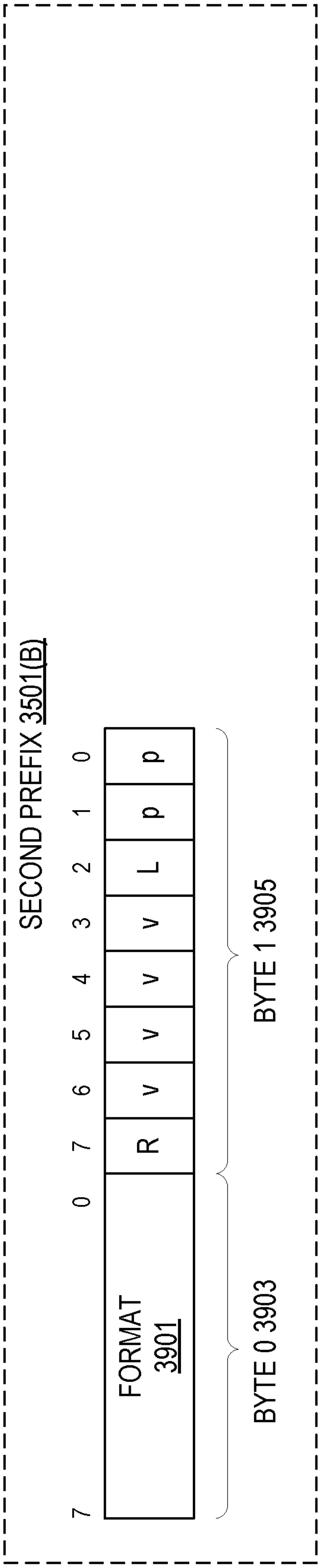
FIGS. 39(A)-(B) illustrate examples of a second prefix.
Figure 39B:
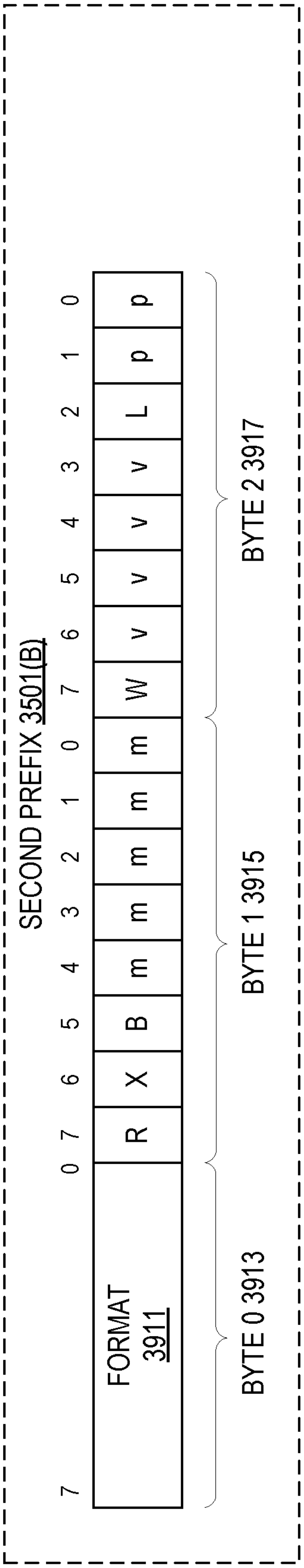

FIGS. 39(A)-(B) illustrate examples of a second prefix 3501(B). In some examples, the second prefix 3501(B) is an example of a VEX prefix. The second prefix 3501(B) encoding allows instructions to have more than two operands, and allows SIMD vector registers (e.g., vector/SIMD registers 3410) to be longer than 64-bits (e.g., 128-bit and 256-bit). The use of the second prefix 3501(B) provides for three-operand (or more) syntax. For example, previous two-operand instructions performed operations such as A=A+B, which overwrites a source operand. The use of the second prefix 3501(B) enables operands to perform nondestructive operations such as A=B+C.

In some examples, the second prefix 3501(B) comes in two forms—a two-byte form and a three-byte form. The two-byte second prefix 3501(B) is used mainly for 128-bit, scalar, and some 256-bit instructions; while the three-byte second prefix 3501(B) provides a compact replacement of the first prefix 3501(A) and 3-byte opcode instructions.

FIG. 39(A) illustrates examples of a two-byte form of the second prefix 3501(B). In one example, a format field 3901 (byte 0 3903) contains the value CSH. In one example, byte 1 3905 includes a "R" value in bit[7]. This value is the complement of the same value of the first prefix 3501(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 3646 to encode the instruction operand that references a memory address or encode either the destination register operand or a source register operand.

Instructions that use this prefix may use the Mod R/M reg field 3644 to encode either the destination register operand or a source register operand, be treated as an opcode extension and not used to encode any instruction operand.

For instruction syntax that support four operands, vvvv, the Mod R/M R/M field 3646 and the Mod R/M reg field 3644 encode three of the four operands. Bits[7:4] of the immediate 3509 are then used to encode the third source register operand.

FIG. 39(B) illustrates examples of a three-byte form of the second prefix 3501(B). in one example, a format field 3911 (byte 0 3913) contains the value C4H. Byte 1 3915 includes in bits[7:5] "R," "X," and "B" which are the complements of the same values of the first prefix 3501(A). Bits[4:0] of byte 1 3915 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 3917 is used similar to W of the first prefix 3501(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 3646 to encode the instruction operand that references a memory address or encode either the destination register operand or a source register operand.

Instructions that use this prefix may use the Mod R/M reg field 3644 to encode either the destination register operand or a source register operand, be treated as an opcode extension and not used to encode any instruction operand.

For instruction syntax that support four operands, vvvv, the Mod R/M R/M field 3646, and the Mod R/M reg field 3644 encode three of the four operands. Bits[7:4] of the immediate 3509 are then used to encode the third source register operand.

Figure 40:
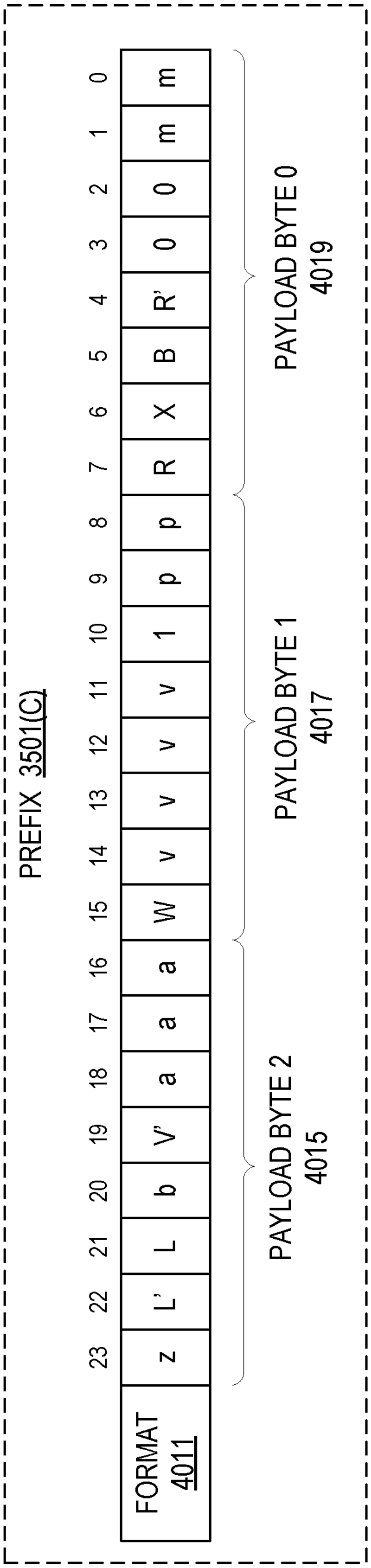
FIG. 40 illustrates examples of a third prefix.

FIG. 40 illustrates examples of a third prefix 3501(C). In some examples, the first prefix 3501(A) is an example of an EVEX prefix. The third prefix 3501(C) is a four-byte prefix.

The third prefix 3501(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 34) or predication utilize this prefix. Opmask register allow for conditional processing or selection control. Opmask instructions, whose source/destination operands are opmask registers and treat the content of an opmask register as a single value, are encoded using the second prefix 3501(B).

The third prefix 3501(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 3501(C) is a format field 4011 that has a value, in one example, of 62H. Subsequent bytes are referred to as payload bytes 4015-4019 and collectively form a 24-bit value of P[23:0] providing specific capability in the form of one or more fields (detailed herein).

In some examples, P[1:0] of payload byte 4019 are identical to the low two mmmmm bits. P[3:2] are reserved in some examples. Bit P[4] (R') allows access to the high 16 vector register set when combined with P[7] and the ModR/M reg field 3644. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 3644 and ModR/M R/M field 3646. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 3501(A) and second prefix 3511(B) and may serve as an opcode extension bit or operand size promotion.

P[18:16] specify the index of a register in the opmask (writemask) registers (e.g., writemask/predicate registers 3415). In one example of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples of the invention are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a nondestructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 3501(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1] | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples of the invention may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the invention also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 41:
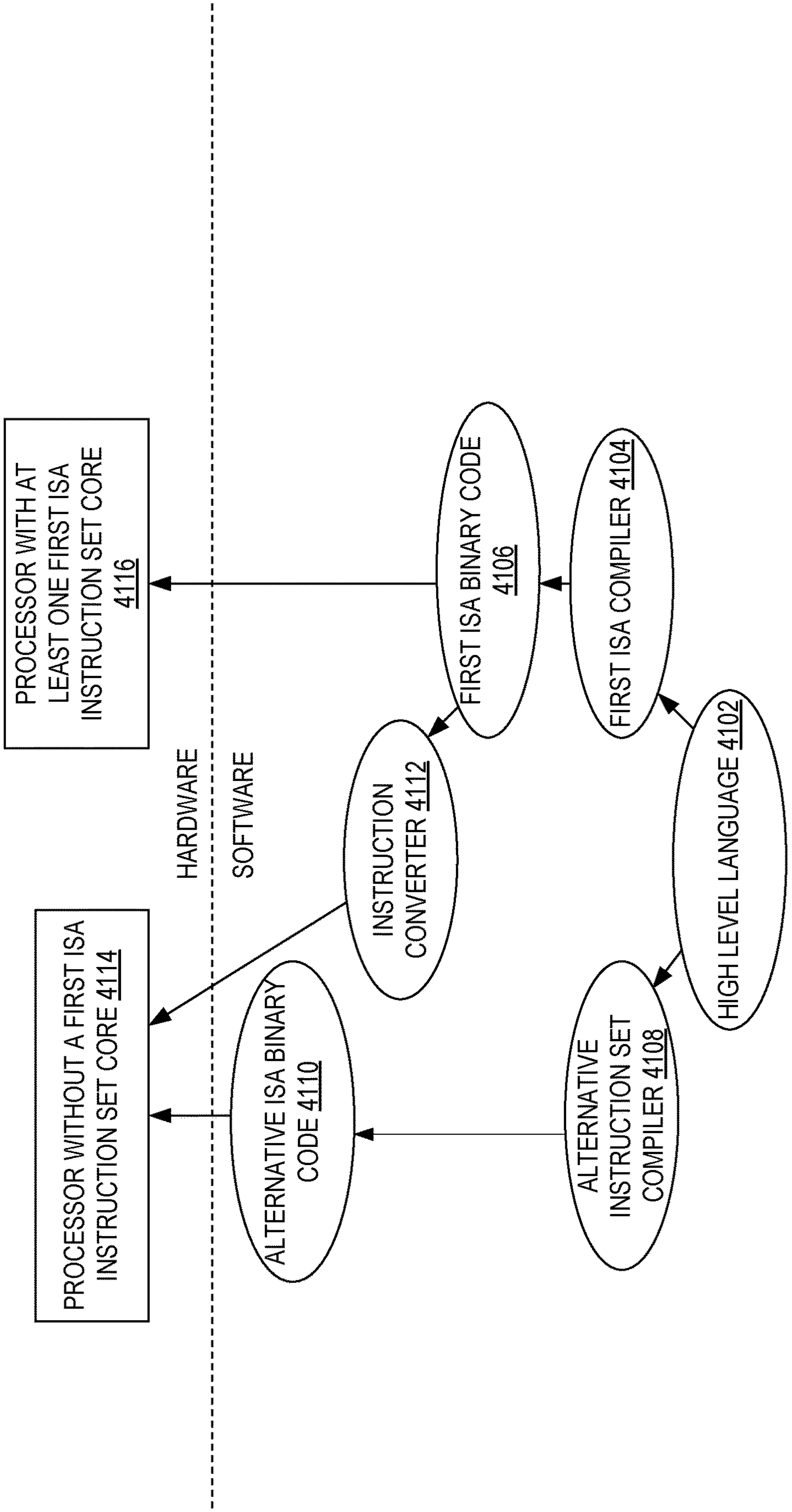
FIG. 41 illustrates a block diagram contrasting the use of a software instruction converter to convert binary instructions in a source instruction set to binary instructions in a target instruction set according to examples of the invention.

FIG. 41 illustrates a block diagram contrasting the use of a software instruction converter to convert binary instructions in a source instruction set to binary instructions in a target instruction set according to examples of the invention. In the illustrated example, the instruction converter is a software instruction converter, although alternatively the instruction converter may be implemented in software, firmware, hardware, or various combinations thereof. FIG. 41 shows a program in a high level language 4102 may be compiled using a first ISA compiler 4104 to generate first ISA binary code 4106 that may be natively executed by a processor with at least one first instruction set core 4116. The processor with at least one first ISA instruction set core 4116 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 4104 represents a compiler that is operable to generate first ISA binary code 4106 (e.g., object code) that can, with or without additional linkage processing, be executed on the processor with at least one first ISA instruction set core 4116. Similarly, FIG. 41 shows the program in the high level language 4102 may be compiled using an alternative instruction set compiler 4108 to generate alternative instruction set binary code 4110 that may be natively executed by a processor without a first ISA instruction set core 4114. The instruction converter 4112 is used to convert the first ISA binary code 4106 into code that may be natively executed by the processor without a first ISA instruction set core 4114. This converted code is not likely to be the same as the alternative instruction set binary code 4110 because an instruction converter capable of this is difficult to make; however, the converted code will accomplish the general operation and be made up of instructions from the alternative instruction set. Thus, the instruction converter 4112 represents software, firmware, hardware, or a combination thereof that, through emulation, simulation or any other process, allows a processor or other electronic device that does not have a first ISA instruction set processor or core to execute the first ISA binary code 4106.

References to "one example," "an example," "an example example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

Exemplary examples include, but are not limited to:

1. An apparatus comprising:

decoder circuitry to decode a single instruction, the single instruction to include a field for an opcode; and execution circuitry to execute the decoded single instruction according to the opcode to cause a return from an event handler while staying in a most privileged level and establish a return context that was in effect before event delivery.

2. The apparatus of example 1, wherein the execution of the decoded instruction is to not modify segment registers.

3. The apparatus of any of examples 1-2, wherein the opcode is F2 0F 01 CA.

4. The apparatus of any of examples 1-3, wherein the most privileged level is ring 0.

5. The apparatus of any of examples 1-4, wherein to execute the decode instruction the execution circuitry is to load and check the return context from a stack.

6. The apparatus of example 5, wherein the execution circuitry is to check a shadow stack to confirm validity of the return.

7. The apparatus of example 5, wherein the execution circuitry is to establish the return context by, at least in part, loading one or more registers.

8. A method comprising:

decoding a single instruction, the single instruction to include a field for an opcode; and executing the decoded instruction according to the opcode to cause a return from an event handler while staying in a most privileged level and establish a return context that was in effect before event delivery.

9. The method of example 8, wherein executing the decoded instruction further comprises not modifying segment registers.

10. The method of any of examples 8-9, wherein the opcode is F2 0F 01 CA.

11. The method of any of examples 8-10, wherein the most privileged level is ring 0.

12. The method of any of examples 8-11, wherein the executing further comprises loading and checking the return context from a stack.

13. The method of example 12, wherein the executing is to check a shadow stack to confirm validity of the return.

14. The method of example 12, wherein the executing is to establish the return context by, at least in part, loading one or more registers.

15. A method comprising:

translating a single instruction from a first instruction set architecture into one or more instructions of a second instruction set architecture, the single instruction having a field for an opcode, the opcode indicating that execution circuitry is to cause a return from an event handler while staying in a most privileged level and establish a return context that was in effect before event delivery;

decoding the one or more instructions of the second instruction set architecture; and executing the decoded one or more instructions of the second instruction set architecture to cause a return from an event handler while staying in a most privileged level and establish a return context that was in effect before event delivery.

16. The method of example 15, wherein the opcode is F2 0F 01 CA.

17. The method of any of examples 15-16, wherein the most privileged level is ring 0.

18. A system comprising:

a processor core including:

decoder circuitry to decode a single instruction, the single instruction to include a field for an opcode, and execution circuitry to execute the decoded single instruction according to the opcode to cause a return from an event handler while staying in a most privileged level and establish a return context that was in effect before event delivery; and memory coupled to the processor core to store the single instruction.

19. The system of example 18, wherein the opcode is F2 0F 01 CA.

20. The system of any of examples 18-19, wherein the execution circuitry is to establish the return context by, at least in part, loading one or more registers.

21. An apparatus comprising:

decoder circuitry to decode a single instruction, the single instruction to include a field for an opcode; and execution circuitry to execute the decoded instruction according to the opcode to cause a return from an event handler while transitioning to a least privileged ring and establishing the return context that was in effect before event delivery.

22. The apparatus of example 21, wherein the execution of the decoded instruction is to modify segment registers.

23. The apparatus of any of examples 21-22, wherein the opcode is F3 0F 01 CA.

24. The apparatus of any of examples 21-23, wherein the least privileged level is ring 3.

25. The apparatus of any of examples 21-24, wherein to execute the decode instruction the execution circuitry is to load and check the return context from a stack.

26. The apparatus of example 25, wherein the execution circuitry is to check a shadow stack to confirm validity of the return.

27. The apparatus of example 25, wherein the execution circuitry is to establish the return context by, at least in part, loading one or more registers.

28. A method comprising:

decoding a single instruction, the single instruction to include a field for an opcode; and executing the decoded instruction according to the opcode to cause a return from an event handler while transitioning to a least privileged ring and establishing the return context that was in effect before event delivery.

29. The method of example 28, wherein executing the decoded instruction further comprises modifying segment registers.

30. The method of any of examples 28-29, wherein the opcode is F3 0F 01 CA.

31. The method of any of examples 28-30, wherein the least privileged level is ring 3.

32. The method of any of examples 28-31, wherein the executing further comprises loading and checking the return context from a stack.

33. The method of example 32, wherein the executing is to check a shadow stack to confirm validity of the return.

34. The method of example 32, wherein the executing is to establish the return context by, at least in part, loading one or more registers.

35. A method comprising:

translating a single instruction from a first instruction set architecture into one or more instructions of a second instruction set architecture, the single instruction having a field for an opcode, the opcode indicating that execution circuitry is to cause a return from an event handler while staying in a least privileged level and establish a return context that was in effect before event delivery;

decoding the one or more instructions of the second instruction set architecture; and executing the decoded one or more instructions of the second instruction set architecture to cause a return from an event handler while staying in a least privileged level and establish a return context that was in effect before event delivery.

36. The method of example 35, wherein the opcode is F3 0F 01 CA.

37. The method of any of examples 35-36, wherein the most privileged level is ring 3.

38. A system comprising:

a processor core including:

decoder circuitry to decode a single instruction, the single instruction to include a field for an opcode, and execution circuitry to execute the decoded instruction according to the opcode to cause a return from an event handler while transitioning to a least privileged ring and establishing the return context that was in effect before event delivery; and memory coupled to the processor core to store the single instruction.

39. The system of example 38, wherein the opcode is F3 0F 01 CA.

40. The system of any of examples 38-39, wherein the execution circuitry is to establish the return context by, at least in part, loading one or more registers.

41. An apparatus comprising:

event delivery circuitry to perform one or more operations upon an event delivery of an exception or interrupt to an event handler, wherein the one or more operations include an establishment of a new context of an event handler in a first privilege level; and one or more model specific registers (MSRs) to be utilized by the event delivery circuitry to perform the one or more operations including one or more of:

a configuration MSR wherein a first proper subset of bits of the configuration register identify a stack level to use for markable interrupts that are delivered while current privilege level has a first state, a second proper subset of bits of the configuration register indicate the current privilege level state, a third proper subset of bits of the configuration register identify an amount of cachelines by which event delivery decrements a stack pointer when not changing stacks, and a fourth proper subset of bits of the configuration register contain the upper bits of the linear address of a page in memory containing event handlers;

a plurality of regular stack pointer MSRs;

a stack levels (STKLVLS) MSR; and a plurality of shadow stack pointer MSRs.

41. The apparatus of example 41, wherein the execution circuitry is to perform event delivery to:

determine a state of the new context;

save information about the event and an original context; and load state of the new context;

42. The apparatus of any of examples 40-41, wherein to determine a state of the new context comprises to determine a new instruction pointer, a new flags register value, and values for a stack level, stack pointer, and a shadow stack pointer.

43. The apparatus of any of examples 40-42, wherein to save information about the event and an original context comprises to save information on a regular stack and to save information on a shadow stack.

44. The apparatus of any of examples 40-43, wherein the execution circuitry is to further confirm that the event delivery is supported by perform event delivery by determining that a bit in a control register is set to indicate support for flexible return and event delivery.

45. The apparatus of any of examples 40-44, further comprising:

memory to store the event handler.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:

a plurality of segment registers;

decoder circuitry to decode a single instruction, the single instruction to include a field for an opcode; and execution circuitry to execute the decoded single instruction according to the opcode to cause a return from an event handler while staying in a most privileged level and establish a return context that was in effect before event delivery, wherein the execution of the decoded instruction is to not modify the segment registers and the execution circuitry is to load and check the return context from a stack and check a shadow stack to confirm validity of the return.

2. The apparatus of claim 1, wherein the opcode is F2 0F 01 CA.

3. The apparatus of claim 1, wherein the most privileged level is ring 0.

4. The apparatus of claim 1, wherein the execution circuitry is to establish the return context by, at least in part, loading one or more registers.

5. A method comprising:

decoding a single instruction, the single instruction to include a field for an opcode; and executing the decoded instruction according to the opcode to cause a return from an event handler while staying in a most privileged level and establish a return context that was in effect before event delivery, wherein the executing further comprises loading and checking the return context from a stack and checking a shadow stack to confirm validity of the return.

6. The method of claim 5, wherein executing the decoded instruction further comprises not modifying segment registers.

7. The method of claim 5, wherein the opcode is F2 0F 01 CA.

8. The method of claim 5, wherein the most privileged level is ring 0.

9. The method of claim 5, wherein the executing is to establish the return context by, at least in part, loading one or more registers.

10. A method comprising:

translating a single instruction from a first instruction set architecture into one or more instructions of a second instruction set architecture, the single instruction having a field for an opcode, the opcode indicating that execution circuitry is to cause a return from an event handler while staying in a most privileged level and establish a return context that was in effect before event delivery;

decoding the one or more instructions of the second instruction set architecture; and executing the decoded one or more instructions of the second instruction set architecture to cause a return from an event handler while staying in a most privileged level and establish a return context that was in effect before event delivery, wherein the execution of the decoded instruction is to not modify segment registers, loads and checks the return context from a stack, and checks a shadow stack to confirm validity of the return.

11. The method of claim 10, wherein the opcode is F2 0F 01 CA.

12. The method of claim 10, wherein the most privileged level is ring 0.

13. A system comprising:

a processor core including:

a plurality of segment registers, decoder circuitry to decode a single instruction, the single instruction to include a field for an opcode, and execution circuitry to execute the decoded single instruction according to the opcode to cause a return from an event handler while staying in a most privileged level and establish a return context that was in effect before event delivery, wherein to execute the decoded instruction the execution circuitry is to load and check the return context from a stack and the execution circuitry is to check a shadow stack to confirm validity of the return; and memory coupled to the processor core to store the single instruction.

14. The system of claim 13, wherein the opcode is F2 0F 01 CA.

15. The system of claim 13, wherein the execution circuitry is to establish the return context by, at least in part, loading one or more registers.

* * * * *